United States Patent
Czinger

(10) Patent No.: US 12,280,554 B2
(45) Date of Patent: Apr. 22, 2025

(54) FIXTURELESS ROBOTIC ASSEMBLY

(71) Applicant: DIVERGENT TECHNOLOGIES, INC., Los Angeles, CA (US)

(72) Inventor: Lukas Philip Czinger, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 208 days.

(21) Appl. No.: 16/950,802

(22) Filed: Nov. 17, 2020

(65) Prior Publication Data
US 2021/0154950 A1 May 27, 2021

Related U.S. Application Data

(60) Provisional application No. 62/938,921, filed on Nov. 21, 2019.

(51) Int. Cl.
*B29C 65/00* (2006.01)
*B25J 9/16* (2006.01)
(Continued)

(52) U.S. Cl.
CPC .......... *B29C 66/863* (2013.01); *B25J 9/1682* (2013.01); *B25J 9/1687* (2013.01); *B25J 11/005* (2013.01);
(Continued)

(58) Field of Classification Search
CPC .............. B29C 66/863; B29C 65/1448; B29C 65/4845; B29C 66/834; B25J 9/1682;
(Continued)

(56) References Cited

U.S. PATENT DOCUMENTS 5,203,226 A  4/1993  Hongou et al.
5,742,385 A  4/1998  Champa
(Continued)

FOREIGN PATENT DOCUMENTS

CN  103889650 A  6/2014
CN  105081761 A  11/2015
(Continued)

OTHER PUBLICATIONS

US 9,202,136 B2, 12/2015, Schmidt et al. (withdrawn)
(Continued)

*Primary Examiner* — Abbas Rashid
*Assistant Examiner* — Caroline Beha
(74) *Attorney, Agent, or Firm* — ArentFox Schiff LLP

(57) ABSTRACT

A computing system may direct a first robotic arm to a first position based on a first set of coordinates. The computing system may cause the first robotic arm to engage with a first structure based on the first position of the first robotic arm. Further, the computing system may direct the first robotic arm to a second position based on a second set of coordinates such that the first structure is brought within a joining proximity of a second structure without a fixture retaining the first structure and without a fixture retaining the second structure, wherein the first structure is configured to be joined with the second structure when the first and second structures are within the joining proximity, the joining proximity being a proximity at which the first and second structures can be joined together.

97 Claims, 37 Drawing Sheets

(51) Int. Cl.
  *B25J 11/00*    (2006.01)
  *B29C 65/14*    (2006.01)
  *B29C 65/48*    (2006.01)
  *B29L 31/30*    (2006.01)

(52) U.S. Cl.
  CPC ...... *B29C 65/1448* (2013.01); *B29C 65/4845* (2013.01); *B29C 66/834* (2013.01); *B29L 2031/3055* (2013.01)

(58) Field of Classification Search
  CPC ...... B25J 9/1687; B25J 11/005; B25J 9/0084; B29L 2031/3055; B22F 7/062; B22F 10/20; B22F 10/25; B33Y 80/00; F16B 11/006; G05B 2219/39084; G05B 2219/40482; G05B 2219/40032; G05B 2219/45235; Y02P 10/25
  See application file for complete search history.

(56) References Cited

U.S. PATENT DOCUMENTS

| | | |
|---|---|---|
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,929,267 B2 | 4/2011 | Hoch et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |

(56) References Cited

U.S. PATENT DOCUMENTS

| | | |
|---|---|---|
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |

(56) References Cited

U.S. PATENT DOCUMENTS

| | | | |
|---|---|---|---|
| 10,289,263 B2 | 5/2019 | Troy et al. | |
| 10,289,875 B2 | 5/2019 | Singh et al. | |
| 10,291,193 B2 | 5/2019 | Dandu et al. | |
| 10,294,552 B2 | 5/2019 | Liu et al. | |
| 10,294,982 B2 | 5/2019 | Gabrys et al. | |
| 10,295,989 B1 | 5/2019 | Nevins | |
| 10,303,159 B2 | 5/2019 | Czinger et al. | |
| 10,307,824 B2 | 6/2019 | Kondoh | |
| 10,310,197 B1 | 6/2019 | Droz et al. | |
| 10,313,651 B2 | 6/2019 | Trevor et al. | |
| 10,315,252 B2 | 6/2019 | Mendelsberg et al. | |
| 10,336,050 B2 | 7/2019 | Susnjara | |
| 10,337,542 B2 | 7/2019 | Hesslewood et al. | |
| 10,337,952 B2 | 7/2019 | Bosetti et al. | |
| 10,339,266 B2 | 7/2019 | Urick et al. | |
| 10,343,330 B2 | 7/2019 | Evans et al. | |
| 10,343,331 B2 | 7/2019 | McCall et al. | |
| 10,343,355 B2 | 7/2019 | Evans et al. | |
| 10,343,724 B2 | 7/2019 | Polewarczyk et al. | |
| 10,343,725 B2 | 7/2019 | Martin et al. | |
| 10,350,823 B2 | 7/2019 | Rolland et al. | |
| 10,356,341 B2 | 7/2019 | Holzer et al. | |
| 10,356,395 B2 | 7/2019 | Holzer et al. | |
| 10,357,829 B2 | 7/2019 | Spink et al. | |
| 10,357,957 B2 | 7/2019 | Buller et al. | |
| 10,359,756 B2 | 7/2019 | Newell et al. | |
| 10,369,629 B2 | 8/2019 | Mendelsberg et al. | |
| 10,382,739 B1 | 8/2019 | Rusu et al. | |
| 10,384,393 B2 | 8/2019 | Xu et al. | |
| 10,384,416 B2 | 8/2019 | Cheung et al. | |
| 10,389,410 B2 | 8/2019 | Brooks et al. | |
| 10,391,710 B2 | 8/2019 | Mondesir | |
| 10,392,097 B2 | 8/2019 | Pham et al. | |
| 10,392,131 B2 | 8/2019 | Deck et al. | |
| 10,393,315 B2 | 8/2019 | Tyan | |
| 10,400,080 B2 | 9/2019 | Ramakrishnan et al. | |
| 10,401,832 B2 | 9/2019 | Snyder et al. | |
| 10,403,009 B2 | 9/2019 | Mariampillai et al. | |
| 10,406,750 B2 | 9/2019 | Barton et al. | |
| 10,412,283 B2 | 9/2019 | Send et al. | |
| 10,416,095 B2 | 9/2019 | Herbsommer et al. | |
| 10,421,496 B2 | 9/2019 | Swayne et al. | |
| 10,421,863 B2 | 9/2019 | Hasegawa et al. | |
| 10,422,478 B2 | 9/2019 | Leachman et al. | |
| 10,425,793 B2 | 9/2019 | Sankaran et al. | |
| 10,427,364 B2 | 10/2019 | Alves | |
| 10,429,006 B2 | 10/2019 | Tyan et al. | |
| 10,434,573 B2 | 10/2019 | Buller et al. | |
| 10,435,185 B2 | 10/2019 | Divine et al. | |
| 10,435,773 B2 | 10/2019 | Liu et al. | |
| 10,436,038 B2 | 10/2019 | Buhler et al. | |
| 10,438,407 B2 | 10/2019 | Pavanaskar et al. | |
| 10,440,351 B2 | 10/2019 | Holzer et al. | |
| 10,442,002 B2 | 10/2019 | Benthien et al. | |
| 10,442,003 B2 | 10/2019 | Symeonidis et al. | |
| 10,449,696 B2 | 10/2019 | Elgar et al. | |
| 10,449,737 B2 | 10/2019 | Johnson et al. | |
| 10,461,810 B2 | 10/2019 | Cook et al. | |
| 11,034,024 B2 | 6/2021 | Saez et al. | |
| 11,534,975 B2 | 12/2022 | Ribble et al. | |
| 11,559,897 B2 * | 1/2023 | Ghanem | G05B 19/41875 |
| 11,603,150 B2 | 3/2023 | Chami et al. | |
| 2002/0182339 A1 * | 12/2002 | Taylor | G03F 7/038 522/170 |
| 2004/0115033 A1 * | 6/2004 | Rommes | B29C 45/1769 414/222.01 |
| 2004/0143951 A1 | 7/2004 | Berninger | |
| 2005/0092052 A1 * | 5/2005 | Stone | B21J 9/02 72/361 |
| 2005/0095096 A1 * | 5/2005 | Curotto | B65F 1/122 414/406 |
| 2006/0108783 A1 | 5/2006 | Ni et al. | |
| 2009/0038361 A1 * | 2/2009 | Toeniskoetter | B25J 15/0019 29/243.58 |
| 2011/0185556 A1 * | 8/2011 | Hirano | B25J 9/0087 901/30 |
| 2014/0212637 A1 | 7/2014 | Syvret et al. | |
| 2014/0271061 A1 | 9/2014 | Fukuda et al. | |
| 2014/0277669 A1 | 9/2014 | Nardi et al. | |
| 2015/0336271 A1 * | 11/2015 | Spicer | B23K 37/047 228/9 |
| 2017/0050277 A1 | 2/2017 | Shi et al. | |
| 2017/0113344 A1 | 4/2017 | Schönberg | |
| 2017/0120514 A1 * | 5/2017 | Miller | B29D 35/146 |
| 2017/0192415 A1 * | 7/2017 | Grant, Jr. | G05B 19/41895 |
| 2017/0341309 A1 | 11/2017 | Piepenbrock et al. | |
| 2018/0099365 A1 * | 4/2018 | Osato | B25J 9/0087 |
| 2019/0217545 A1 | 7/2019 | Eller et al. | |
| 2019/0232317 A1 | 8/2019 | Seubert et al. | |
| 2019/0315057 A1 | 10/2019 | Budge et al. | |
| 2020/0192311 A1 | 6/2020 | Czinger et al. | |
| 2022/0089237 A1 | 3/2022 | Sverdlov et al. | |

FOREIGN PATENT DOCUMENTS

| | | |
|---|---|---|
| CN | 106466847 A | 3/2017 |
| CN | 110282049 A | 9/2019 |
| JP | 2009-148869 A | 7/2009 |
| JP | 2017-019053 A | 1/2017 |
| JP | 2019-141942 A | 8/2019 |
| KR | 10-2022-0052411 A | 4/2022 |
| WO | 1996036455 A1 | 11/1996 |
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report and Written Opinion for PCT/US2020/061365, dated Feb. 17, 2021, 12 pages.
Office Action in CN202080080839.4, mailed Sep. 14, 2023, 12 pages.
Bone at al., "Vision-guided fixtureless assembly of automotive components", Robotics and Computer-Integrated Manufacturing, vol. 19, Issues 1-2, Feb.-Apr. 2003, pp. 79-87.

(56) References Cited

OTHER PUBLICATIONS

Cai at al., "Automated Robotic Assembly of 3D Mesostructure via Guided Mechanical Buckling", 2021 IEEE 17th International Conference on Automation Science and Engineering (CASE), Aug. 2021, pp. 2098-2104.

Pires et al., "The role of robotics in additive manufacturing: review of the AM processes and introduction of an intelligent system", Industrial Robot: the international journal of robotics research and application, ISSN 0143-991X, Dec. 28, 2021, 21 pages.

Office Action in JP 2022-526689, mailed Jul. 16, 2024, 8 pages (4 pages of OA and 4 pages of English Translation).

* cited by examiner

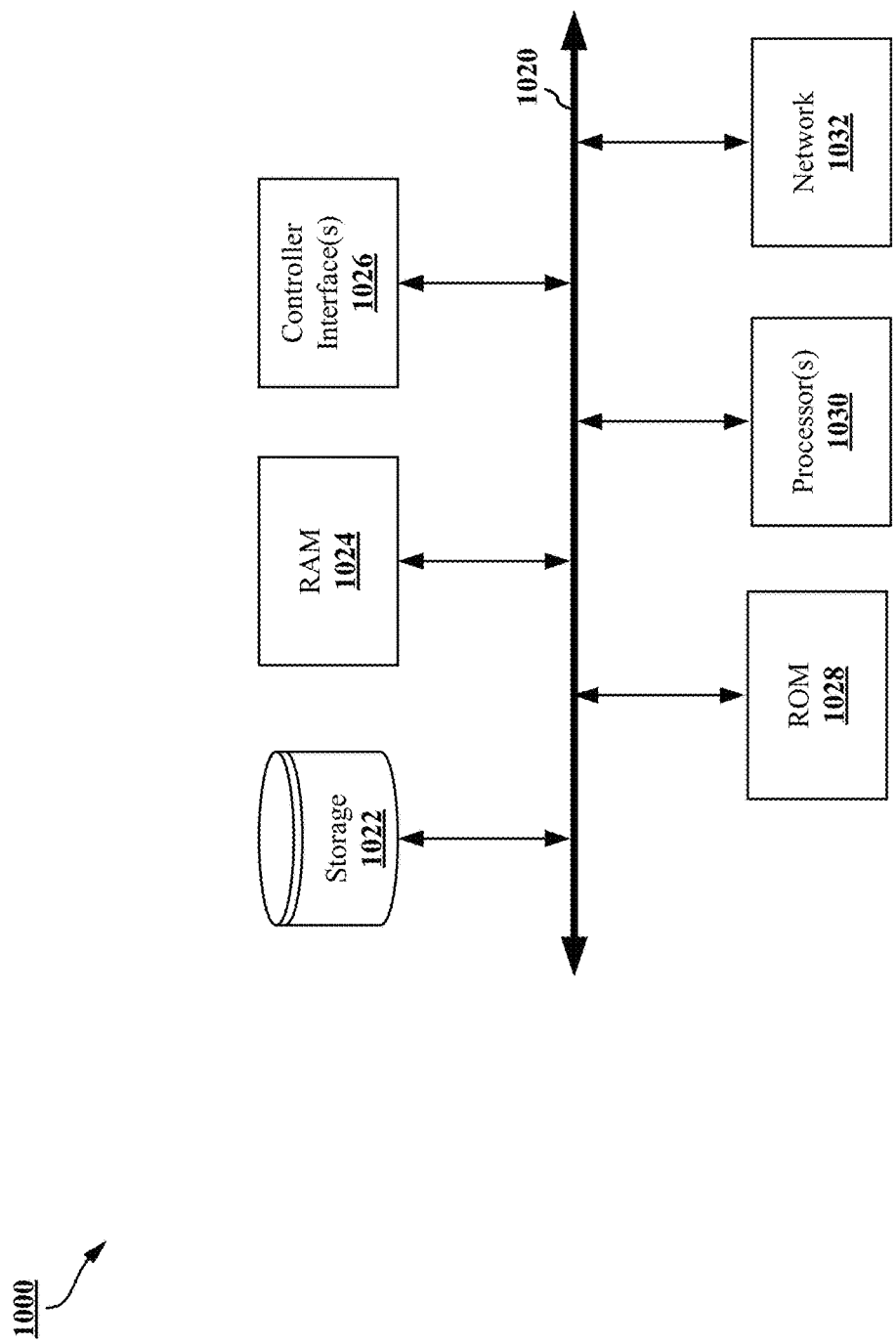

FIXTURELESS ROBOTIC ASSEMBLY

CROSS-REFERENCE TO RELATED APPLICATION(S)

This application claims the benefit of U.S. Provisional Application No. 62/938,921, entitled "FIXTURELESS ROBOTIC ASSEMBLY" and filed on Nov. 21, 2019, which is expressly incorporated by reference herein in its entirety.

BACKGROUND

Field

The present disclosure relates to robotic apparatuses, and more specifically to techniques for fixtureless assembly using robotic apparatuses.

Background

A vehicle such as an automobile, truck or aircraft is made of a large number of individual structural components joined together to form the body, frame, interior and exterior surfaces, etc. These structural components provide form to the automobile, truck and aircraft, and respond appropriately to the many different types of forces that are generated or that result from various actions like accelerating and braking. These structural components also provide support. Structural components of varying sizes and geometries may be integrated in a vehicle, for example, to provide an interface between panels, extrusions, and/or other structures. Thus, structural components are an integral part of vehicles.

Most structural components must be joined with another part, such as another structural component, in secure, well-designed ways. Modern automobile factories rely heavily on robotic assembly of structural components. However, robotic assembly of automobile components requires the use of fixtures. In automobile factories, each part of the automobile that will be robotically assembled requires a unique fixture that is specific to that part. Given the large number of individual parts in an automobile that are robotically assembled, an equally large number of fixtures are required. In fact, a modern automobile chassis can consist of thousands of assembled parts, each part requiring a specially-designed fixture for assembly. However, fixtures can be extremely expensive. In fact, it is not unusual for a single fixture for an automobile part to cost $300,000 to $500,000. The cost of the fixtures used in an automobile factory is a large portion of the cost of the entire factory. As a result, building a modern automobile factory requires a massive capital investment, making it necessary to build and sell hundreds of thousands of cars just to recapture the initial investment and break even, let alone make a profit.

In addition to their enormous cost, fixtures can only be used for the specific part for which they are designed. Therefore, if a part is changed in some way, for example, if the car model's design is updated, an entirely new fixture must be designed and built. This adds significant cost and time to the process of changing or updating car models. As a result, automobiles models are updated only infrequently, for example, every five or six years or more. In addition, the cost and inflexibility of fixtures has caused the automobile industry to look towards using common structures across different vehicle models, such as using the same subframe for a car model and an SUV model. However, this commonality can severely limit the design of each vehicle forced to share the structure. As a result, vehicles on the road begin to look more and more the same, and consumers are left with fewer distinct choices.

Since the dawn of robotic assembly of cars, automobile manufacturers have unquestionably relied on fixtures. This unquestioning reliance has, in part, created an automobile industry that is dominated by relatively few manufacturers that are able to invest the massive amount of capital required to build a modern automobile factory, and then build and sell the hundreds of thousands of that factory's particular car model, year after year over five or more years, in order to recover the initial investment and begin to generate a profit. This unquestioning reliance has also resulted in fewer choices for consumers as cars that look more and more alike each passing year.

SUMMARY

In contrast to conventional automobile manufacturing, the present disclosure envisions eliminating reliance on fixtures as part of a new approach to assembling vehicle structures and other multi-part structures. Such assembly operations may include joining two or more structures (e.g., additively manufactured structures such as nodes), parts, components, and the like. In joining multiple structures, at least a portion of a vehicle may be assembled. For example, joining multiple structures may result in assembly of at least a portion of a body, frame, chassis, panel, etc. of a vehicle. Advantageously, the present disclosure describes such assembly operations through controlling a set of robots to join structures without the use of fixtures. Structures joined by the set of robots may be additively manufactured.

Because vehicles are to be safe, reliable, and so forth, approaches to accurately performing various assembly operations associated with production of vehicles may be beneficial. Such approaches to various assembly operations may be performed by at least one robotic apparatus (hereinafter, robot) that may be instructed via a set of instructions to cooperate in assembling at least a portion of a vehicle (e.g., body, chassis, frame, panel, etc.). Accordingly, a controller and/or other processing system may implement various techniques to generate and/or execute instructions for at least one robot that directs the at least one robot to one or more positions suitable for performing various assembly operations.

In the present disclosure, techniques and approaches are described for directing a set of robots to join at least two structures without the use of fixtures when assembling at least a portion of a vehicle. Such techniques and approaches may be enabled through various systems, methods, apparatuses, and/or computer-readable media described herein.

By way of example, a computing system may direct a first robotic arm to a first position based on a first set of coordinates. The computing system may cause the first robotic arm to engage with a first structure based on the first position of the first robotic arm. Further, the computing system may direct the first robotic arm to a second position based on a second set of coordinates such that the first structure is brought within a joining proximity of a second structure without a fixture retaining the first structure and without a fixture retaining the second structure, wherein the first structure is configured to be joined with the second structure when the first and second structures are within the joining proximity, the joining proximity being a proximity at which the first and second structures can be joined together.

It will be understood that other aspects of mechanisms for realizing fixtureless assembly of at least a portion of a vehicle and other multi-part structures using a set of robots, including joining of additively manufactured structures by the set of robots without fixtures, will become readily apparent to those skilled in the art from the following detailed description, wherein it is shown and described in several embodiments by way of illustration. As will be realized by those skilled in the art, the disclosed subject matter is capable of other and different embodiments and its several details are capable of modification in various other respects, all without departing from the present disclosure. Accordingly, the drawings and detailed description are to be regarded as illustrative in nature and not as restrictive.

BRIEF DESCRIPTION OF THE DRAWINGS

FIG. 10 is a block diagram of an example controller processing system configured to execute one or more sets of instructions to direct at least one robot for various operations associated with assembly of at least a portion of a vehicle.

DETAILED DESCRIPTION

Figure 1A:
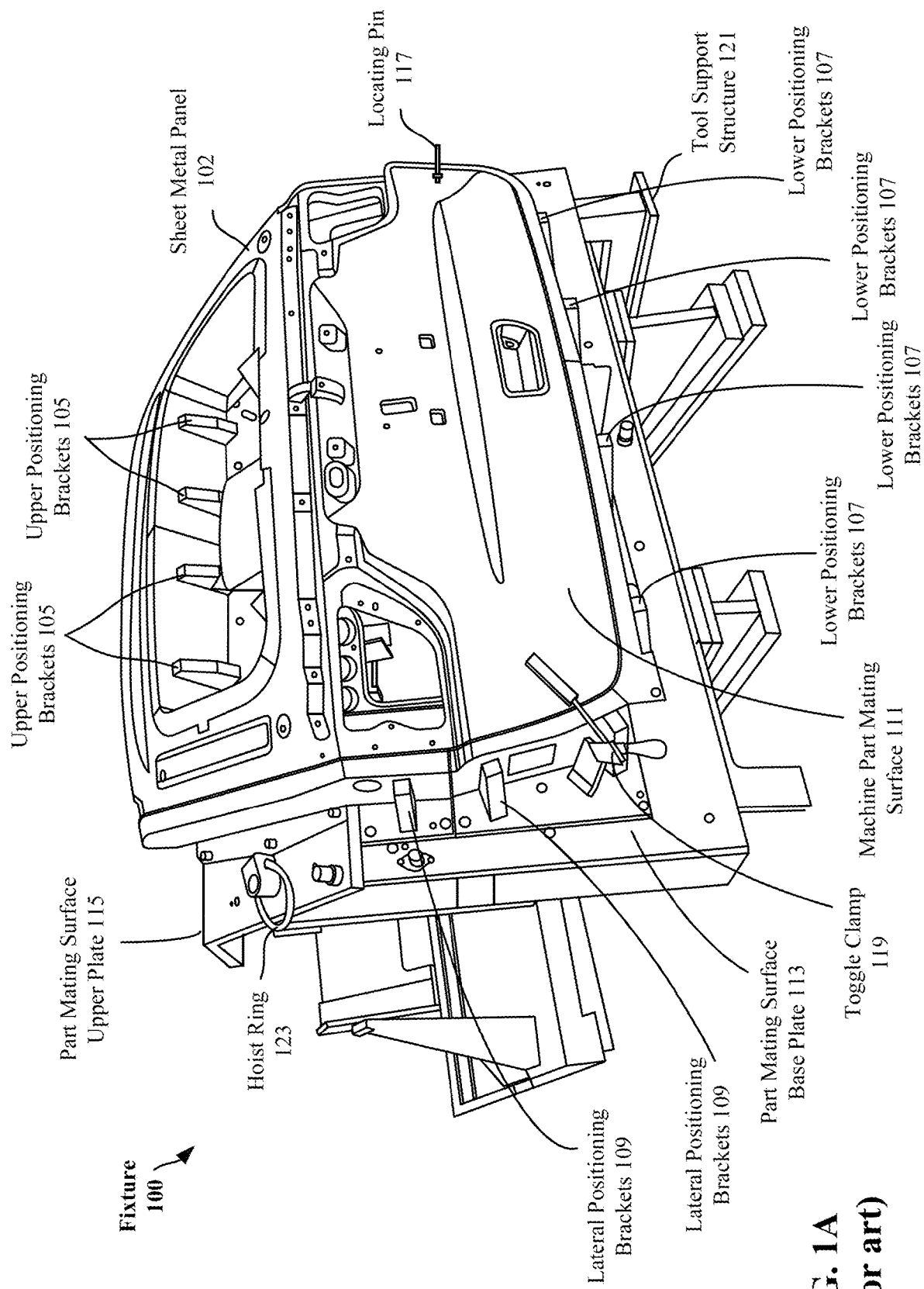
FIGS. 1A-1E illustrate examples of fixtures, as is known in the art of automotive manufacturing.

The detailed description set forth below in connection with the appended drawings is intended to provide a description of various example embodiments and is not intended to represent the only embodiments in which the present disclosure may be practiced. The terms "exemplary," "illustrative," and the like used throughout the present disclosure mean "serving as an example, instance, or illustration," and should not necessarily be construed as preferred or advantageous over other embodiments presented in the present disclosure. The detailed description includes specific details for the purpose of providing a thorough and complete disclosure that fully conveys the scope of the present disclosure to those skilled in the art. However, the present disclosure may be practiced without these specific details. In some instances, well-known structures and components may be shown in block diagram form, or omitted entirely, in order to avoid obscuring the various concepts presented throughout the present disclosure. In addition, the figures may not be drawn to scale and instead may be drawn in a way that attempts to most effectively highlight various features relevant to the subject matter described. In addition, it should be understood that some elements that are described in the singular can also be implemented as more than one element, and some elements described in the plural can also be implemented as a single element. For example, description of "a processor," "a memory," etc., should be understood to include implementations that have multiple processors, memories, etc., performing the task(s) described. Likewise, description of "multiple processors," "multiple memories," etc., should be understood to include implementations that have a single processor, a single memory, etc.

The automobile industry's unquestioning reliance on fixtures has created significant disadvantages that continue to be simply accepted year after year. Fixtures are specifically designed to match a single part, therefore, robotically assembling a complex structure like an automobile chassis can require thousands of fixtures. In addition, changing the chassis design can require creating an entirely new set of fixtures. Because fixtures can be quite complex and expensive to build, any new design or change in current design can be incredibly expensive.

In this regard, FIGS. 1A through 1E illustrate various examples of fixtures that are conventionally used in manufacturing including automotive manufacturing. A fixture is designed to retain and/or position a structure or portion of the structure, for example, a part of a vehicle chassis, during pre-assembly, assembly, and/or post-assembly operations, such as on an assembly line. In so doing, the fixture can provide a mechanism by which the structure can be engaged and retained by a robotic arm. In addition, the fixture may provide rigidity to prevent the fixture from moving and/or deflecting during a joining operation. Further, the fixture may serve as a reference point for a joining operation to be performed; that is, the joining operation may be performed on the structure based on the assumption that the structure is retained at a certain position by the fixture. Thus, a fixture does one of the following: retains a part for joining, positions a part to allow joining, aides in the joining of parts, fixes a part for joining (e.g., if the part would flex when being held by the robot or otherwise lacks the rigidity necessary for various joining operations), and the like.

The present disclosure describes various techniques and approaches to assemble at least a portion of a vehicle without the use of fixtures. For example, the present disclosure describes one or more robots that are configured to directly engage with a structure, e.g., using an end effector of a robotic arm. By omitting fixtures, the present disclosure may provide various techniques and approaches for assembly of vehicles that are more economical in terms of cost, space, complexity, and/or accuracy than current methods of assembling vehicles.

FIG. 1A illustrates a conventional fixture 100 designed to retain a particular sheet metal panel 102 (e.g., a door panel, a floor panel, and the like) of a vehicle during various assembly operations. In this example, fixture 100 provides strength and rigidity for sheet metal panel 102 to prevent unintended movement and/or deflection during a joining operation. Fixture 100 includes multiple upper positioning brackets 105 that retain an upper portion of sheet metal panel 102, multiple lower positioning brackets 107 that retain a lower portion of the sheet metal panel, and multiple lateral positioning brackets 109 that retain the side portions of the sheet metal panel. Fixture 100 also includes a machine part mating surface 111, a part mating surface base plate 113, and a part mating surface upper plate 115 that provide rigidity to sheet metal panel 102. Fixture 100 also includes a locating pin 117 to guide sheet metal panel 102, and a toggle clamp 119 to lock the sheet metal panel into position on the fixture. Fixture 100 also includes a tool support structure 121 to support all of the other components of the fixture. Because fixture 100 is a large, heavy structure, the fixture also includes a hoist ring 123 to allow the fixture to be moved and positioned.

Fixture 100 is designed to be engage in a particular way and retained by a robotic arm because panel 102 cannot be directly engaged and retained by the robotic arm. The joining operation performed on panel 102 requires fixture 100 to provide a reference point or frame of reference so that the position of panel 102 can be assumed and/or estimated. Such assumptions and/or estimations are prone to errors, such as when panel 102 moves in an unintended manner and/or unintentionally deflects. These errors can accumulate over the assembly process. Thus, relatively large design tolerances may be needed, particularly when multiple other parts must be joined with panel 102, because precision may be difficult to achieve.

Figure 1B:
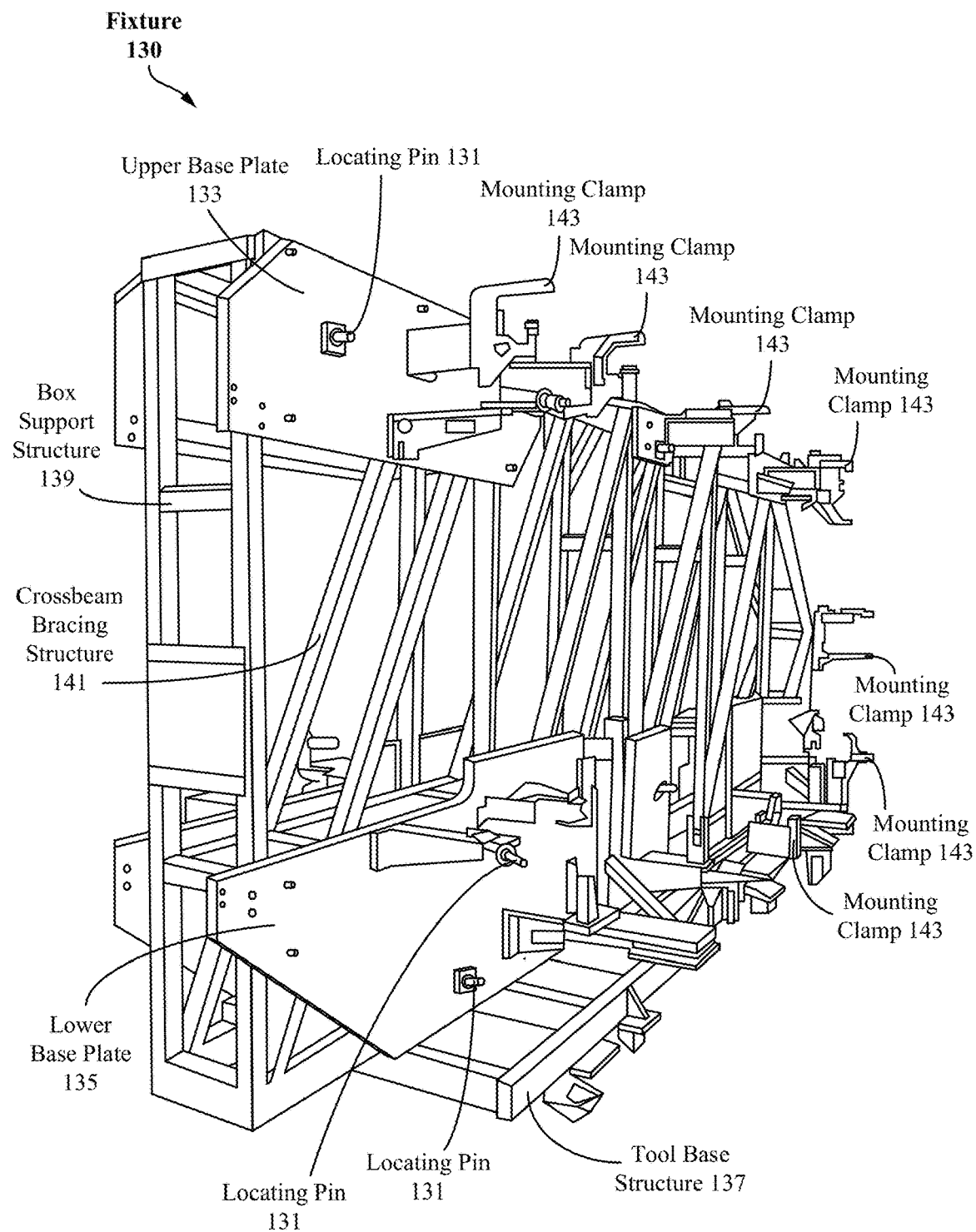

FIG. 1B illustrates another conventional fixture 130 that is used to retain a particular structure of a car during a joining operation. In the illustrated example, fixture 130 is not engaged with its structure, and illustrates the complexity that is typical of fixtures. Fixture 130 includes locating pins 131, an upper base plate 133, a lower base plate 135, and a tool base structure 137. Fixture 130 also includes a box support structure 139 and a crossbeam bracing structure 141 to support all of the components of the fixture. Fixture 130 also includes mounting clamps 143 to mount the car structure to the fixture.

Figure 1C:
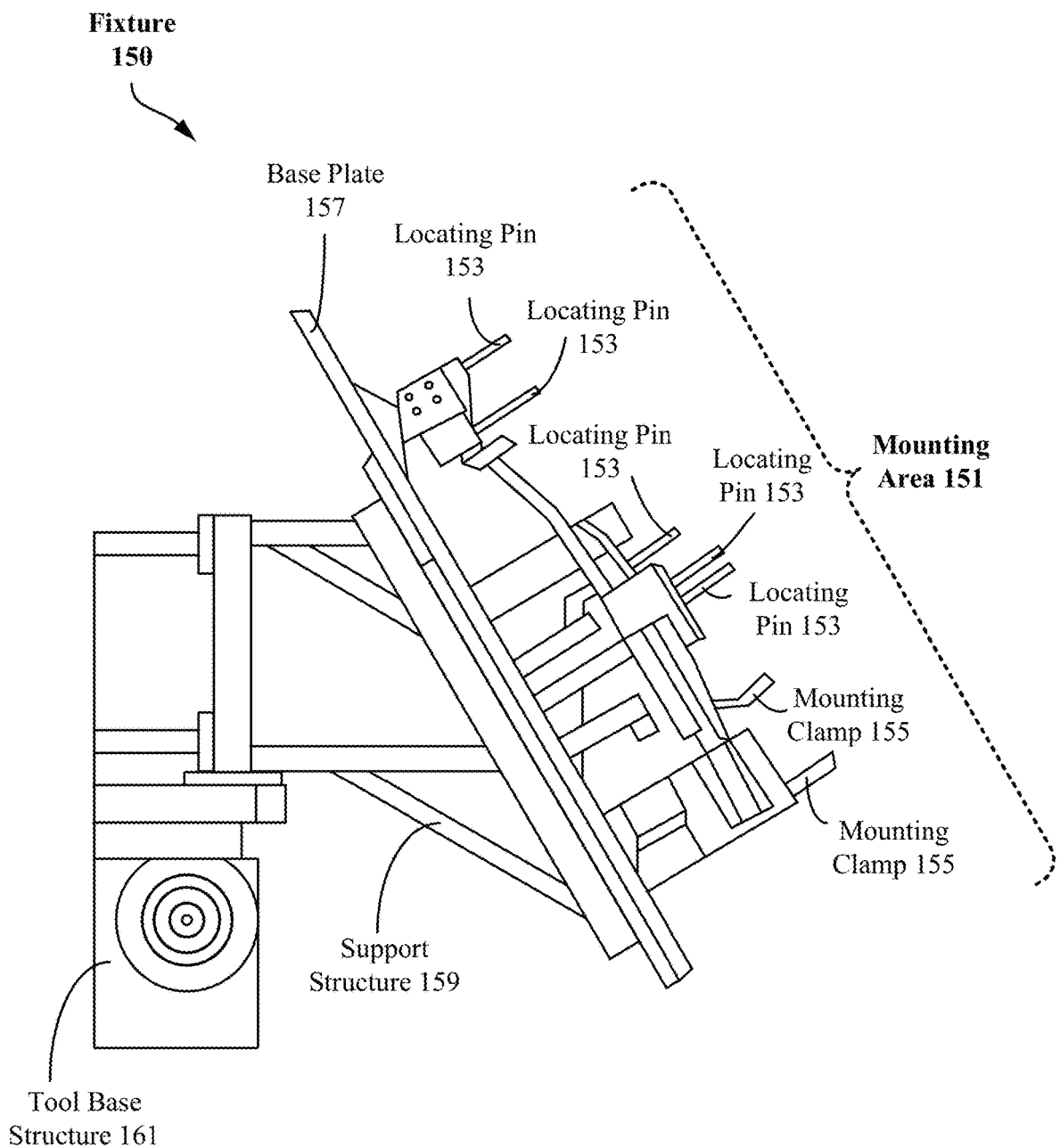

FIG. 1C illustrates a side perspective view of another conventional fixture 150. Fixture 150 is secured to the floor to provide a fixed and rigid positioning of the structure the fixture holds. Specifically, fixture 150 has a mounting area 151 to which its particular structure is connected by locating pins 153 and mounting clamps 155, thereby fixing the structure at mounting area 151 for a joining operation by one or more robotic interfaces. Fixture 150 also includes a base plate 157, a support structure 159, and a tool base structure 161 to support all of the other components of the fixture.

Figure 1D:
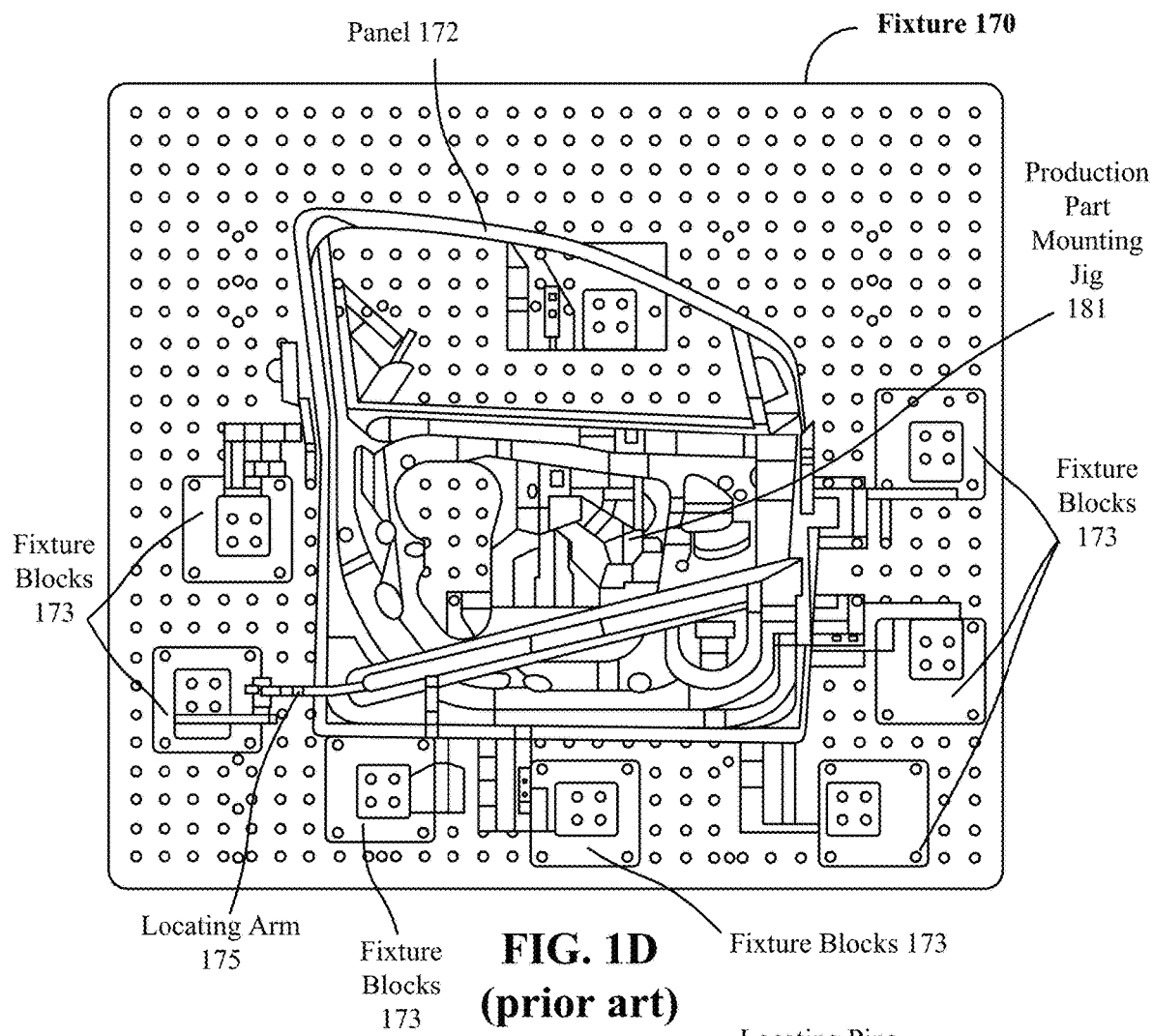
Figure 1E:
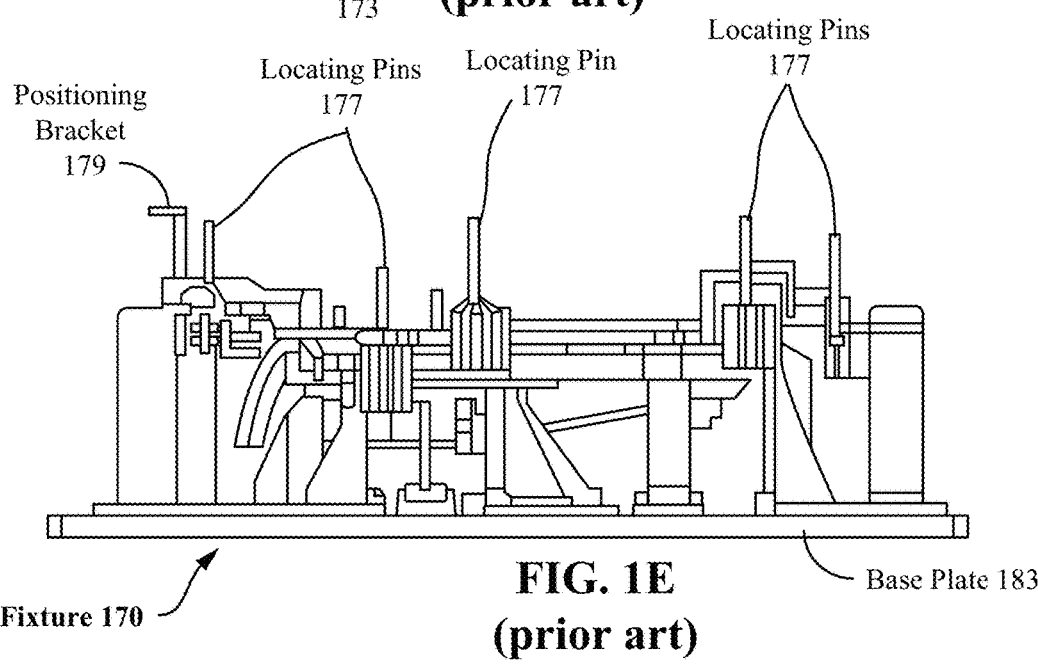

FIGS. 1D-1E illustrate still another example of a conventional fixture 170. FIG. 1D illustrates a top perspective of fixture 170, and FIG. 1E illustrates a side perspective of the fixture.

Conventional fixture 170 is configured to engage with and retain a panel 172 (e.g., a door panel, a floor panel, and the like). For example, the fixture includes multiple fixture blocks 173 to secure panel 172 to the fixture to prevent unintended movement and/or deflection of the panel during various assembly operations. Fixture 170 also includes a locating arm 175, locating pins 177, a positioning bracket 179, and a production part mating jig 181 to locate panel 172 during a mounting operation. Fixture 170 also includes a base plate 183.

Additive Manufacturing (3-D Printing). Additive manufacturing (AM) is advantageously a non-design specific manufacturing technique. AM provides the ability to create complex structures within a part. For example, nodes can be produced using AM. A node is a structure that may include one or more interfaces used to connect to other spanning components such as tubes, extrusions, panels, other nodes, and the like. Using AM, a node may be constructed to include additional features and functions, depending on the objectives. For example, a node may be printed with one or more ports that enable the node to secure two parts by injecting an adhesive rather than welding multiple parts together, as is traditionally done in manufacturing complex products. Alternatively, some components may be connected to a node using a brazing slurry, a thermoplastic, a thermoset, or another connection feature, any of which can be used interchangeably in place of an adhesive. Thus, while welding techniques may be suitable with respect to certain embodiments, additive manufacturing provides significant flexibility in enabling the use of alternative or additional connection techniques.

A variety of different AM techniques have been used to 3-D print components composed of various types of materials. Numerous available techniques exist, and more are being developed. For example, Directed Energy Deposition (DED) AM systems use directed energy sourced from laser or electron beams to melt metal. These systems utilize both powder and wire feeds. The wire feed systems advantageously have higher deposition rates than other prominent AM techniques. Single Pass Jetting (SPJ) combines two powder spreaders and a single print unit to spread metal powder and to print a structure in a single pass with little or no wasted motion. As another illustration, electron beam additive manufacturing processes use an electron beam to fuse metal via wire feedstock or sintering on a powder bed in a vacuum chamber. Atomic Diffusion Additive Manufacturing (ADAM) is still another recently developed technology in which components are printed, layer-by-layer, using a metal powder in a plastic binder. After printing, plastic binders are removed and the entire part (e.g., structure) is sintered at once into a desired metal.

Figure 2:
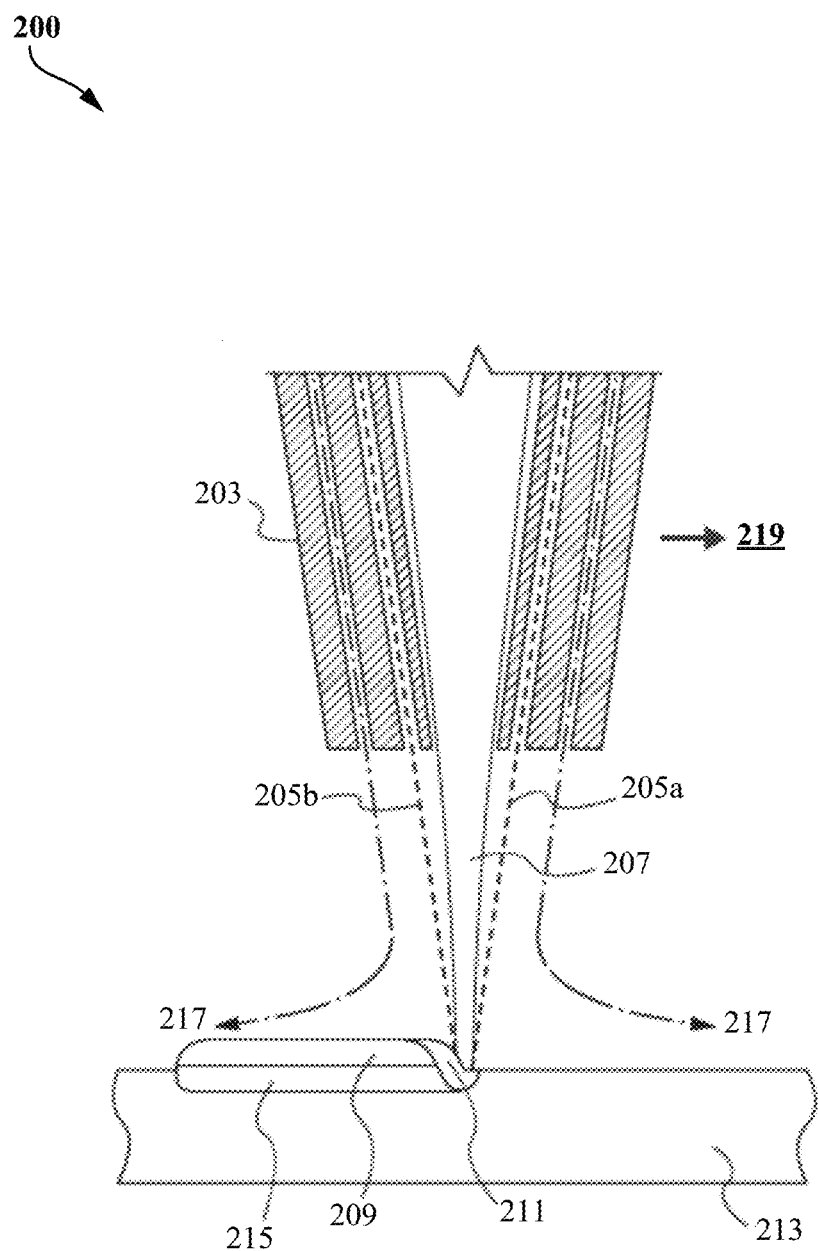
FIG. 2 illustrates an example embodiment of certain aspects of a Direct Metal Deposition (DMD) 3-D printer.

One of several such AM techniques, as noted, is DMD. FIG. 2 illustrates an example embodiment of certain aspects of a DMD 3-D printer 200. DMD printer 200 uses a feed nozzle 203 moving in a predefined direction 219 to propel powder streams 205a and 205b into a laser beam 207, which is directed toward a workpiece 213 that may be supported by a substrate. Feed nozzle 203 may also include mechanisms for streaming a shield gas 217 to protect the welded area from oxygen, water vapor, or other components.

The powdered metal is then fused by laser 207 in a melt pool region 211, which may then bond to workpiece 213 as a region of deposited material 209. A dilution area 215 may include a region of workpiece 213 where the deposited powder is integrated with the local material of workpiece 213. Feed nozzle 203 may be supported by a computer numerical controlled (CNC) robot or a gantry, or other computer-controlled mechanism. Feed nozzle 203 may be moved under computer control multiple times along a predetermined direction of the substrate until an initial layer of deposited material 209 is formed over a desired area of workpiece 213. Feed nozzle 203 can then scan the region immediately above the prior layer to deposit successive layers until the desired structure is formed. In general, feed nozzle 203 may be configured to move with respect to all three axes, and in some instances to rotate on its own axis by a predetermined amount.

Figure 3:
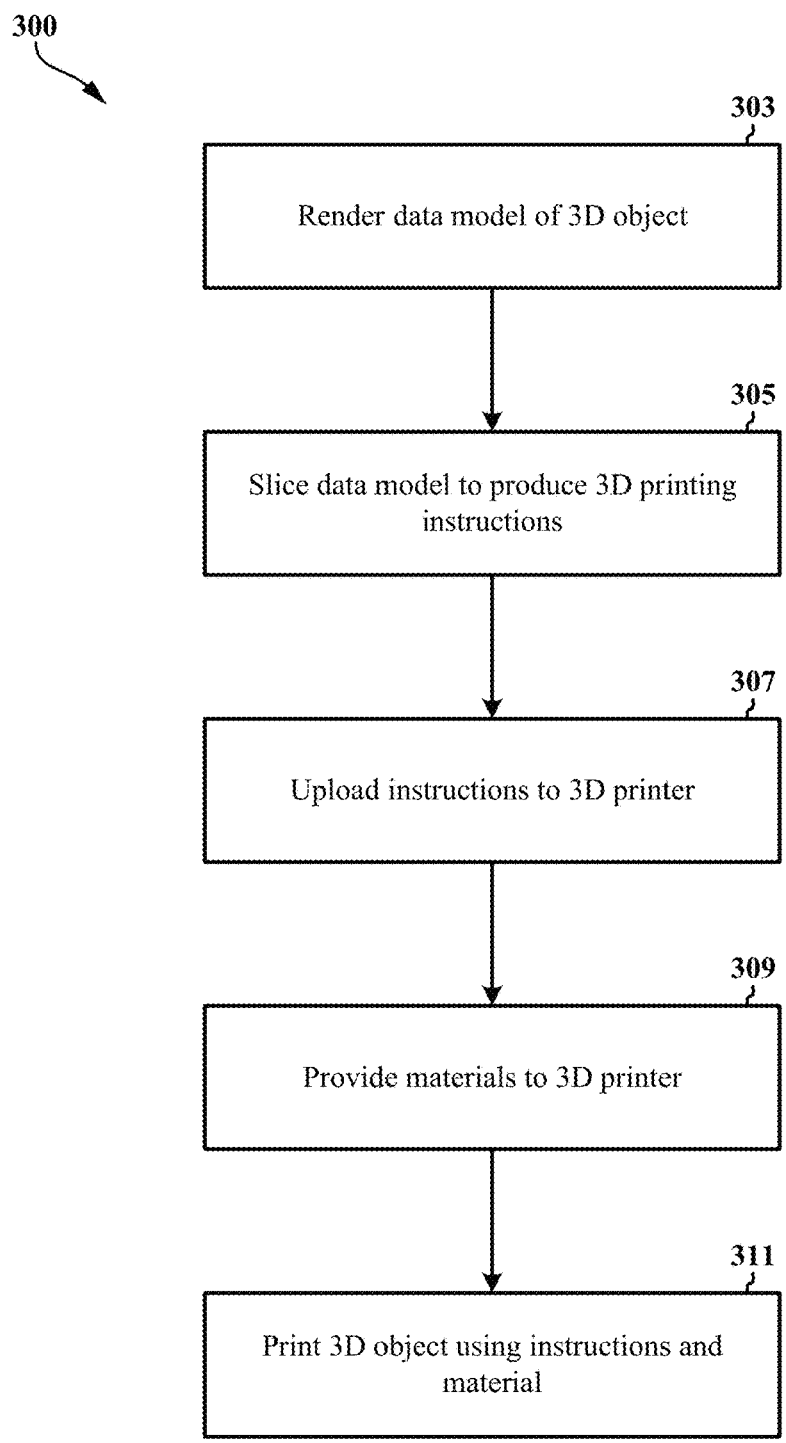
FIG. 3 illustrates a conceptual flow diagram of a 3-D printing process using a 3-D printer.

FIG. 3 is a flow diagram 300 illustrating an example process of 3-D printing. A data model of the desired 3-D object to be printed is rendered (303). A data model is a virtual design of the 3-D object. Thus, the data model may reflect the geometrical and structural features of the 3-D object, as well as its material composition. The data model may be created using a variety of methods, including CAE-based optimization, 3-D modeling, photogrammetry software, and camera imaging. CAE-based optimization may include, for example, cloud-based optimization, fatigue analysis, linear or non-linear finite element analysis (FEA), and durability analysis.

3-D modeling software, in turn, may include one of numerous commercially available 3-D modeling software applications. Data models may be rendered using a suitable computer-aided design (CAD) package, for example in an STL format. STL is one example of a file format associated with commercially available stereolithography-based CAD software. A CAD program may be used to create the data model of the 3-D object as an STL file. Thereupon, the STL file may undergo a process whereby errors in the file are identified and resolved.

Following error resolution, the data model can be 'sliced' (305) by a software application known as a slicer to thereby produce a set of instructions for 3-D printing the object, with the instructions being compatible and associated with the particular 3-D printing technology to be utilized. Numerous slicer programs are commercially available. Generally, the slicer program converts the data model into a series of individual layers representing thin slices (e.g., 100 microns thick) of the object be printed, along with a file containing the printer-specific instructions for 3-D printing these successive individual layers to produce an actual 3-D printed representation of the data model.

The layers associated with 3-D printers and related print instructions need not be planar or identical in thickness. For example, in some embodiments depending on factors like the technical sophistication of the 3-D printing equipment and the specific manufacturing objectives, etc., the layers in a 3-D printed structure may be non-planar and/or may vary in one or more instances with respect to their individual thicknesses.

A common type of file used for slicing data models into layers is a G-code file, which is a numerical control programming language that includes instructions for 3-D printing the object. The G-code file, or other file constituting the instructions, is uploaded (307) to the 3-D printer. Because the file containing these instructions is typically configured to be operable with a specific 3-D printing process, it will be appreciated that many formats of the instruction file are possible depending on the 3-D printing technology used.

In addition to the printing instructions that dictate what and how an object is to be printed, the appropriate physical materials necessary for use by the 3-D printer in printing the object are provided (309) to the 3-D printer using any of several conventional and often printer-specific methods. In DMD techniques, for example, one or more metal powders may be provided for layering structures with such metals or metal alloys. In selective laser melting (SLM), selective laser sintering (SLS), and other PBF-based AM methods (see below), the materials may be provided as powders into chambers that feed the powders to a build platform. Depending on the 3-D printer, other techniques for providing printing materials may be used.

The respective data slices of the 3-D object are then printed (311) based on the provided instructions using the material(s). In 3-D printers that use laser sintering, a laser scans a powder bed and melts the powder together where structure is desired, and avoids scanning areas where the sliced data indicates that nothing is to be printed. This process may be repeated thousands of times until the desired structure is formed, after which the printed part (e.g., structure) is removed from the printer. In fused deposition modelling, as described above, parts are printed by applying successive layers of model and support materials to a substrate. In general, any suitable 3-D printing technology may be employed for purposes of the present disclosure.

Another AM technique is powder-bed fusion (PBF). Like DMD, PBF creates 'build pieces' layer-by-layer. Each layer or 'slice' is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up.

FIGS. 4A through 4D illustrate respective side views of an example PBF system 400 during different stages of operation. As noted above, the particular embodiment illustrated in FIGS. 4A through 4D is one of many suitable examples of a PBF system acceptable for use in the present disclosure. It should also be noted that elements of FIGS. 4A through 4D and the other figures in the present disclosure are not necessarily drawn to scale, but may be drawn larger or smaller for the purpose of better illustration of concepts described herein. PBF system 400 can include a depositor 401 that can deposit each layer of metal powder, an energy beam source 403 that can generate an energy beam, a deflector 405 that can apply the energy beam to fuse the powder, and a build plate 407 that can support one or more build pieces, such as a build piece 409. PBF system 400 can also include a build floor 411 positioned within a powder bed receptacle. Walls 412 of the powder bed receptacle generally define the boundaries of the powder bed receptacle, which is sandwiched between walls 412 from the side and abuts a portion of build floor 411 below. Build floor 411 can progressively lower build plate 407 so that depositor 401 can deposit a next layer. The entire mechanism may reside in a chamber 413 that can enclose the other components, thereby protecting the equipment, enabling atmospheric and temperature regulation and mitigating contamination risks. Depositor 401 can include a hopper 415 that contains a powder 417, such as a metal powder, and a leveler 419 that can level the top of each layer of deposited powder.

Figure 4A:
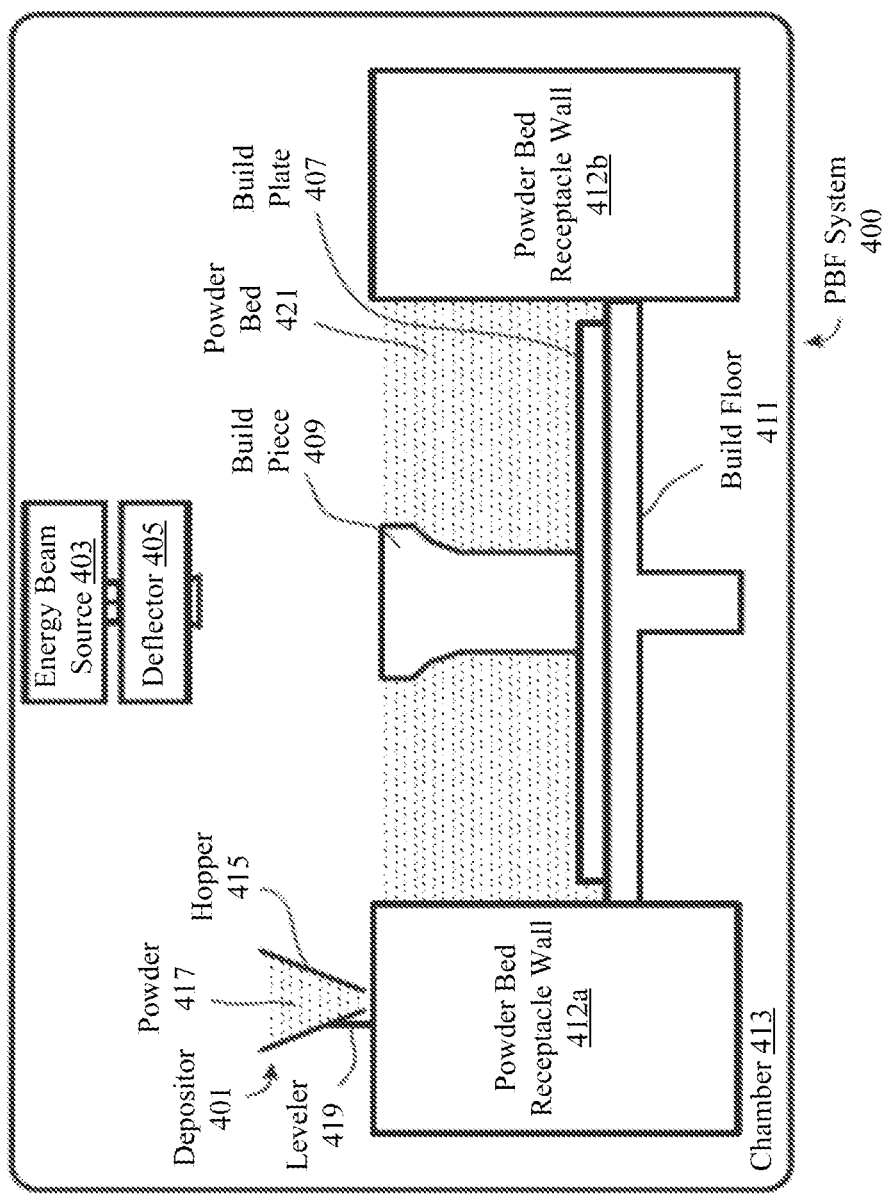
FIGS. 4A-4D illustrate example powder bed fusion (PBF) systems during different stages of operation.

Referring specifically to FIG. 4A, this figure shows PBF system 400 after a slice of build piece 409 has been fused, but before the next layer of powder has been deposited. In fact, FIG. 4A illustrates a time at which PBF system 400 has already deposited and fused slices in multiple layers, e.g., 150 layers, to form the current state of build piece 409, e.g., formed of 150 slices. The multiple layers already deposited have created a powder bed 421, which includes powder that was deposited but not fused.

Figure 4B:
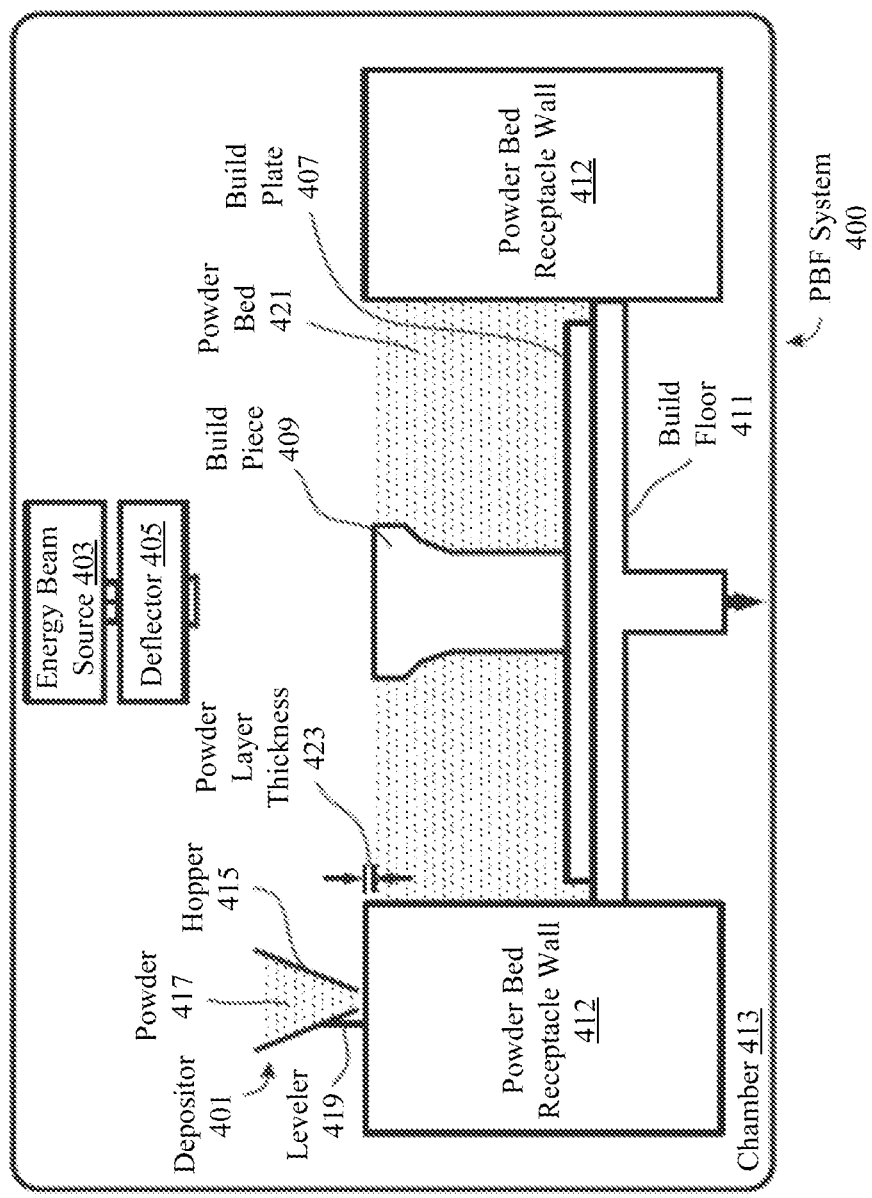

FIG. 4B shows PBF system 400 at a stage in which build floor 411 can lower by a powder layer thickness 423. The lowering of build floor 411 causes build piece 409 and powder bed 421 to drop by powder layer thickness 423, so that the top of build piece 409 and powder bed are lower than the top of powder bed receptacle wall 412 by an amount equal to the powder layer thickness. In this way, for example, a space with a consistent thickness equal to powder layer thickness 423 can be created over the top of build piece 409 and powder bed 421.

Figure 4C:
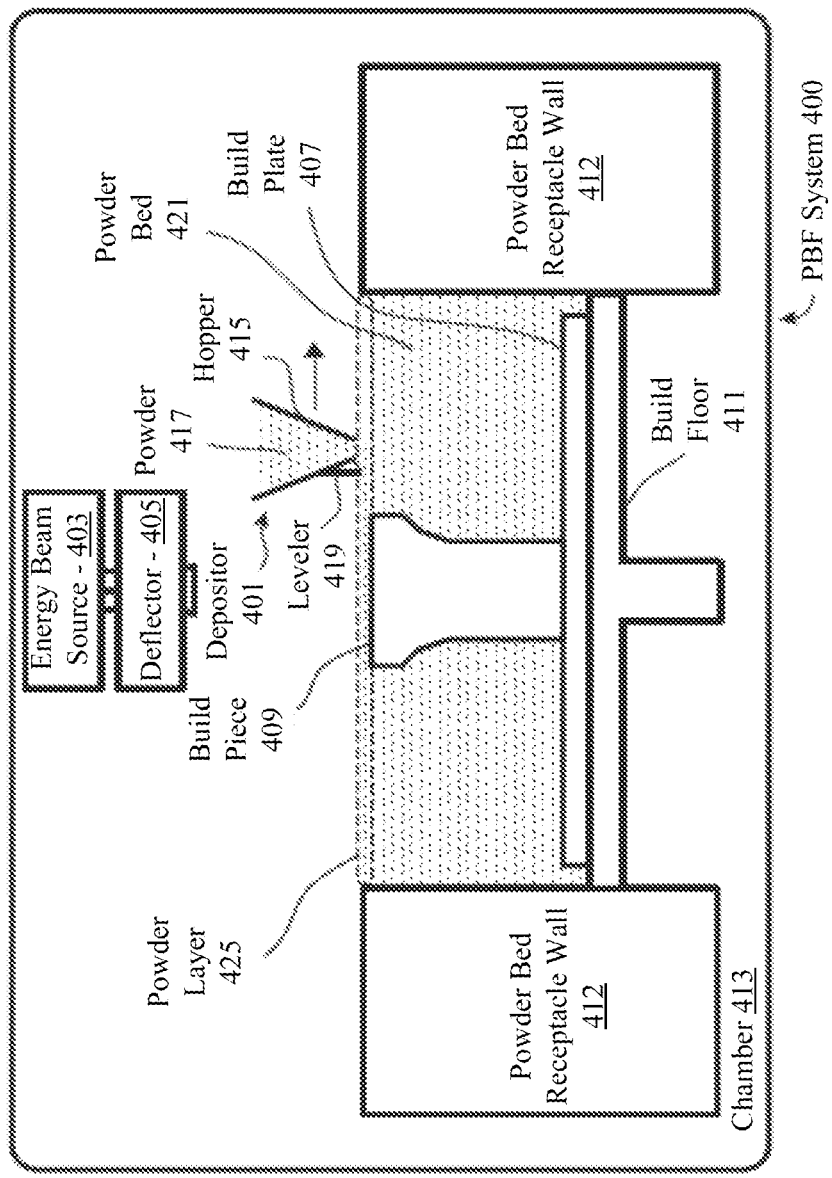

FIG. 4C shows PBF system 400 at a stage in which depositor 401 is positioned to deposit powder 417 in a space created over the top surfaces of build piece 409 and powder bed 421 and bounded by powder bed receptacle walls 412. In this example, depositor 401 progressively moves over the defined space while releasing powder 417 from hopper 415. Leveler 419 can level the released powder to form a powder layer 425 that has a thickness substantially equal to the powder layer thickness 423 (see FIG. 4B). Thus, the powder in a PBF system can be supported by a powder support structure, which can include, for example, a build plate 407, a build floor 411, a build piece 409, walls 412, and the like. It should be noted that the illustrated thickness of powder layer 425 (i.e., powder layer thickness 423 (FIG. 4B)) is greater than an actual thickness used for the example involving 150 previously deposited layers discussed above with reference to FIG. 4A.

Figure 4D:
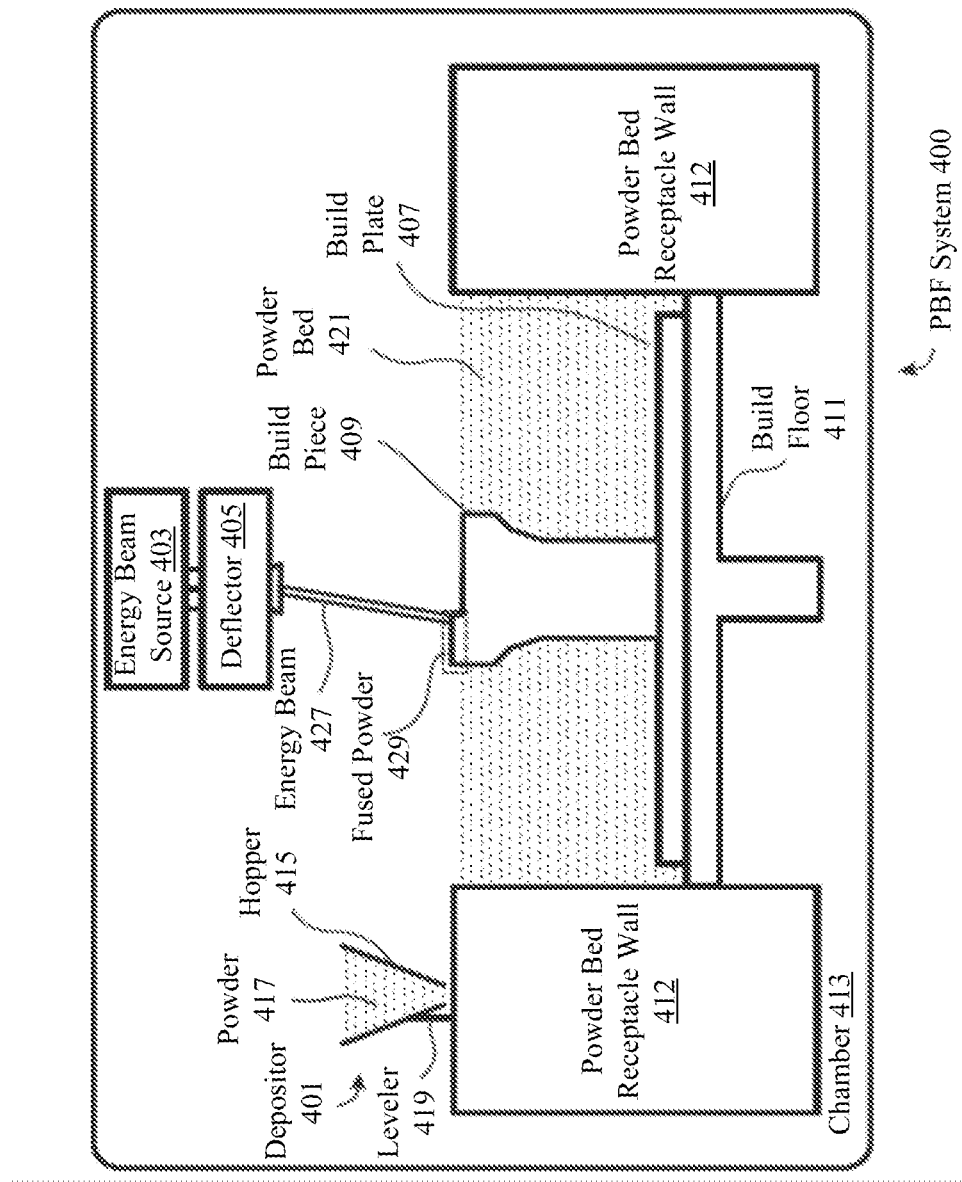

FIG. 4D shows PBF system 400 at a stage in which, following the deposition of powder layer 425 (FIG. 4C), energy beam source 403 generates an energy beam 427 and deflector 405 applies the energy beam to fuse the next slice in build piece 409. In various example embodiments, energy beam source 403 can be an electron beam source, in which case energy beam 427 constitutes an electron beam. Deflector 405 can include deflection plates that can generate an electric field or a magnetic field that selectively deflects the electron beam to cause the electron beam to scan across areas designated to be fused. In various embodiments, energy beam source 403 can be a laser, in which case energy beam 427 is a laser beam. Deflector 405 can include an optical system that uses reflection and/or refraction to manipulate the laser beam to scan selected areas to be fused.

In various embodiments, deflector 405 can include one or more gimbals and actuators that can rotate and/or translate the energy beam source to position the energy beam. In various embodiments, energy beam source 403 and/or deflector 405 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Turning now to FIGS. 5 through 10, various embodiments are provided for controlling robots to assemble at least a portion of a vehicle by joining at least two structures without the use of fixtures. At least one of the at least two structures may be additively manufactured, e.g., as described with respect to FIGS. 2, 3, and 4A through 4D, above. In some embodiments, at least one of the at least two structures may be a piece, part, node, component, and/or other additively manufactured structure, which may include two structures that previously have been joined. For example, a structure or a part may be at least a portion or section associated with a vehicle, such as a vehicle chassis, panel, base piece, body, frame, and/or another vehicle component.

According to various embodiments, such structures to be joined in association with assembly of a vehicle may be additively manufactured with one or more features that may facilitate or enable various assembly operations (e.g., joining) without the use of fixtures, such as one or more features to prevent or reduce unintended movement of a structure and/or deflection of the structure during one or more fixtureless assembly operations. For example, one or more structures to be joined in association with fixtureless assembly of a vehicle may be additively manufactured with one or more features designed to provide stability, strength, and/or rigidity during various fixtureless assembly operations. Examples of such features may include mesh, honeycomb, and/or lattice substructures, which may be co-printed with a structure (e.g., when the structure is additively manufactured) and which may be internal and/or external to the structure.

According to various embodiments described herein, an assembly system may include two robots, at least one of which may be positioned to join one structure with another structure without the use of fixtures. Various assembly operations may be performed, potentially repeatedly, so that multiple structures may be joined for fixtureless assembly of at least a portion of a vehicle (e.g., vehicle chassis, body, panel, and the like).

A first robot may be configured to engage with and retain a first structure to which one or more other structures may be joined during various operations performed in association with fixtureless assembly of at least a portion of a vehicle. For example, the first structure may be a section of a vehicle chassis, panel, base piece, body, frame, etc., whereas other structures may be other sections of the vehicle chassis, panel, base piece, body, frame, etc.

Illustratively, the first robot may engage and retain a first structure that is to be joined with a second structure, and the second structure may be engaged and retained by a second robot. Various operations performed with the first structure (e.g., joining the first structure with one or more other structures, which may include two or more previously joined structures) may be performed at least partially within an assembly cell that includes a plurality of robots. Accordingly, at least one of the robots may be directed (e.g., controlled) during a fixtureless operation with the first structure in order to function in accordance with precision commensurate with the fixtureless operation.

The present disclosure provides various different embodiments of directing one or more robots at least partially within an assembly system for assembly operations (including pre- and/or post-assembly operations). It will be appreciated that various embodiments described herein may be practiced together. For example, an embodiment described with respect to one illustration of the present disclosure may be implemented in another embodiment described with respect to another illustration of the present disclosure.

Figure 5:
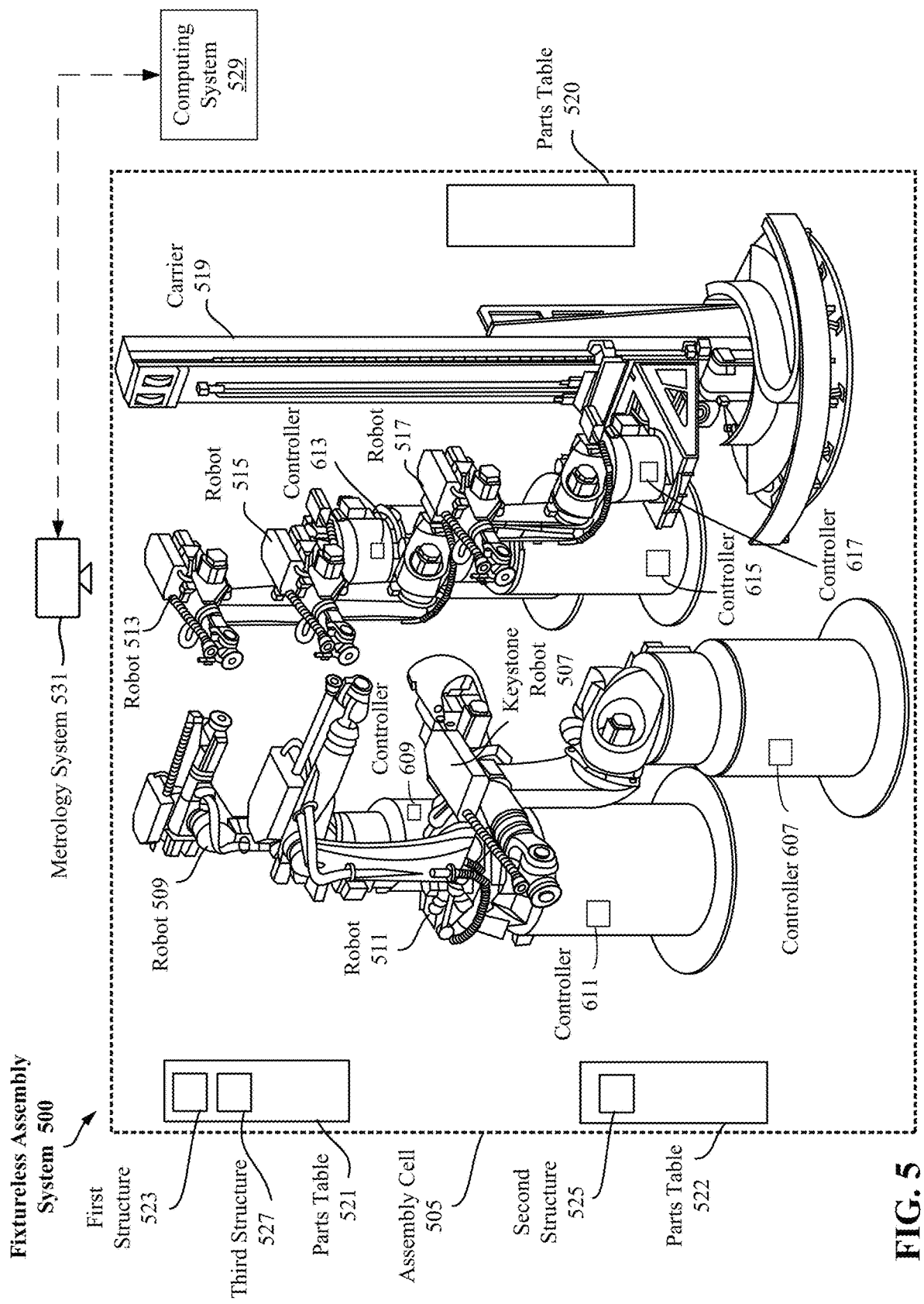
FIG. 5 illustrates a perspective view of an example assembly system, which includes a plurality of robots configured to assemble at least a portion of a vehicle.

First with reference to FIG. 5, the figure illustrates a perspective view of a fixtureless assembly system 500. Fixtureless assembly system 500 may be employed in various operations associated with fixtureless assembly of a vehicle, such as robotic assembly of a node-based vehicle. Fixtureless assembly system 500 may include one or more elements associated with at least a portion of the assembly of a vehicle without any fixtures. For example, one or more elements of fixtureless assembly system 500 may be configured for one or more operations in which a first structure is joined with one or more other structures without the use of any fixtures during robotic assembly of a node-based vehicle.

An assembly cell 505 may be configured at the location of fixtureless assembly system 500. Assembly cell 505 may be a vertical assembly cell. Within assembly cell 505, fixtureless assembly system 500 may include a set of robots 507, 509, 511, 513, 515, 517. Robot 507 may be referred to as a "keystone robot." Fixtureless assembly system 500 may include parts tables 520, 521, and 522 that can hold parts and structures for the robots to access. For example, a first structure 523, a second structure 525, and a third structure 527 may be positioned on one of parts tables 521, 522 to be picked up by the robots and assembled together. In various embodiments, each of the structures can weigh at least 10 g, 100 g, 500 g, 1 kg, 5 kg, 10 kg, or more. In various embodiments, each of the structures can have a volume of at least 10 ml, 100 ml, 500 ml, 1000 ml, 5000 ml, 10,000 ml, or more. In various embodiments, one or more of the structures can be an additively manufactured structure, such as a complex node.

Fixtureless assembly system 500 may also include a computing system 529 to issue commands to the various controllers of the robots of assembly cell 505, as described in more detail below. In this example, computing system 529 is communicatively connected to the robots through a wireless communication. Fixtureless assembly system 500 may also include a metrology system 531 that can accurately measure the positions of the robotic arms of the robots and/or the structures held by the robots, as described in more detail below.

In contrast to conventional robotic assembly factories, structures can be assembled without fixtures in fixtureless assembly system 500. For example, structures need not be connected within any fixtures, such as the fixtures described above. Instead, at least one of the robots in assembly cell 505 may provide the functionality expected from fixtures, as described in this disclosure. For example, robots may be configured to directly contact (e.g., using an end effector of a robotic arm) structures to be assembled within assembly cell 505 so that those structures may be engaged and retained without any fixtures. Further, at least one of the robots may provide the functionality expected from the positioner and/or fixture table. For example, keystone robot 507 may replace a positioner and/or fixture table in fixtureless assembly system 500.

Keystone robot 507 may include a base and a robotic arm (see, e.g., FIGS. 6B and 6C, described below). The robotic arm may be configured for movement, which may be directed by computer-executable instructions loaded into a processor communicatively connected with keystone robot 507. Keystone robot 507 may contact a surface of assembly cell 505 (e.g., a floor of the assembly cell) through the base.

Keystone robot 507 may include and/or be connected with an end effector that is configured to engage and retain a structure, e.g., a portion of a vehicle. An end effector may be a component configured to interface with at least one structure. Examples of the end effectors may include jaws, grippers, pins, or other similar components capable of facilitating fixtureless engagement and retention of a structure by a robot. In some embodiments, the structure may be a section of a vehicle chassis, body, frame, panel, base piece, and the like. For example, the structure may comprise a floor panel.

In some embodiments, keystone robot 507 may retain the connection with a structure through an end effector (e.g., second structure 525 and end effector 543 illustrated in FIG. 6C and described in more detail below) while a set of other structures is connected (either directly or indirectly) to the structure. Keystone robot 507 may be configured to engage and retain the structure without any fixtures—e.g., none of the fixtures described above may be present in fixtureless assembly system 500. In some embodiments, structures to be retained by at least one of the robots (e.g., the first structure) may be additively manufactured or co-printed with one or more features that facilitate engagement and retention of those structures by the at least one of the robots without the use of any fixtures.

For example, a structure may be co-printed or additively manufactured with one or more features that increase the strength of the structure, such as a mesh, honeycomb, and/or lattice arrangement. Such features may stiffen the structure to prevent unintended movement of the structure during the assembly process. In another example, a structure may be co-printed or additively manufactured with one or more features that facilitates engagement and retention of the structure by an end effector, such as protrusion(s) and/or recess(es) suitable to be engaged (e.g., "gripped") by an end effector. The aforementioned features of a structure may be co-printed with the structure and therefore may be of the same material(s) as the structure.

In retaining the structure, keystone robot 507 may position (e.g., move) the structure; that is, the position of the structure may be controlled by keystone robot 507 when retained by the keystone robot. Keystone robot 507 may retain the structure by "holding" or "grasping" the structure, e.g., using an end effector of a robotic arm of the keystone robot. For example, keystone robot 507 may retain the structure by causing gripper fingers, jaws, and the like to contact one or more surfaces of the structure and apply sufficient pressure thereto such that the keystone robot controls the position of the structure. That is, the structure may be prevented from moving freely in space when retained by keystone robot 507, and movement of the structure may be constrained by the keystone robot. As described above, the structure may include one or more features that facilitates the fixtureless engagement and retention of the structure by keystone robot 507.

As other structures (including subassemblies, substructures of structures, etc.) are connected to the structure, keystone robot 507 may retain the engagement with the structure through the end effector. The aggregate of the structure and one or more structures connected thereto may be referred to as a structure itself, but may also be referred to as an "assembly" or a "subassembly." Keystone robot 507 may retain an engagement with an assembly once the keystone robot has engaged the structure.

In some embodiments, robots 509 and 511 of assembly cell 505 may be similar to keystone robot 507 and, thus, may include respective end effectors configured to engage with structures that may be connected with the structure retained by the keystone robot. In some embodiments, robots 509, 511 may be referred to as "assembly robots" and/or "materials handling robots."

In some embodiments, robot 513 of assembly cell 505 may be used to affect a structural connection between structures. In the illustrative example of FIGS. 6A through 6V, robot 513 may be referred to as a "structural adhesive robot." Structural adhesive robot 513 may be similar to the keystone robot 507, except the structural adhesive robot may include a tool at the distal end of the robotic arm that is configured to apply structural adhesive to at least one surface of structures fixturelessly retained by the keystone robot and structures fixturelessly retained by assembly robots 509, 511 before or after the structures are positioned at joining proximities with respect to other structures for joining with the other structures. The joining proximity can be a position that allows a first structure to be joined to a second structure. For example, in various embodiments, the first and second structures may be joined though the application of an adhesive while the structures are within the joining proximity and subsequent curing of the adhesive.

However, structural adhesives might take a relatively long time to cure. If this is the case, the robots retaining the first and second structures, for example, might have to hold the structures at the joining proximity for a long time in order for the structures to be joined by the structural adhesive once it finally cures. This would prevent the robots from being used for other tasks, such as continuing to pick up and assemble structures, for a long time while the structural adhesive cures. In order to allow more efficient use of the robots, for example, in various embodiments a quick-cure adhesive may be additionally applied to join the structures quickly and retain the structures so that the structural adhesive can cure without requiring both robots to hold the structures.

In this regard, robot 515 of fixtureless assembly system 500 may be used to apply quick-cure adhesive and to cure the adhesive quickly. In this example embodiment, a quick-cure UV adhesive may be used, and robot 515 may be referred to as a "UV robot." UV robot 515 may be similar to keystone robot 507, except the UV robot may include a tool at the distal end of the robotic arm that is configured to apply a quick-cure UV adhesive and to cure the adhesive, e.g., when a first structure is positioned within the joining proximity with respect to a second structure. That is, UV robot 515 may cure an adhesive after the adhesive is applied to the first structure and/or second structure when the structures are within the joining proximity obtained through direction of at least one of the robotic arms of keystone robot 507 and/or assembly robots 509, 511.

In contrast to various other assembly systems that may include a positioner and/or fixture table, described above, the use of a curable adhesive (e.g., quick-cure adhesive) may provide a partial adhesive bond that provides a way to retain the first and second structures during the joining process without the use of fixtures. The partial adhesive bond may provide one way to replace various fixtures that would otherwise be employed for engagement and retention of structures in an assembly system that, for example, uses a positioner and/or fixture table. Another potential benefit of fixtureless assembly, particularly using a curable adhesive, is improved access to various structures of a structural assembly in comparison with the use of fixtures and/or other part-retention tools, which inherently occlude access to sections of the structures to which they are attached.

Moreover, at least partially replacing fixtures and/or other part-retention tools with curable adhesives may provide a more reliable connection at one or more locations on a structural assembly in need of support—particularly where such locations in need of support are rendered nearly or entirely inaccessible by the fixtures and/or other part-retention tools. In addition, at least partially replacing fixtures and/or other part-retention tools with curable adhesives may provide the ability to add more structures to a structural assembly before application of a (permanent) structural adhesive—particularly where fixtures and/or other part-retention tools would hinder access for joining additional structures.

In various embodiments, a robot may be used for multiple different roles. For example, robot 517 may perform the role of an assembly robot, such as assembly robots 509, 511, and the role of a UV robot, such as UV robot 515. In this regard, robot 517 may be referred to as an "assembly/UV robot." Assembly/UV robot 517 may offer functionality similar to each of the assembly robots 509, 511 when the distal end of the robotic arm of the assembly/UV robot includes an end effector (e.g., connected by means of a tool flange). However, assembly/UV robot 517 may offer functionality similar to UV robot 515 when the distal end of the robotic arm of the assembly/UV robot includes a tool configured to applied UV adhesive and to emit UV light to cure the UV adhesive.

The quick-cure adhesive applied by UV robot 515 and assembly/UV robot 517 may provide a partial adhesive bond in that the adhesive may retain the relative positions of a first structure and a second structure within the joining proximity until the structural adhesive may be applied and/or cured to permanently join the first structure and the second structure, after which the adhesive providing the partial adhesive bond may be removed (e.g., as with temporary adhesives) or not (e.g., as with complementary adhesives).

In fixtureless assembly system 500, at least one surface of the first structure and/or second structure to which adhesive is to be applied may be determined based on gravity and/or other forces that cause loads to be applied on various structures and/or connections of the assembly. Finite element method (FEM) analyses may be used to determine the at least one surface of the first structure and/or the second structure, as well as one or more discrete areas on the at least one surface, to which the adhesive is to be applied. For example, FEM analyses may indicate one or more connections of a structural assembly that may be unlikely or unable to support sections of the structural assembly disposed about the one or more connections.

In assembling at least a portion of a vehicle in assembly cell 505, the second structure may be joined directly to the first structure by directing the various fixtureless robots 507, 509, 511, 513, 515, 517 as described herein. Additional structures may be indirectly joined to the first structure. For example, the first structure may be directly joined to the second structure through movement(s) of keystone robot 507, structural adhesive robot 513, at least one assembly robot 509, 511, and/or UV robot 515. Thereafter, the first structure, joined with the second structure, may be indirectly joined to an additional structure as the additional structure is directly joined to the second structure. Thus, the first structure, which may continue to be retained by keystone robot 507, may evolve throughout an assembly process as additional structures are directly or indirectly joined to it.

In some embodiments, assembly robots 509, 511 may fixturelessly join two or more structures together, e.g., with a partial, quick-cure adhesive bond, before fixturelessly joining those two or more structures with the first structure retained by keystone robot 507. The two or more structures that are joined to one another prior to being joined with a structural assembly may also be a structure, and may further be referred to as a "subassembly." Accordingly, when a structure forms a portion of a structural subassembly that is connected with the first structure through movements of keystone robot 507, structural adhesive robot 513, at least one assembly robot 509, 511, and UV robot 515, a structure of the structural subassembly may be indirectly connected to the first structure when the structural subassembly is joined to a structural assembly including the first structure.

In some embodiments, the structural adhesive may be applied, e.g., deposited in a groove of one of the structures, before the first and second structures are brought within the joining proximity. For example, structural adhesive robot 513 may include a dispenser for a structural adhesive and may apply the structural adhesive prior to the structures being brought within the joining proximity. In some embodiments, a structural adhesive may be applied after a structural assembly is fully assembled, for example, once each structure of the portion of the vehicle is brought to their respective joining proximities and fixed relative to the joining proximities by applications of quick cure UV adhesive. For example, the structural adhesive may be applied to one or more joints or other connections between the first structure and the second structure. The structural adhesive may be applied at a time after the last adhesive curing by the UV robot 515 is performed. In some embodiments, the structural adhesive may be applied separately from fixtureless assembly system 500.

After the assembly is complete, i.e., all of the structures have been assembled, retained with a partial adhesive bond, e.g., with applications of quick cure UV adhesive, and with structural adhesive having been applied, the structural adhesive may be cured. Upon curing the structural adhesive, the portion of the vehicle may be completed and, therefore, may be suitable for use in the vehicle. For example, a completed structural assembly may meet any applicable industry and/or safety standards defined for consumer and/or commercial vehicles. In some embodiments, the adhesive applied by the UV robot 515 to achieve the partial adhesive bond for retaining the structures may be removed, for example, after the structural adhesive is cured. In some embodiments, the adhesive for the partial adhesive bond may be left attached to the structures.

According to various embodiments, one or more of robots 507, 509, 511, 513, 515, 517 may be secured to a surface of assembly cell 505 through a respective base of each of the robots. For example, one or more of the robots may have a base that is bolted to the floor of the assembly cell. In various other embodiments, one or more of the robots may include or may be connected with a component configured to move the robot within assembly cell 505. For example, a carrier 519 in assembly cell 505 may be connected to assembly/UV robot 517.

Figure 6A:
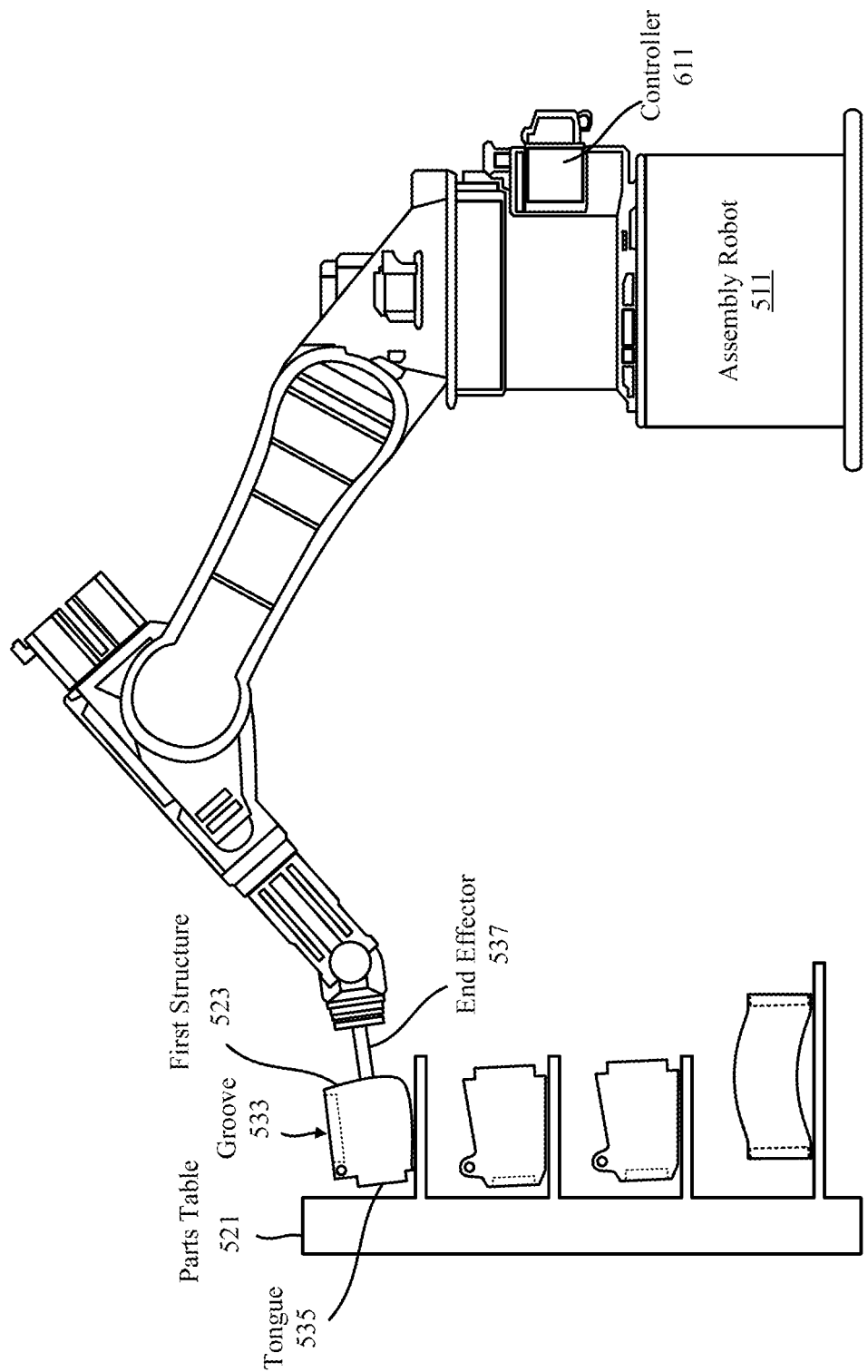
FIGS. 6A-6V illustrate perspective views of an example assembly system, which includes a plurality of robots configured to perform various example operations for assembly of at least a portion of a vehicle.
Figure 6B:
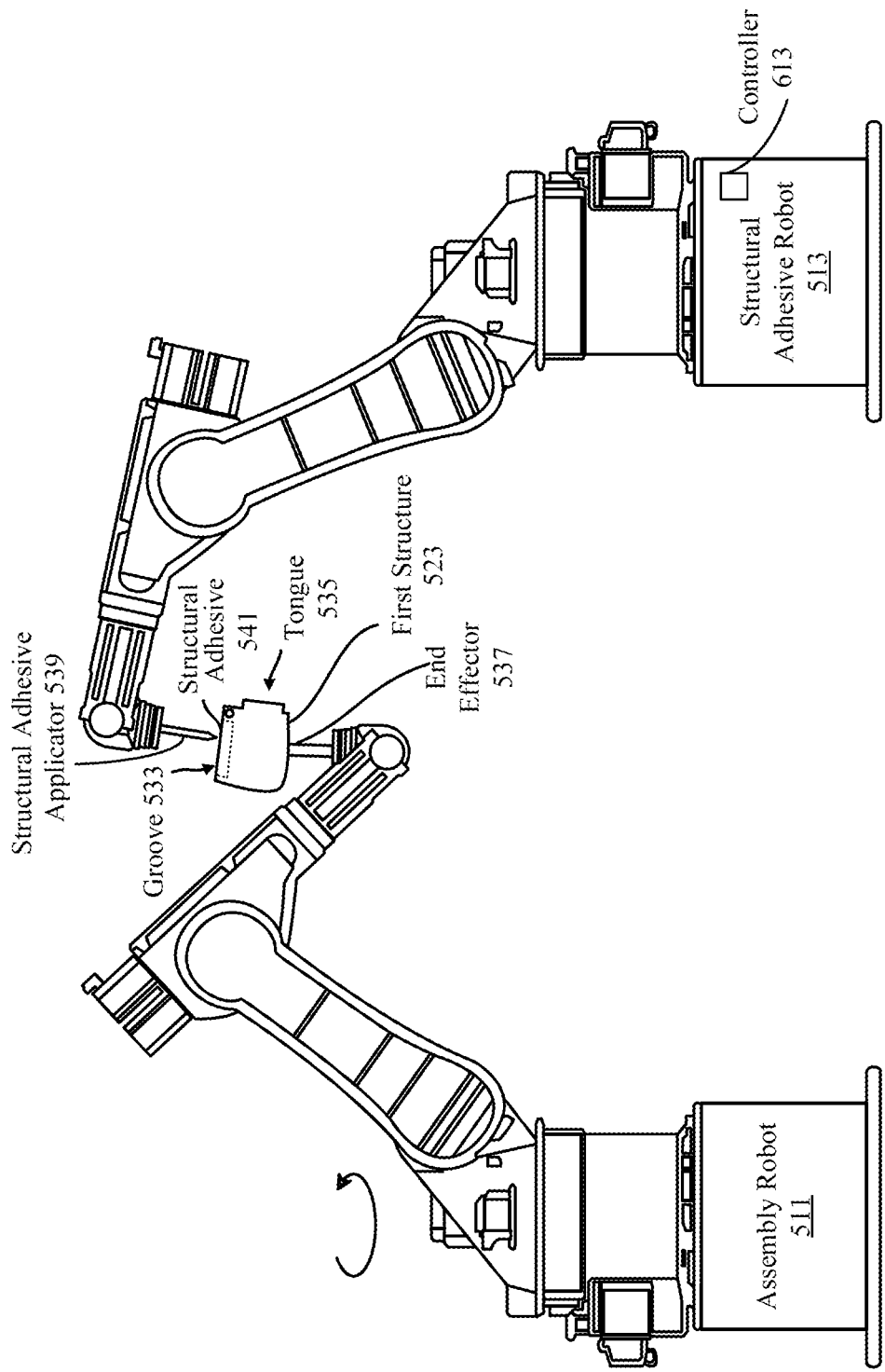
Figure 6C:
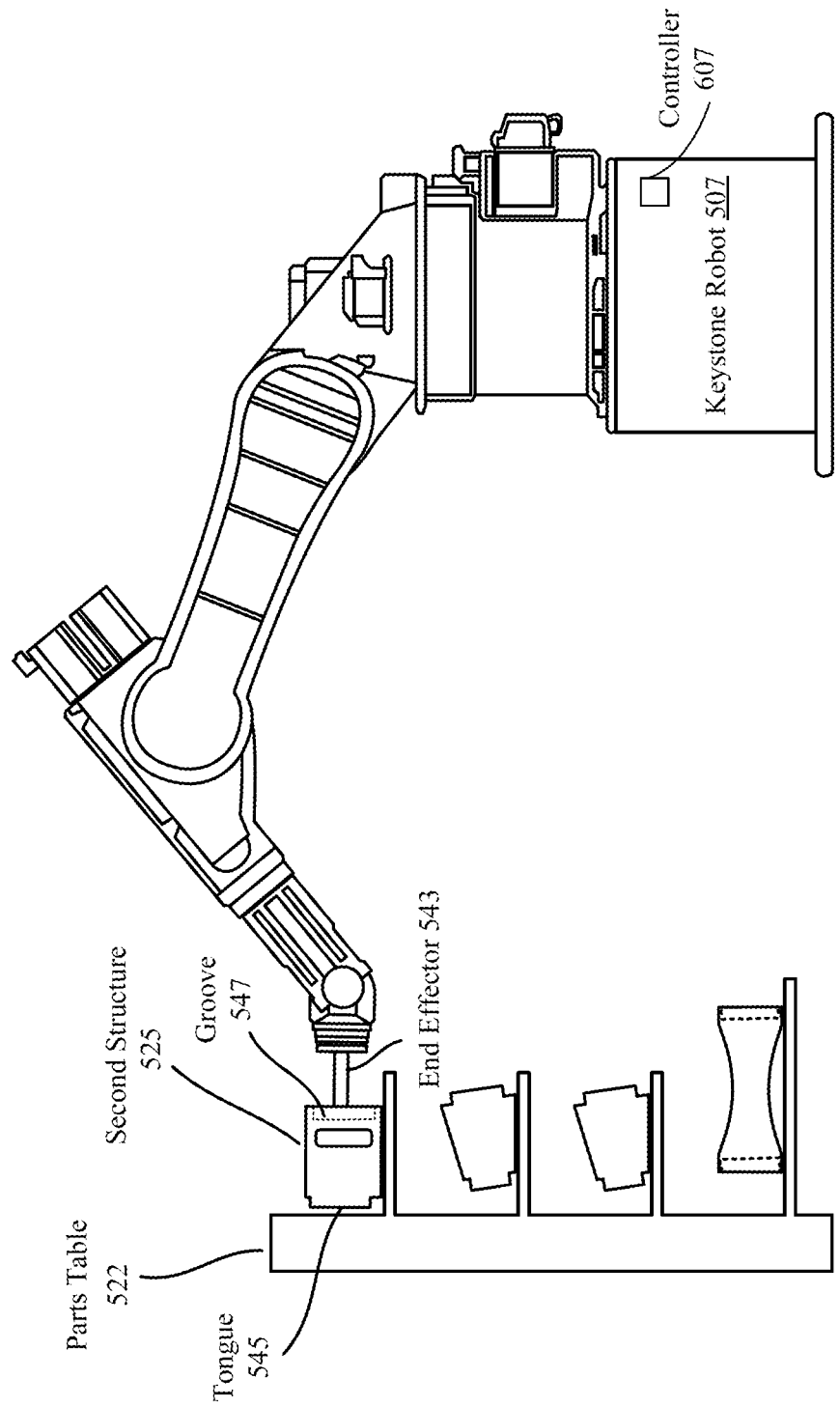
Figure 6D:
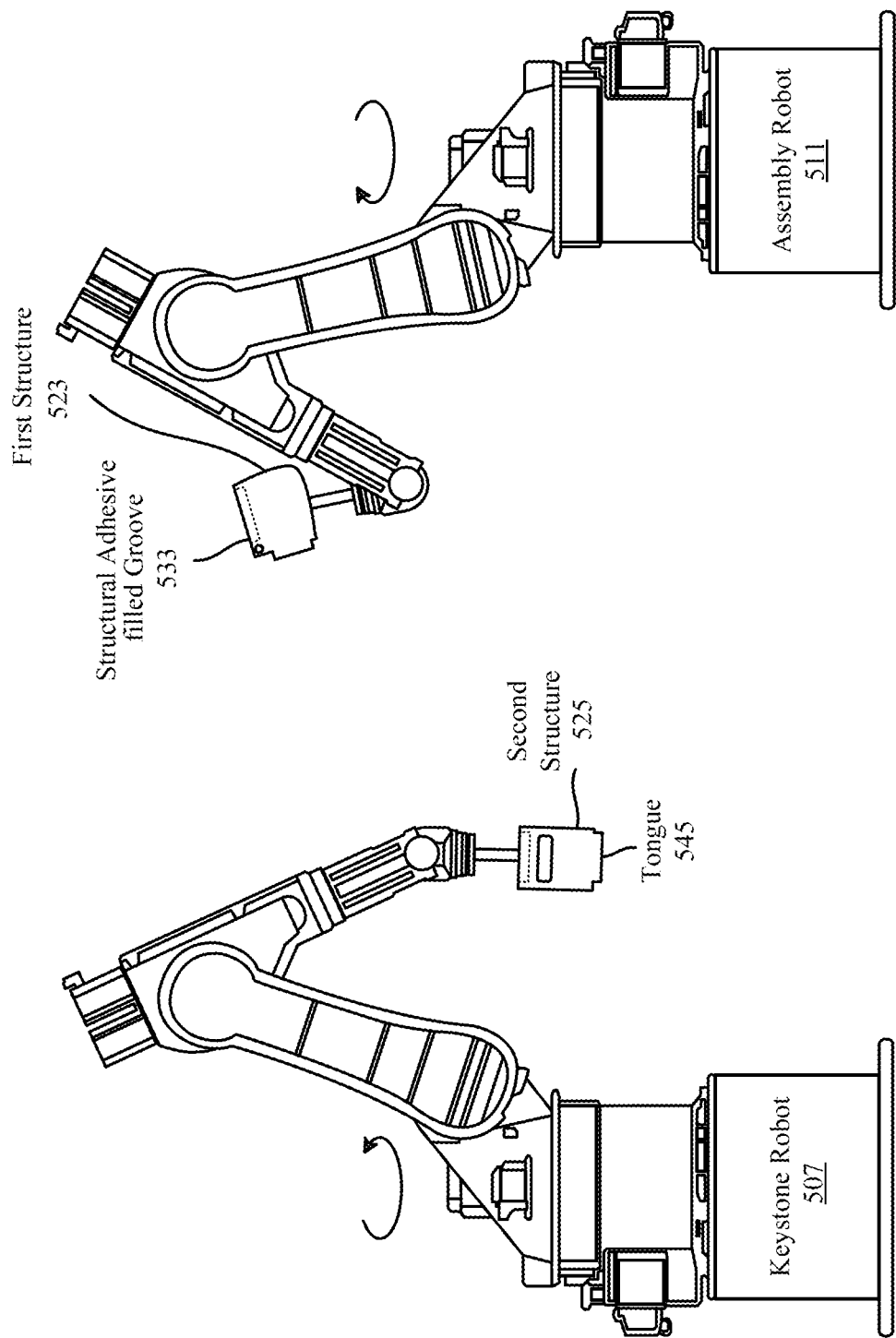
Figure 6E:
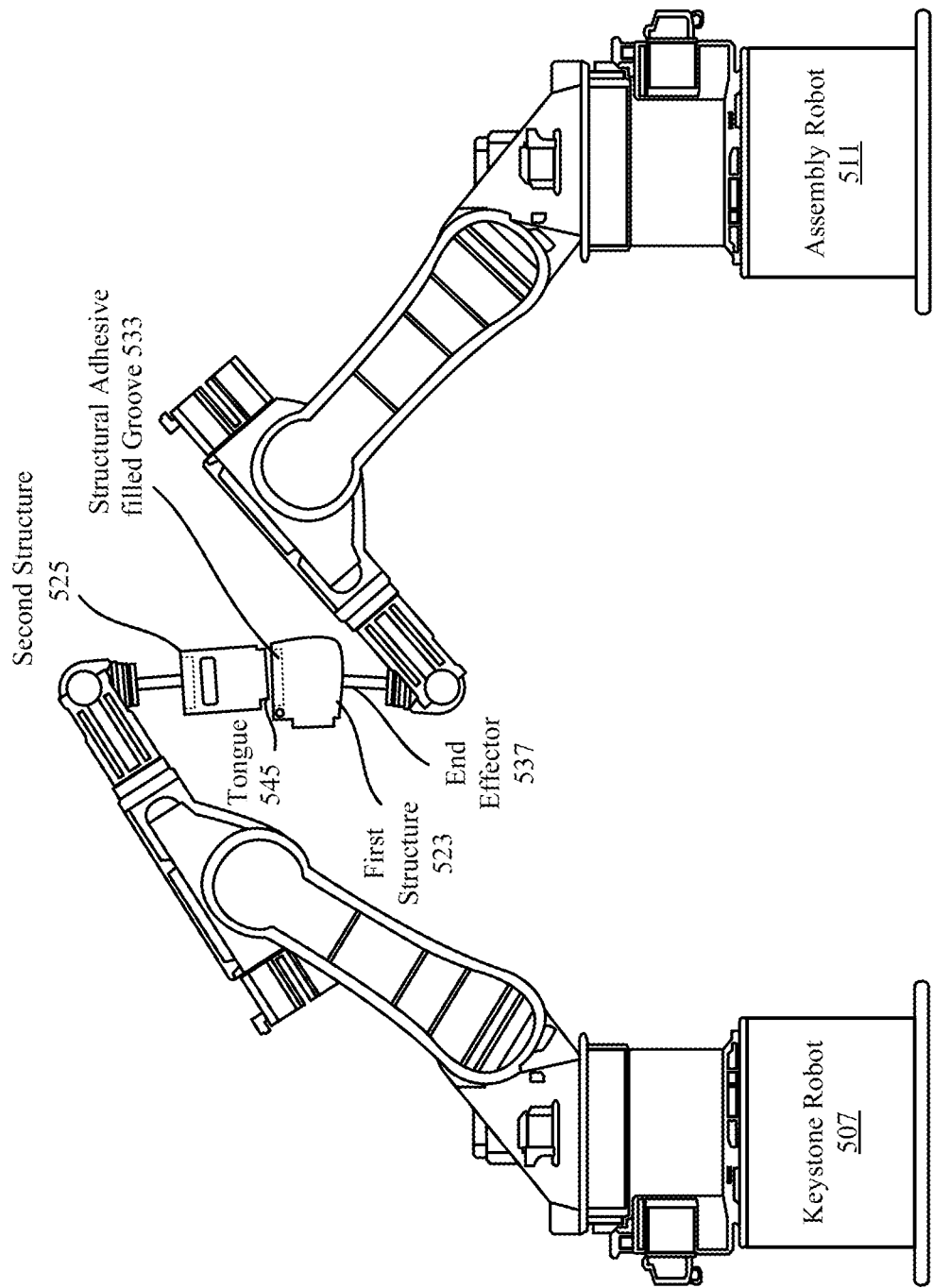
Figure 6F:
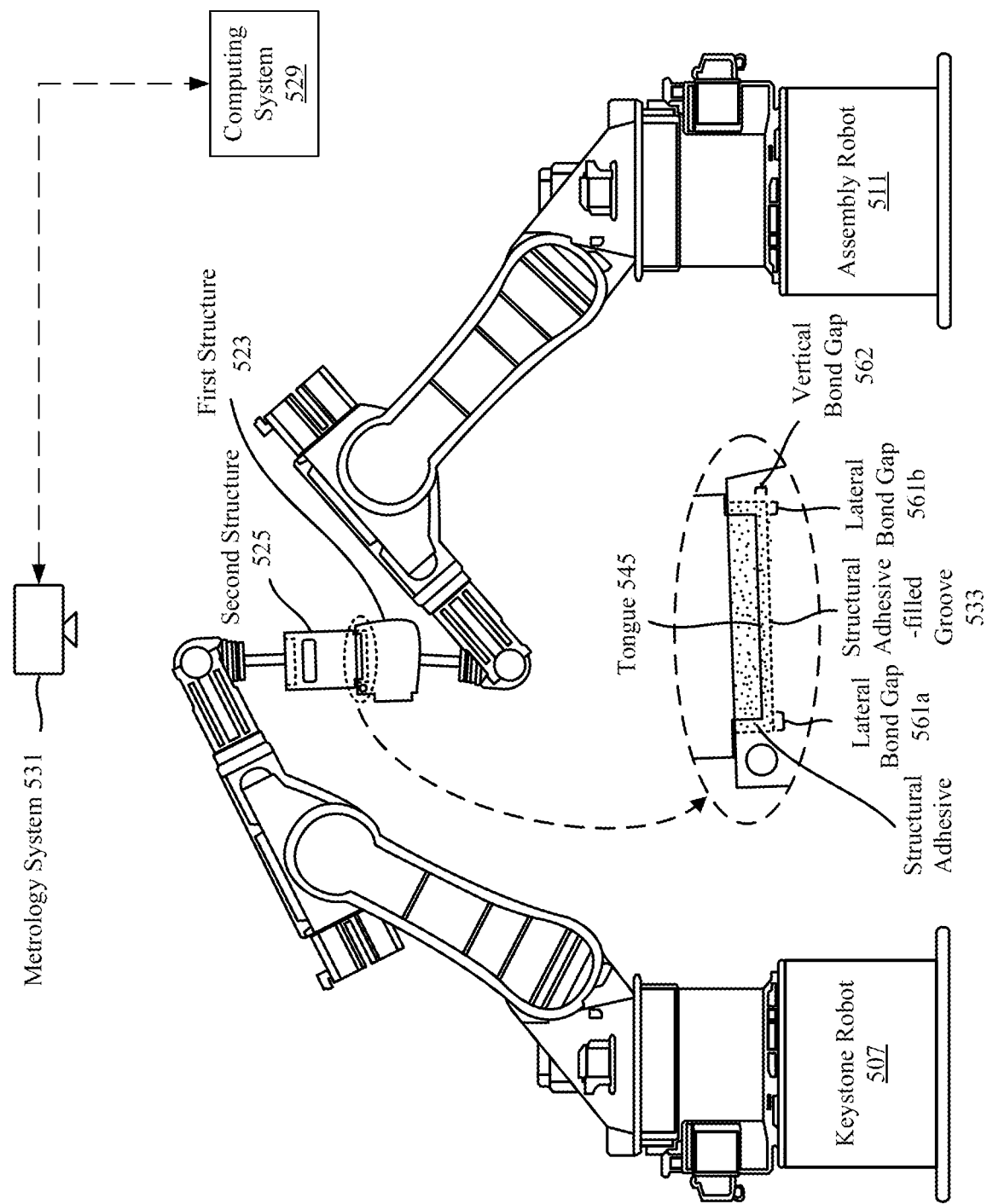
Figure 6G:
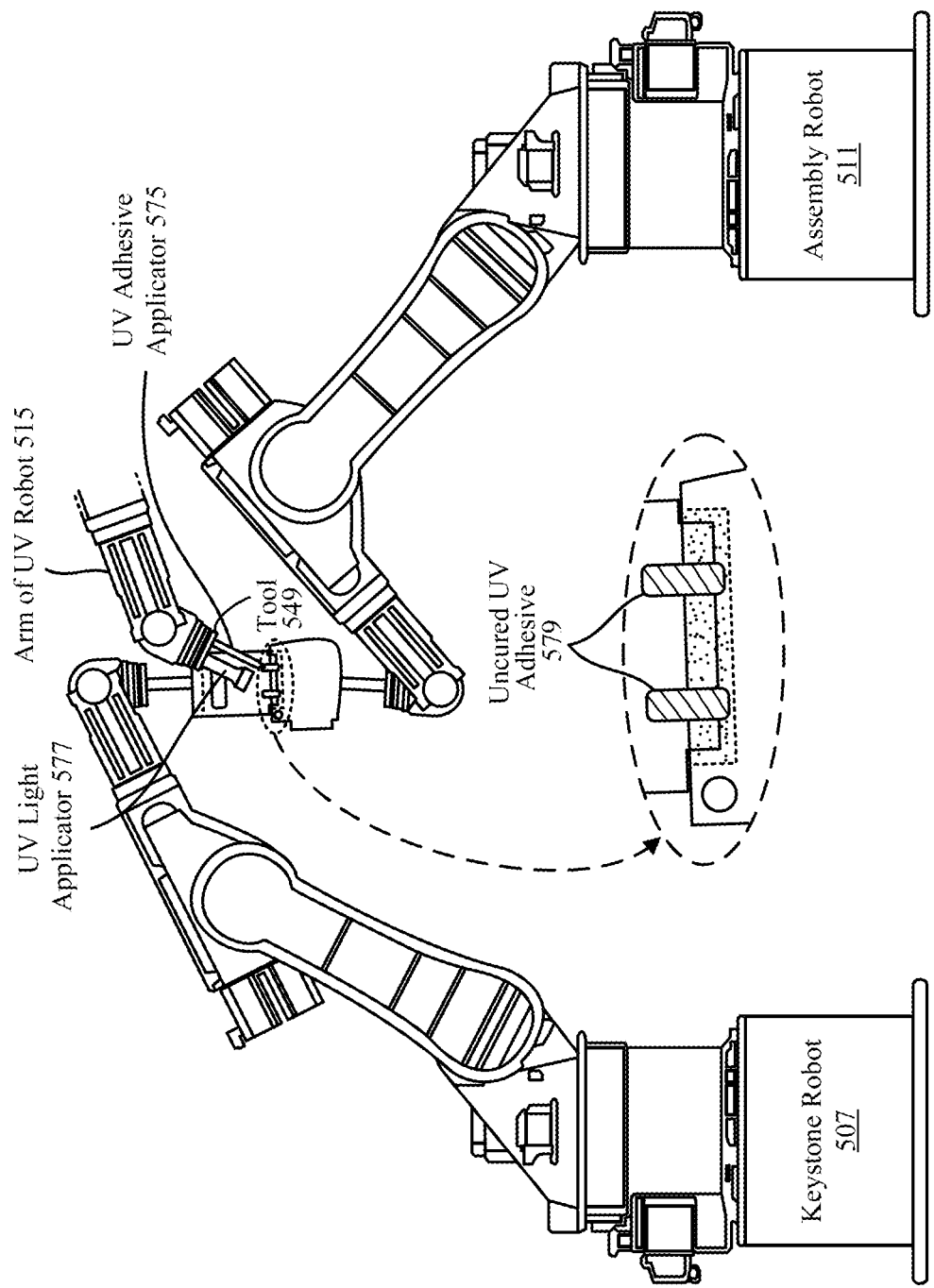
Figure 6H:
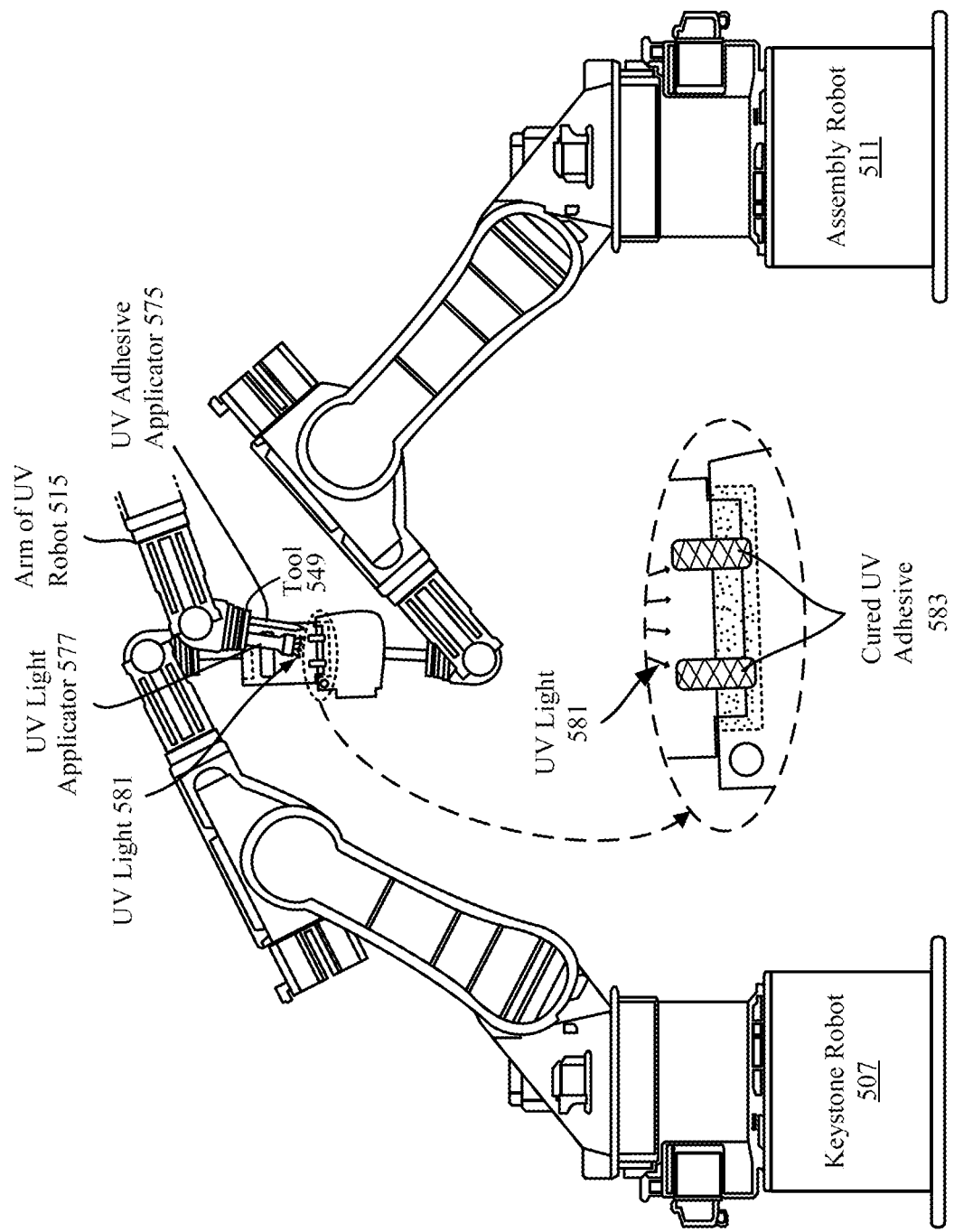
Figure 6I:
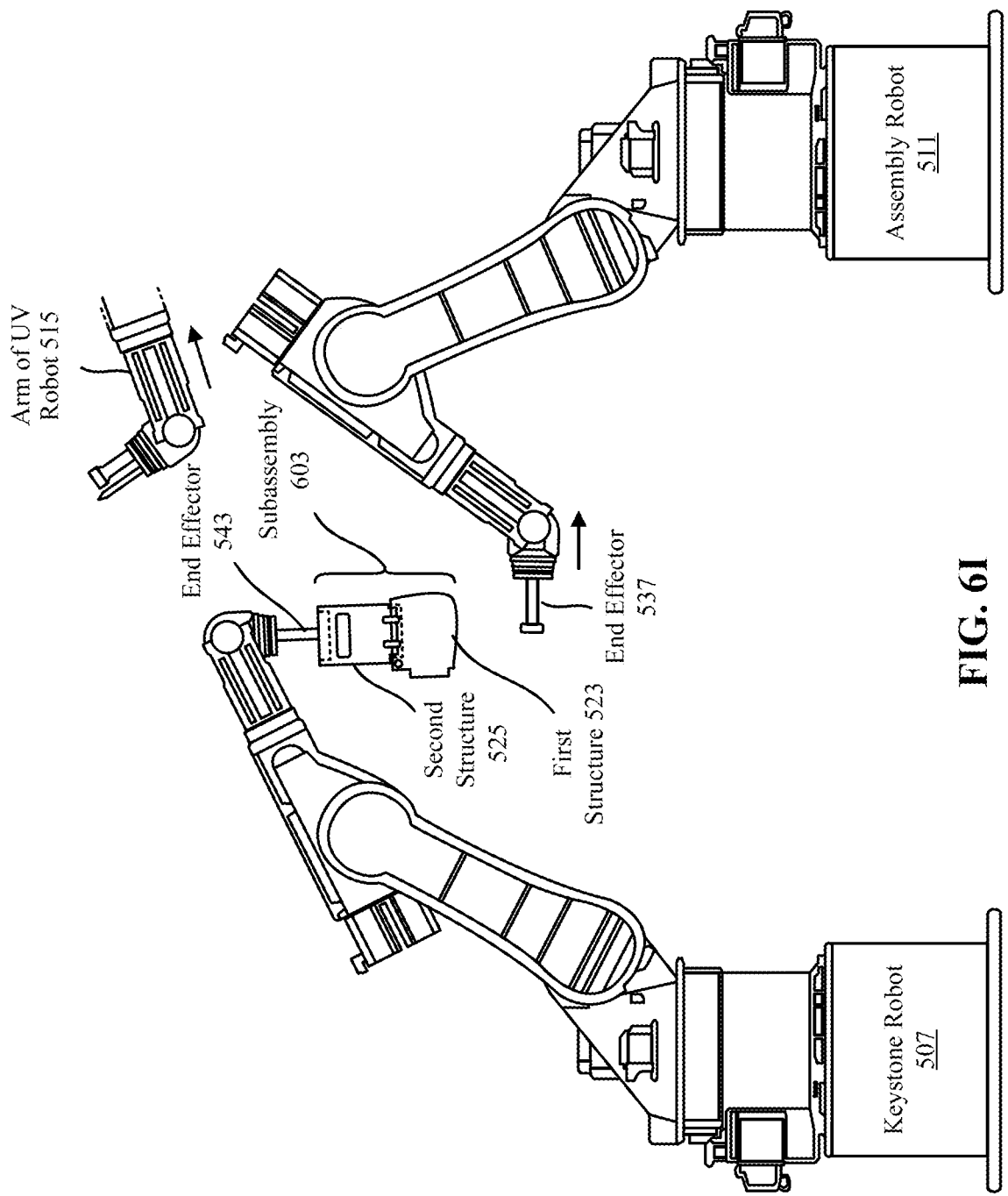
Figure 6J:
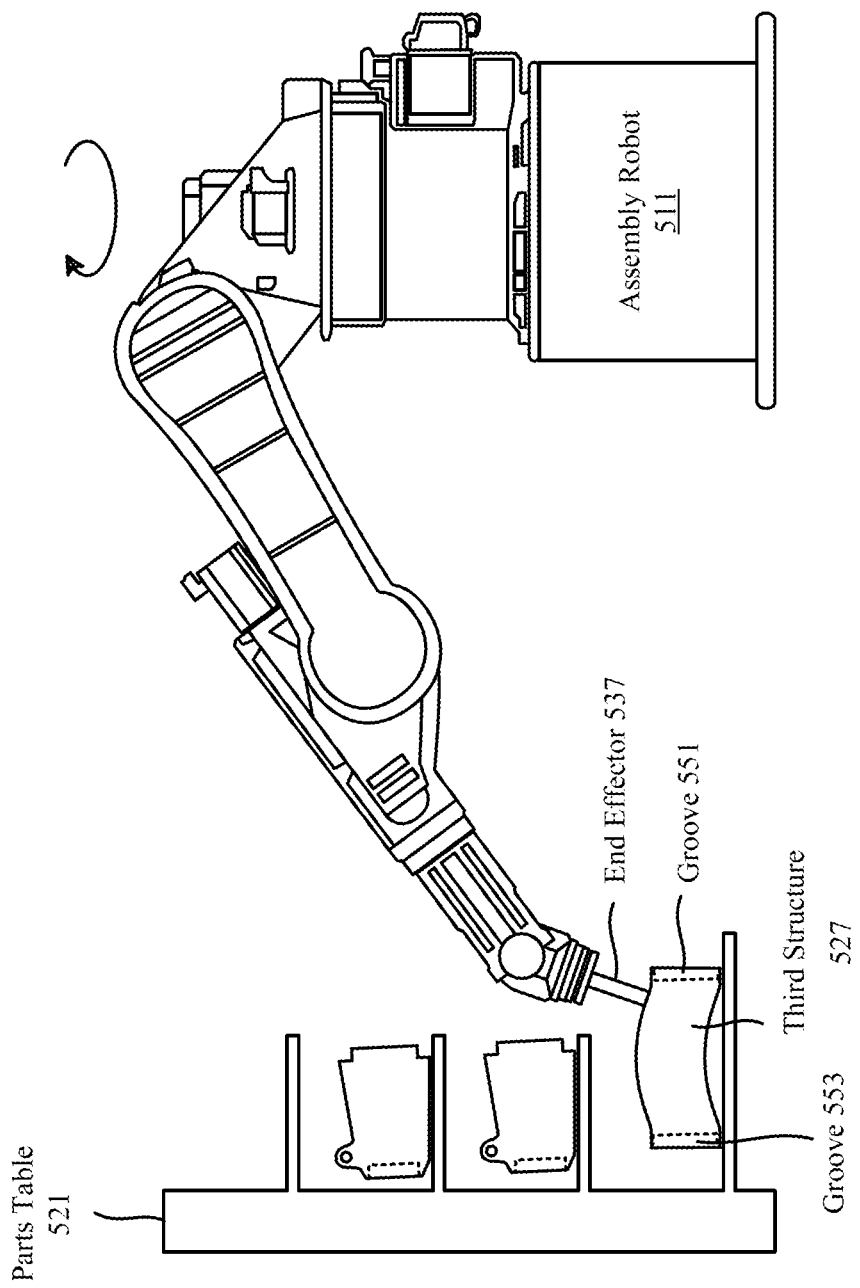
Figure 6K:
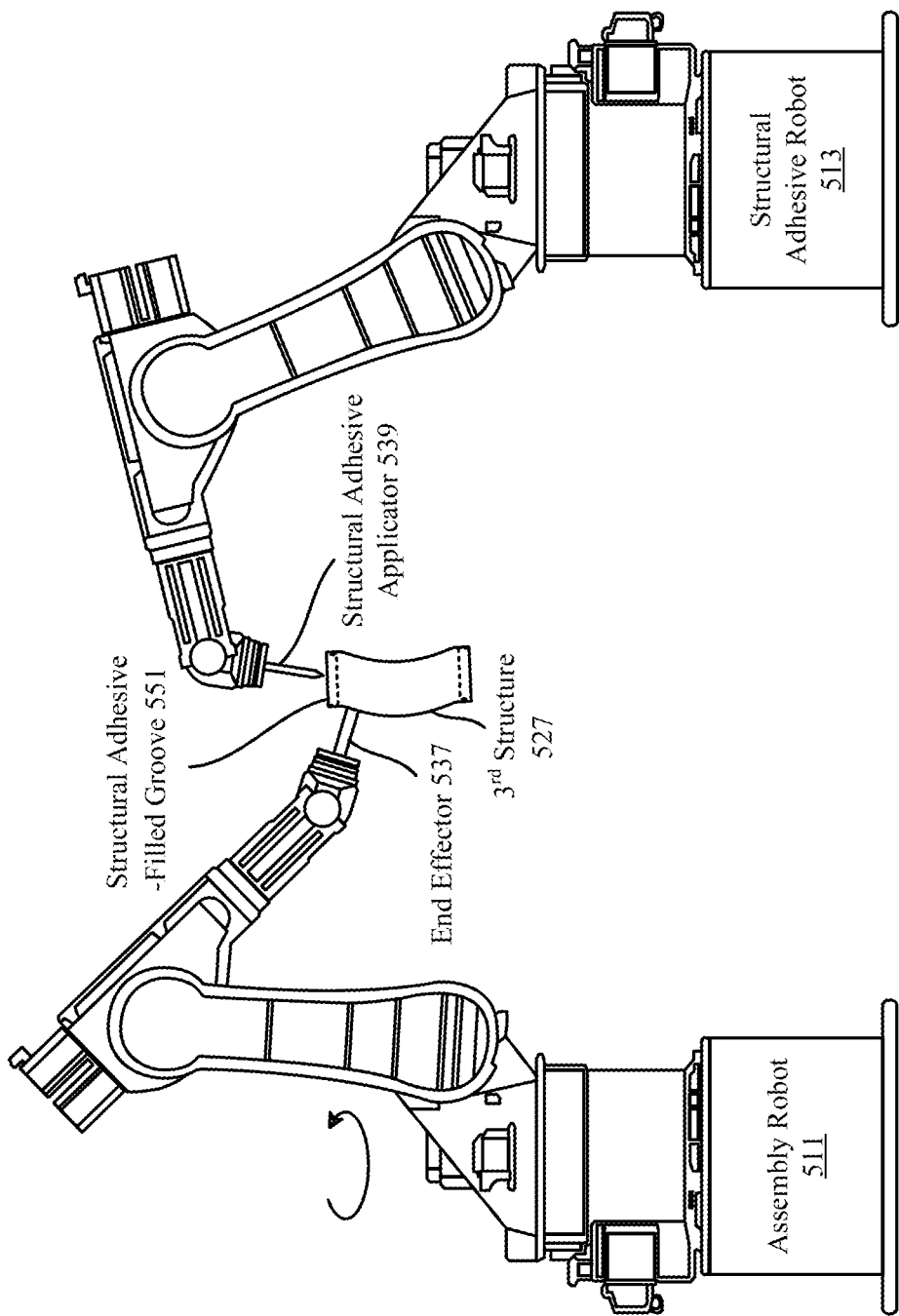
Figure 6L:
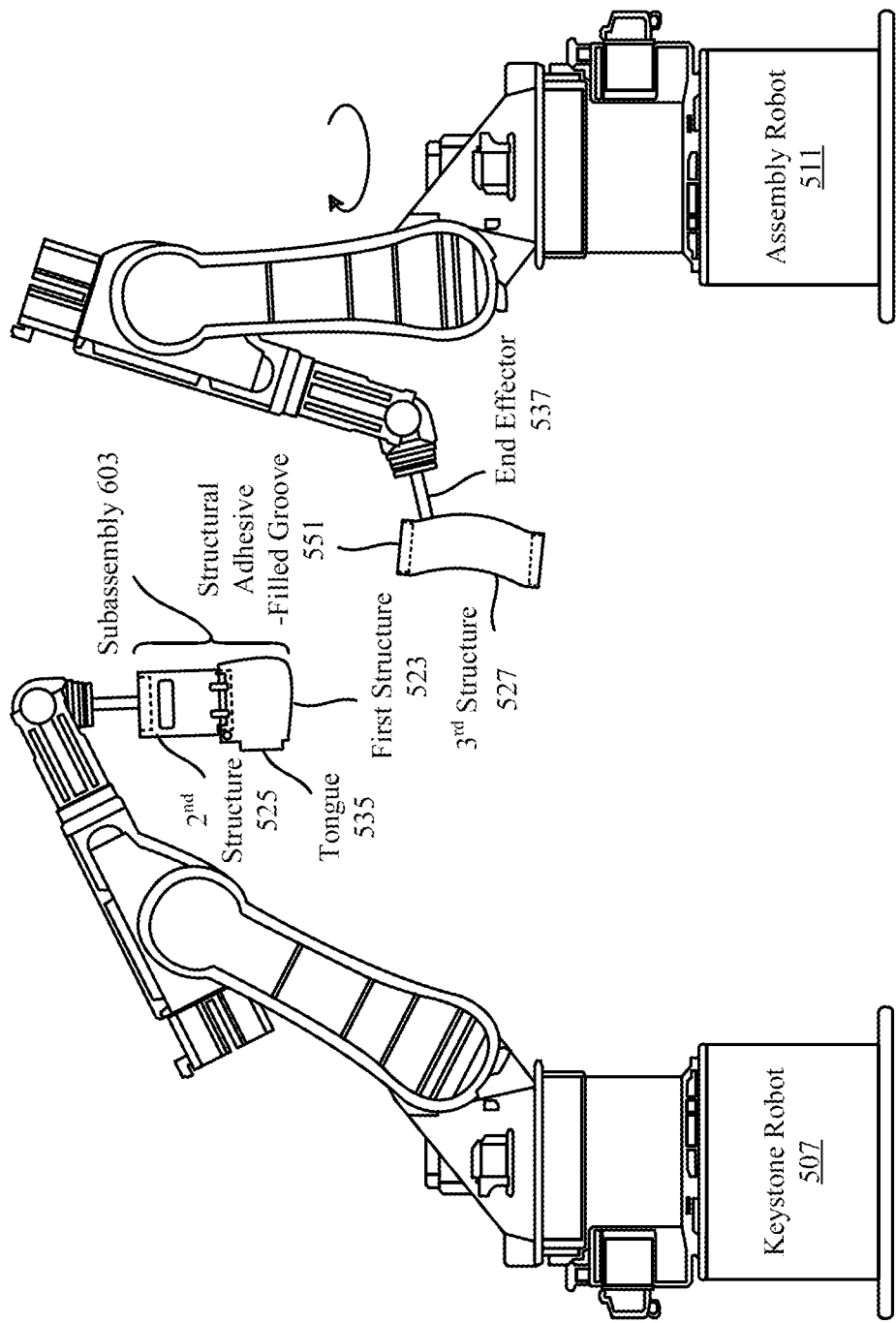
Figure 6M:
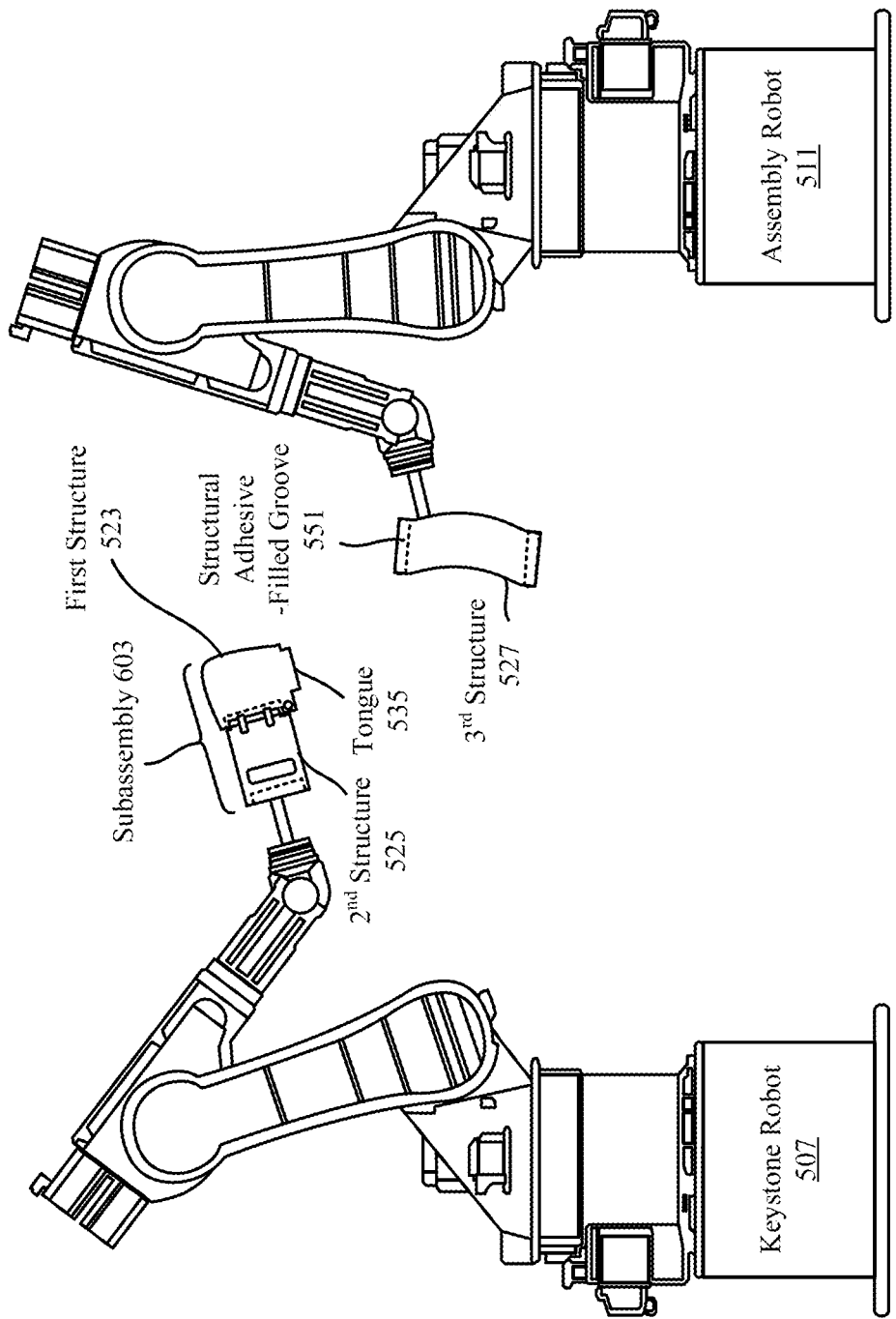
Figure 6N:
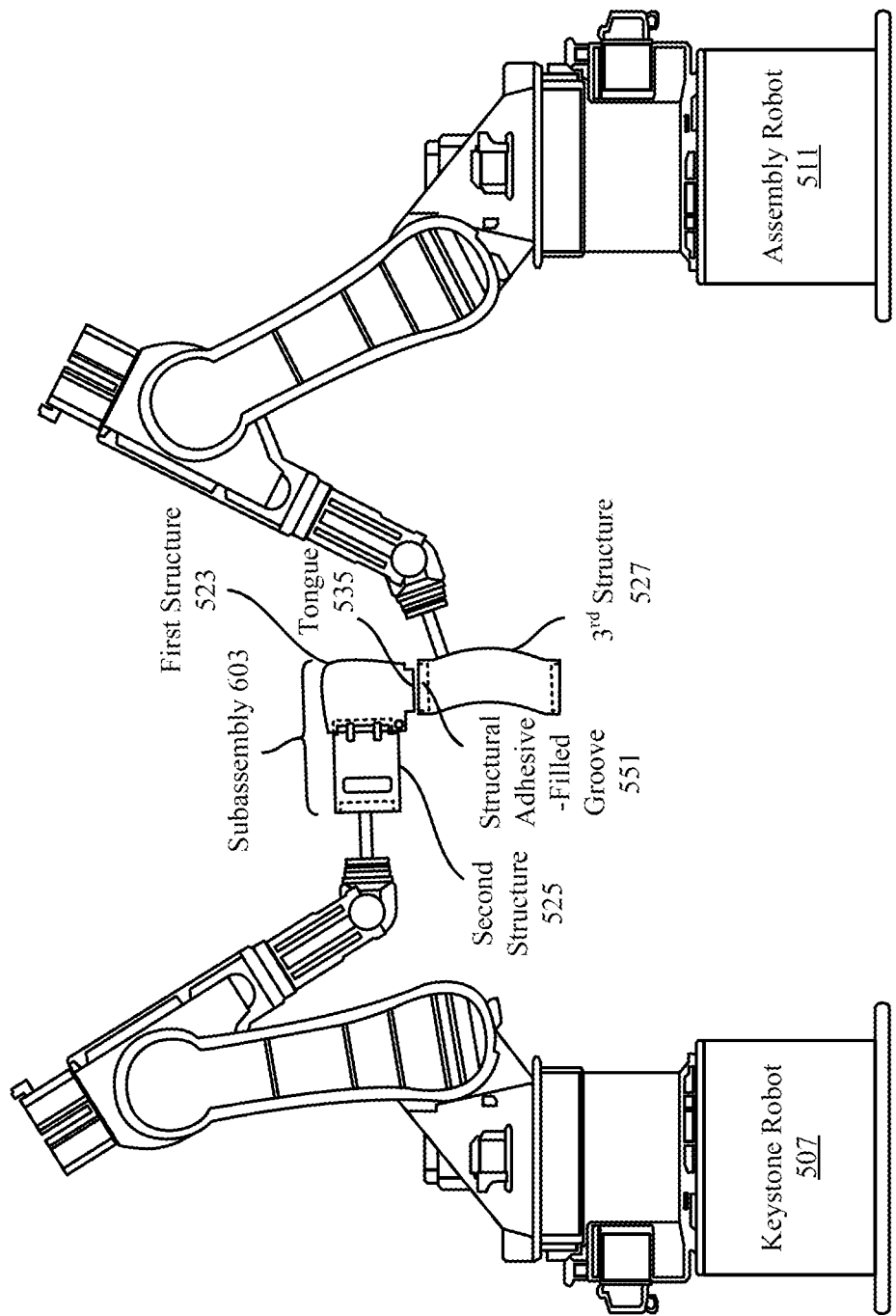
Figure 6O:
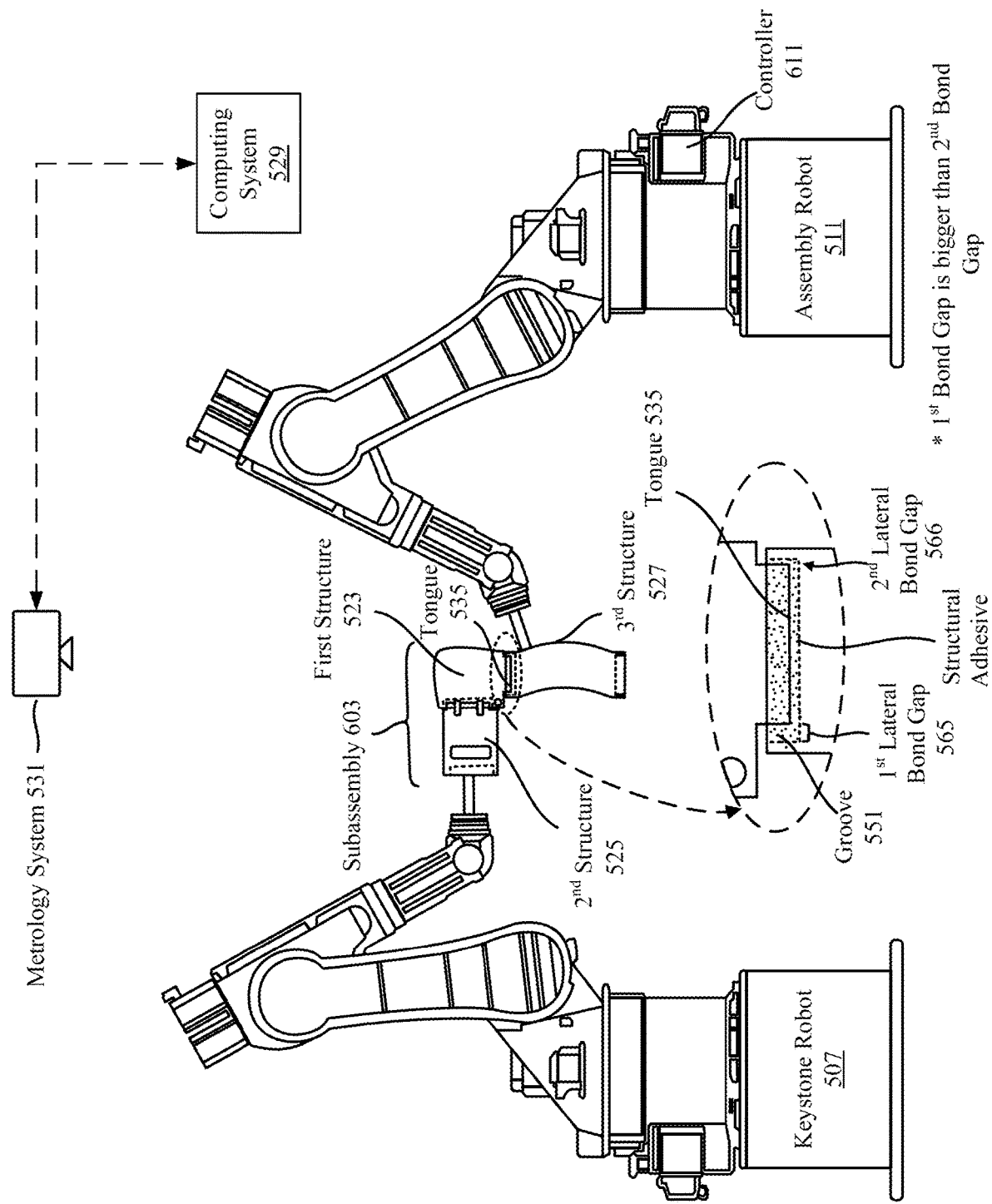
Figure 6P:
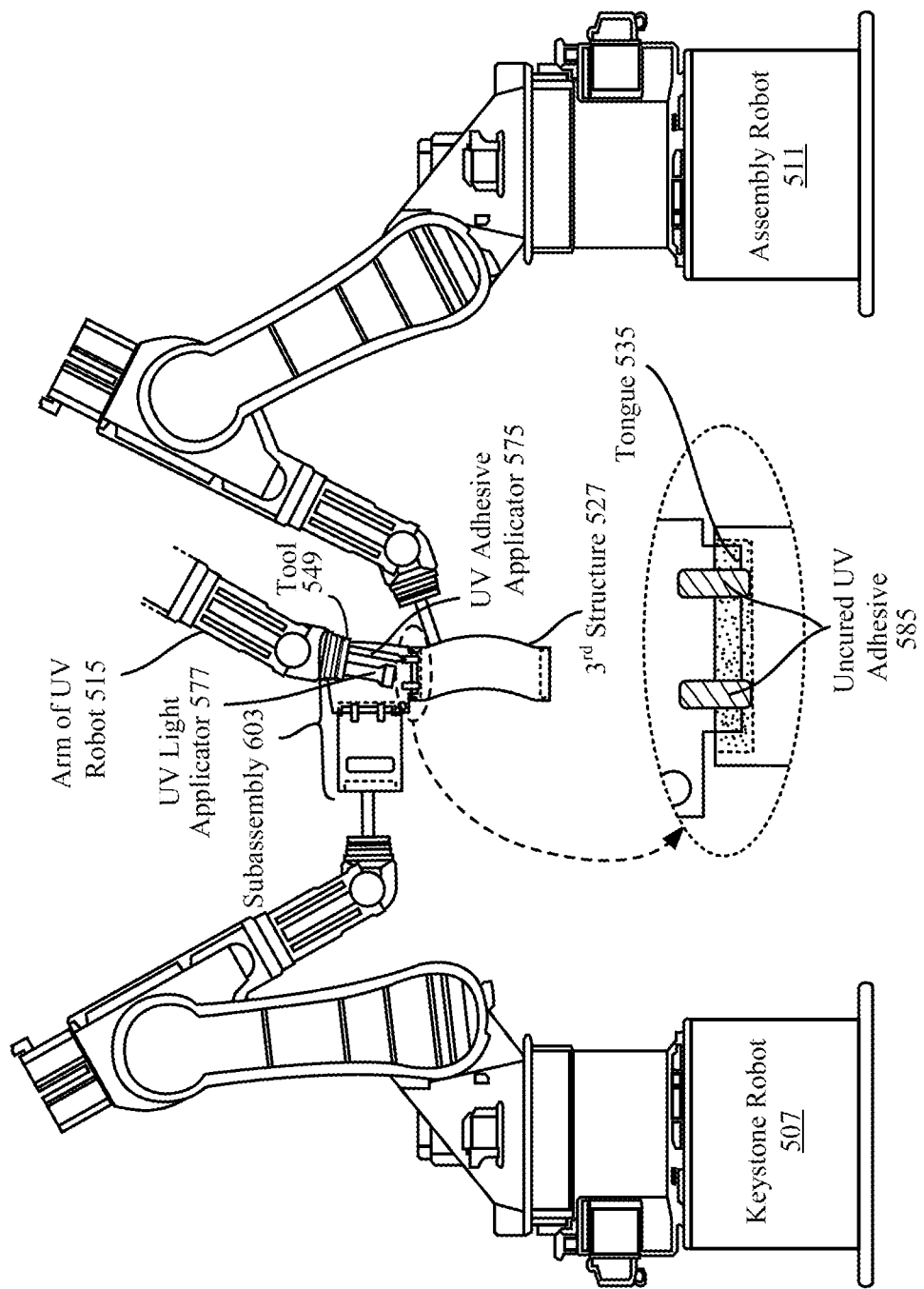
Figure 6Q:
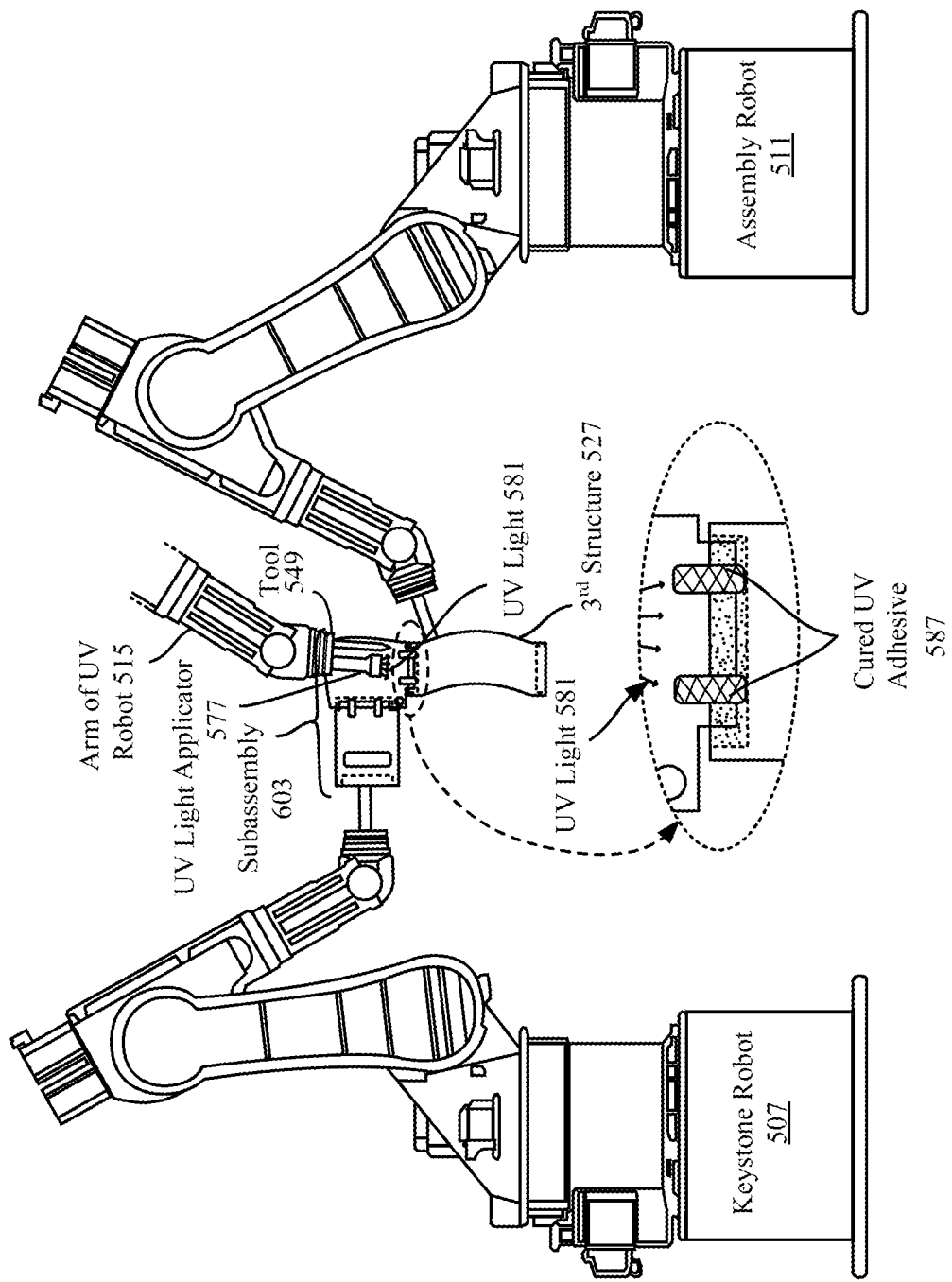
Figure 6R:
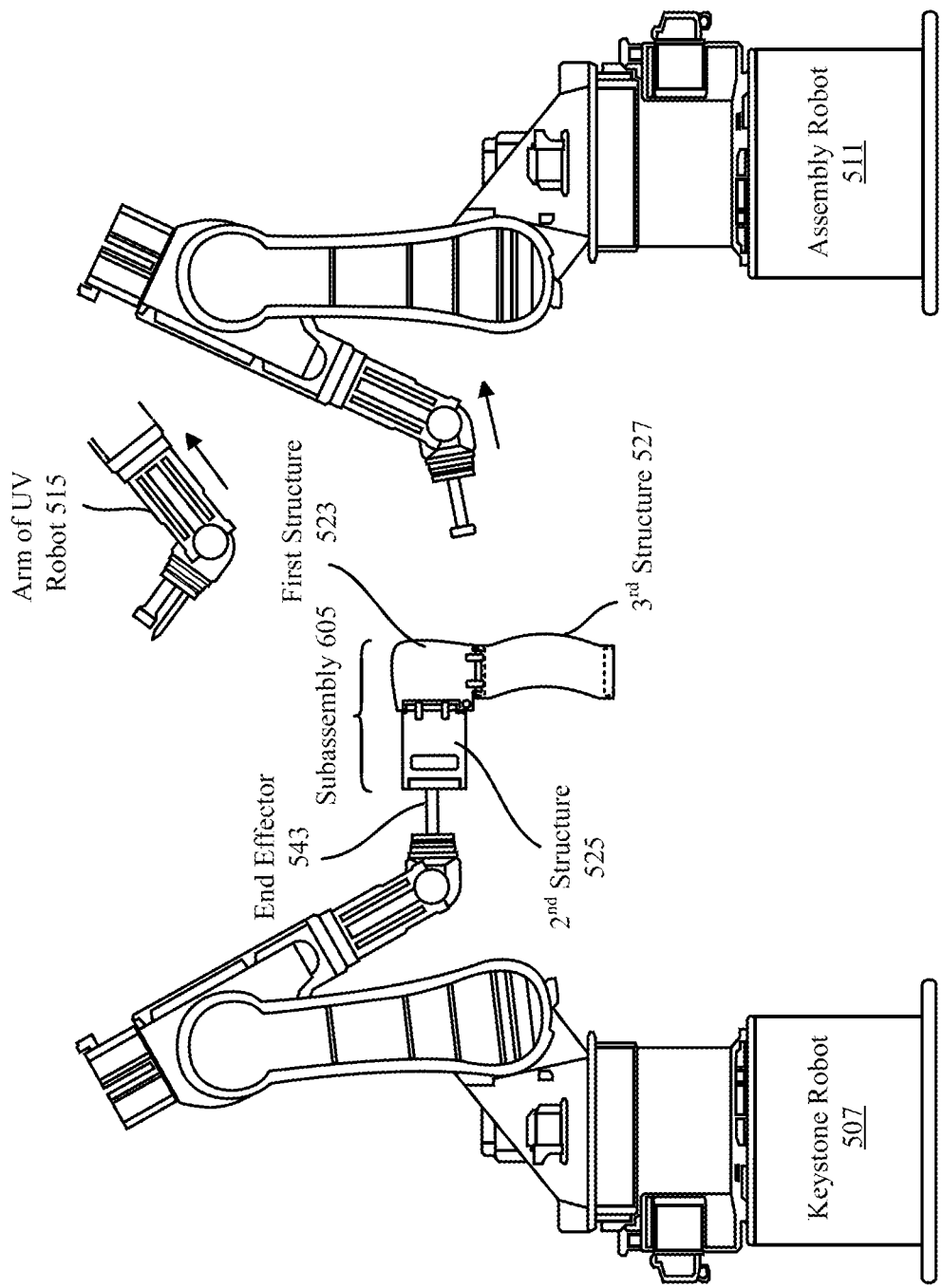
Figure 6S:
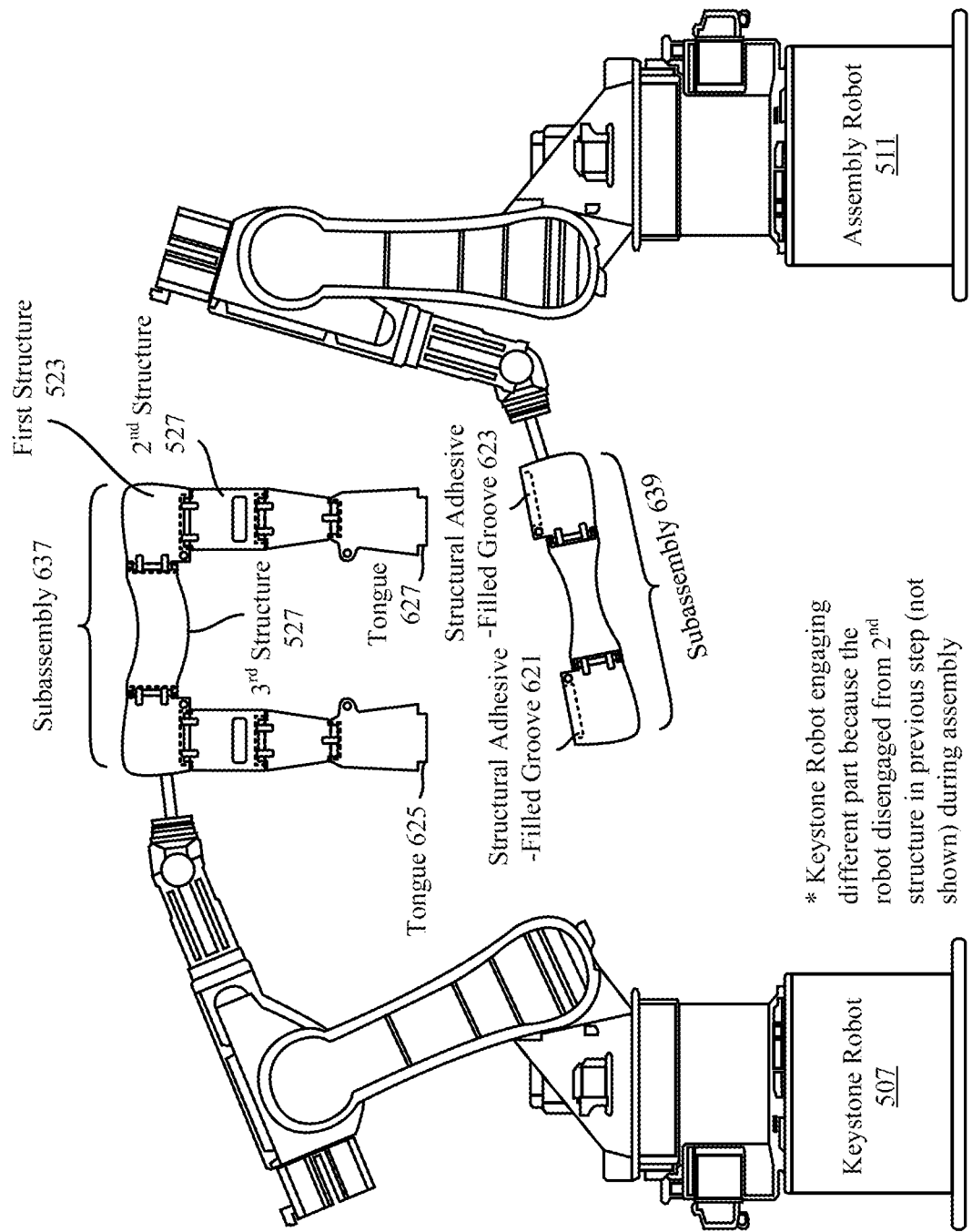
Figure 6T:
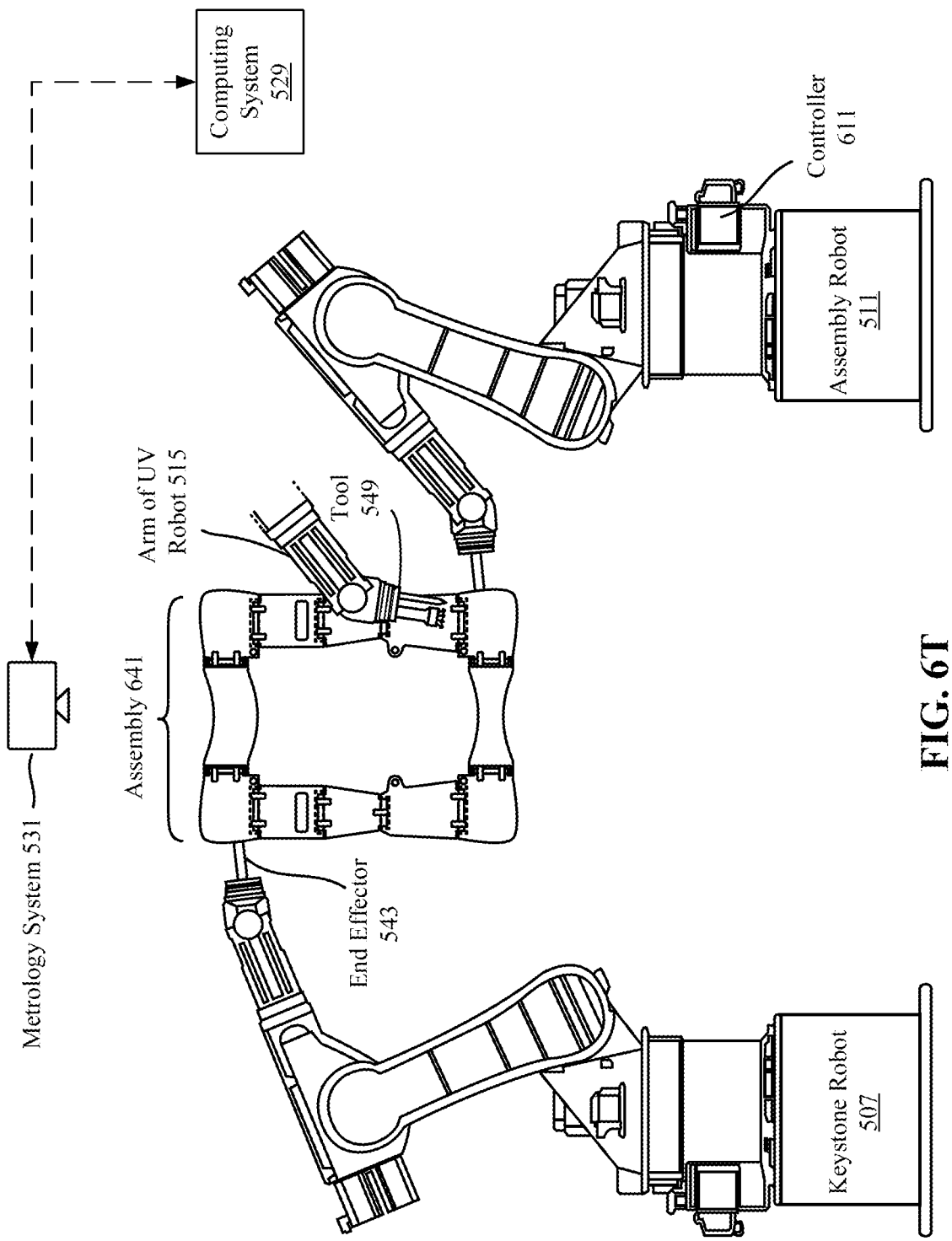
Figure 6U:
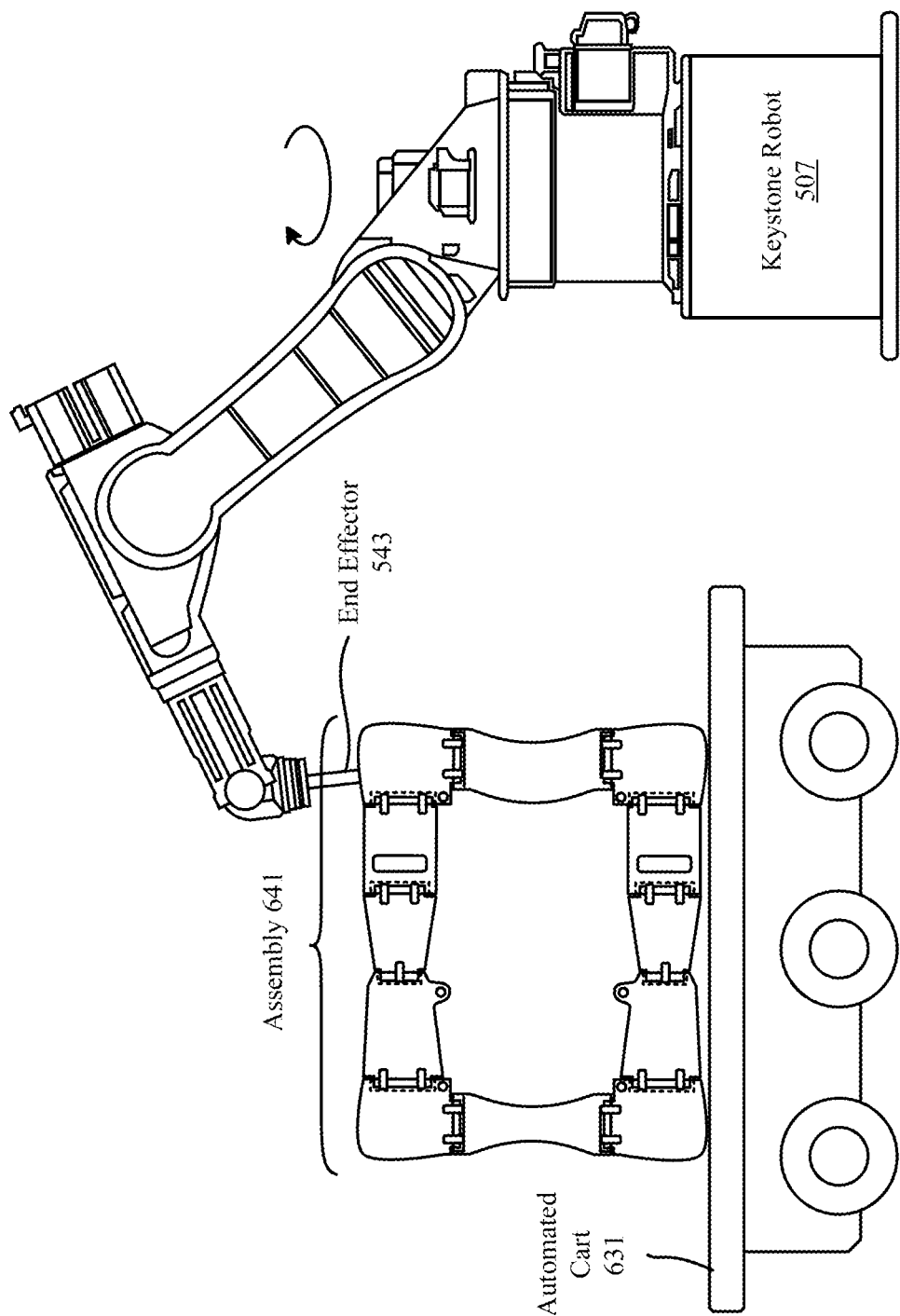
Figure 6V:
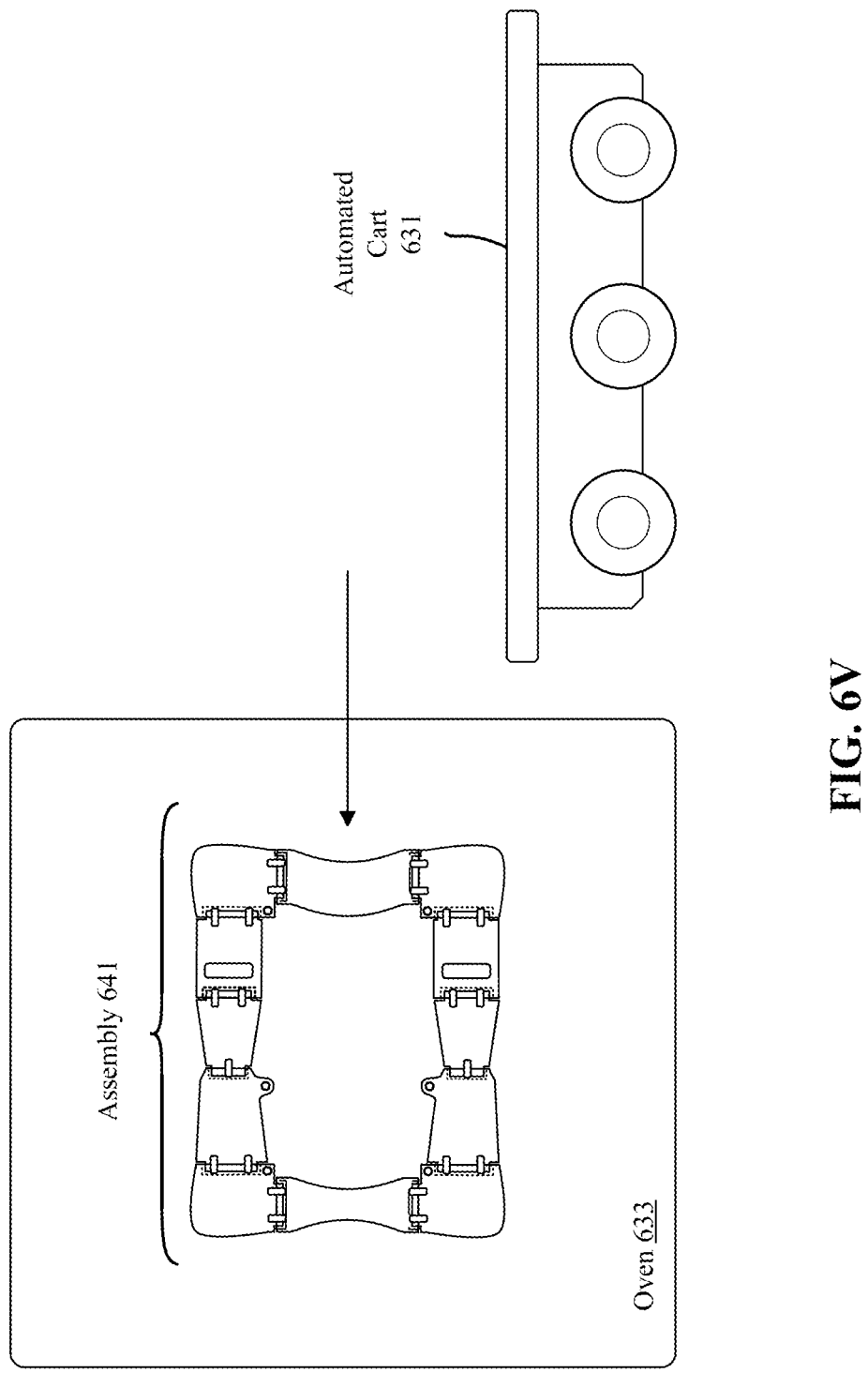

Referring to FIGS. 6A through 6V, these figures illustrate various configurations of robots 507, 509, 511, 513, 515, 517 during various operations of fixtureless assembly system 500. FIGS. 6A through 6V illustrate example fixtureless joining operations according to various embodiments.

First, an example control system will be described. Each of the robots 507, 509, 511, 513, 515, 517 may be communicatively connected with a controller, such as a respective one of controllers 607, 609, 611, 613, 615, 617 shown in FIGS. 5 and 6A through 6V. Each of controllers 607, 609, 611, 613, 615, 617 may include, for example, a memory and a processor communicatively connected to the memory (e.g., as described with respect to FIG. 10, below). According to some other embodiments, one or more of controllers 607, 609, 611, 613, 615, 617 may be implemented as a single controller that is communicatively connected to one or more of the robots controlled by the single controller.

Computer-readable instructions for performing fixtureless assembly can be stored on the memories of controllers 607, 609, 611, 613, 615, 617, and the processors of the controllers can execute the instructions to cause robots 507, 509, 511, 513, 515, 517 to perform various fixtureless operations, such as those described with respect to FIGS. 6A through 6V.

Controllers 607, 609, 611, 613, 615, 617 may be communicatively connected to one or more components of an associated robot 507, 509, 511, 513, 515, or 517, for example, via a wired (e.g., bus or other interconnect) and/or wireless (e.g., wireless local area network, wireless intranet) connection. Each of the controllers may issue commands, requests, etc., to one or more components of the associated robot, for example, in order to perform various fixtureless operations.

According to some embodiments, controllers 607, 609, 611, 613, 615, 617 may issue commands, etc., to a robotic arm of the associated robot 507, 509, 511, 513, 515, or 517 and, for example, may direct the robotic arms based on a set of absolute coordinates relative to a global cell reference frame of assembly cell 505. In various embodiments, controllers 607, 609, 611, 613, 615, 617 may issue commands, etc., to tools connected to the distal ends of the robotic arms. For example, the controllers may control operations of the tool, including depositing a controlled amount of adhesive on a surface of the first structure or second structure by an adhesive applicator, exposing adhesive deposited between structures to UV light for a controlled duration by a curing tool, and so forth. In various embodiments, controllers 607, 609, 611, 613, 615, 617 may issue commands, etc., to end effectors at the distal ends of the robotic arms. For example, the controllers may control operations of the end effectors, including, engaging, retaining, and/or manipulating a structure.

According to various other aspects, a computing system, such as computing system 529, similarly having a processor and memory, may be communicatively connected with one or more of controllers 607, 609, 611, 613, 615, 617. In various embodiments, the computing system may be communicatively connected with the controllers via a wired and/or wireless connection, such as a local area network, an intranet, a wide area network, and so forth. In some embodiments, the computing system may be implemented in one or more of controllers 607, 609, 611, 613, 615, 617. In some other embodiments, the computing system may be located outside assembly cell 505. One example of such a computing system is described below with respect to FIG. 10.

The processor of the computing system may execute instructions loaded from memory, and the execution of the instructions may cause the computing system to issue commands, etc., to the controllers 607, 609, 611, 613, 615, 617, such as by transmitting a message including the command, etc., to one of the controllers over a network connection or other communication link.

According to some embodiments, one or more of the commands may indicate a set of coordinates and may indicate an action to be performed by one of robots 507, 509, 511, 513, 515, 517 associated with the one of the controllers that receives the command. Examples of actions that may be indicated by commands include directing movement of a robotic arm, operating a tool, engaging a structure by an end effector, rotating and/or translating a structure, and so forth. For example, a command issued by a computing system may cause controller 609 of assembly robot 509 to direct a robotic arm of assembly robot 509 so that a distal end of the robotic arm may be located based on a set of coordinates that is indicated by the command.

The instructions loaded from memory and executed by the processor of the computing system, which cause the controllers to control actions of the robots may be based on computer-aided design (CAD) data. For example, a CAD model of assembly cell 505 (e.g., including CAD models of the physical robots) may be constructed and used to generate the commands issued by the computing system.

In some embodiments, one or more CAD models may represent locations corresponding to various elements within the assembly cell 505. Specifically, a CAD model may represent the locations corresponding to one or more of robots 507, 509, 511, 513, 515, 517. In addition, a CAD model may represent locations corresponding to structures and repositories of the structures (e.g., storage elements, such as parts tables, within fixtureless assembly system 500 at which structures may be located before being engaged by an assembly robot). In various embodiments, a CAD model may represent sets of coordinates corresponding to respective initial or base positions of each of robots 507, 509, 511, 513, 515, 517.

For such CAD modeling, a reference frame for a coordinate system may be defined. The coordinate system may include absolute coordinates, relative coordinates, or a combination thereof. For a set of absolute coordinates, the coordinate frame may be a global coordinate frame or global cell reference frame, and the coordinate frame may include (e.g., may be bounded by and/or may be defined by) assembly cell 505.

The coordinate frame may be established based on one or more ground references in assembly cell 505—such as one or more laser prisms, each of which may be measured in the assembly cell so that, in the aggregate, a reference frame is defined with a number of reference points corresponding to the number of laser prisms. Thus, a CAD model corresponding to assembly cell 505 may be an as-built CAD model, which may represent the assembly cell more accurately than a nominal CAD model. Absolute coordinates based on CAD modeling may provide a degree of accuracy that is acceptable for fixtureless assembly of vehicles. For example, directing robots 507, 509, 511, 513, 515, 517 based on absolute coordinates established through CAD modeling may adhere to various industry and/or safety standards that are to be observed when assembling a vehicle.

In various embodiments, relative coordinates may be used for fixtureless assembly system 500, for example, as an alternative or supplement to an absolute coordinate system. In particular, relative coordinates may be used for some portions of the fixtureless joining process in which a second structure may be joined to the first structure and/or joined to another structure. For example, a controller associated with an assembly robot may direct robotic arm of the assembly robot to a joining position based on a set of absolute coordinates defined with respect to the global cell reference frame. The position of the robotic arm may be measured (e.g., by the controller of the assembly robot, by the controller of the keystone robot, by another controller and/or processing system, etc.) after assembly robot reaches the joining position based on the set of absolute coordinates, and the measured position of assembly robot may be provided to controller of the keystone robot. The controller of the keystone robot may position the robotic arm of the keystone robot based on the measured position of the assembly robot's robotic arm. Thus, the keystone robot's arm may be positioned relative to the assembly robot's arm, for example, instead of correcting the respective positions of each of the keystone robot and the assembly robot according to the global cell reference frame while the controllers may remain agnostic to the positions of the keystone robot or the assembly robot.

In addition, a CAD model may represent one or more of the operations that are to be performed within assembly cell 505 for construction of at least a portion of a vehicle. In other words, a CAD model may simulate the assembly procedure of fixtureless assembly system 500 and, therefore, may simulate each of the movements and/or actions performed by one or more of the robots. The CAD simulation may be translated into a set of discrete operations (e.g., a discrete operation may include direction for an associated set of coordinates), which may be physically performed by one or more of the robots.

By way of illustration, movements of the assembly robot and the structural adhesive robot within the reference frame of assembly cell 505 may be simulated in order to model absolute coordinates (and, optionally, times) for operations of the assembly robot and the structural adhesive robot. For example, a CAD model may simulate three operations: (1) a first time and first set of coordinates for fixtureless engagement of a structure positioned on a parts table by an end effector of an assembly robot, (2) a second time and second set of coordinates for directing the assembly robot to position the structure proximate to a structural adhesive robot for application of an adhesive, and (3) a third time and third set of coordinates for directing the structural adhesive robot to apply adhesive to a surface of the structure. Subsequently, the example simulated operations may be translated to one or more sets of discrete instructions, which may be loaded into memory of one or more controllers communicatively connected to the assembly and structural adhesive robots. When executed by the processors of the respective controllers, the sets of discrete instructions may cause the robots in fixtureless assembly system 500 to perform the operations simulated through the CAD model.

Each of robots 507, 509, 511, 513, 515, 517 may include features that are common across all or some of the robots. For example, all of the robots may include a base, each of which having a surface (e.g., a bottom surface) that contacts assembly cell 505 (e.g., rests on or is secured to a floor of the assembly cell). Each base may have another surface (e.g., a top surface and/or a surface disposed on the base opposite from the surface contacting assembly cell 505) and, at a respective other surface, a base may connect with a proximal end of a respective robotic arm of a respective one of the robots.

In some embodiments, a base may be connected to the proximal end of a robotic arm through at least one rotation and/or translation mechanism. The at least one rotation and/or translation mechanism may provide at least one degree of freedom in movement of an end effector or other tool of the robotic arm. Correspondingly, the at least one rotation and/or translation mechanism may provide at least one degree of freedom in movement of a structure that is engaged and retained by an end effector or other tool of the robotic arm.

Each robotic arm of robots 507, 509, 511, 513, 515, 517 may include a distal end, oppositely disposed from the proximal end of the robotic arm. As described herein (e.g., with respect to FIGS. 6A through 6V, below), each robotic arm of each of the robots may include an end effector and/or a tool, such as an adhesive application tool, curing tool, and so forth. An end effector or a tool may be at the distal end of a robotic arm. In some embodiments, the distal end of a robotic arm may be connected to an end effector or a tool (or tool flange) through at least one rotation and/or translation mechanism, which may provide at least one degree of freedom in movement of the tool and/or movement of a structure engaged and retained by the tool of the robotic arm.

In some embodiments, the distal end of a robotic arm may include a tool flange, and a tool included at the tool flange; for example, a tool may be connected to the distal end of a robotic arm by means of the tool flange. A tool flange may be configured to include a plurality of tools. In this way, for example, the assembly/UV robot 517 may offer functionality similar to each of the assembly robots 509, 511 when a distal end of a robotic arm of the assembly/UV robot 517 includes an end effector (e.g., connected by means of the tool flange). In addition, the assembly/UV robot 517 may offer functionality similar to the UV robot 515 when the distal end of the robotic arm of the assembly/UV robot 517 includes a tool configured to apply UV adhesive and to emit UV light to cure the adhesive.

According to some embodiments, a tool flange and/or tool may provide one or more additional degrees of freedom for rotation and/or translation of a structure engaged and retained by the tool. Such additional degrees of freedom may supplement the one or more degrees of freedom provided through one or more mechanisms connecting a base to the proximal end of a robotic arm and/or connecting the distal end of a robotic arm to the tool (or tool flange). Illustratively, a robotic arm of at least one of robots 507, 509, 511, 513, 515, 517 may include at least one joint configured for rotation and/or translation at a distal and/or proximal end, such as an articulating joint, a ball joint, and/or other similar joint.

One or more of the respective connections of robots 507, 509, 511, 513, 515, 517 (e.g., one or more rotational and/or translational mechanisms connecting various components of one of the robots), a respective tool flange, and/or a respective tool may provide at least a portion (and potentially all) of six degrees of freedom (6DoF) for a structure engaged and retained by the robots. The 6DoF may include forward/backward (e.g., surge), up/down (e.g., heave), left/right (e.g., sway) for translation in space and may further include yaw, pitch, and roll for rotation in space. Access to various portions of a structure may be attainable through one or more of the 6DoF, as opposed to retention of a structure using a fixture, which cannot offer 6DoF in movement of a structure and also blocks access to a significant portion of a structure attached thereto.

In assembly systems including fixtures, positioners, and/or fixture tables, 6DoF may be unattainable during the assembly process, for example, because at least one of the fixture, positioner, and/or fixture table may prevent one or more of surge, heave, sway, yaw, pitch, and/or roll of a structure to which the fixture is attached. Coupled with the reduction in available space commensurate with use of a fixture, positioner, and/or fixture table for accessing and/or manipulating a structure, the unattainable one(s) of the 6DoF may render some significant portions of the structure inaccessible.

The inaccessibility of portions of the structure make the assembly process of a vehicle difficult. For example, the inaccessibility of a surface of a structure at which another structure is to be joined may render a structural assembly unsuitable for use in a vehicle that is to meet various industry and/or safety standards for commercial and/or consumer vehicles.

In contrast, fixtureless robotic operations for constructing a structural assembly as described herein (e.g., with respect to the fixtureless assembly system 500) may feature a greater number of degrees of freedom (e.g., all 6DoF) than assembly systems that rely on fixtures, positioners, and/or fixture tables. Commensurately, fixtureless robotic operations (e.g., fixtureless assembly system 500) may reduce the complexities and/or difficulties otherwise inherent with the manipulation and/or accessibility of a structure, thereby increasing the likelihood that a structural assembly derived through fixtureless assembly system 500 may meet various industry and/or safety standards.

Example operations of fixtureless assembly system 500 will now be described in FIGS. 6A through 6V. As described herein, the example operations may be caused by at least one of controllers 607, 609, 611, 613, 615, 617 communicatively coupled with robots 507, 509, 511, 513, 515, 517. In some embodiments, computing system 529 may issue commands to controllers 607, 609, 611, 613, 615, 617 to cause the example operations. Computing system 529 and/or controllers 607, 609, 611, 613, 615, 617 may cause the example operations based on CAD data, which may model the physical robots performing the example operations, and/or positional data, which may be provided by metrology system 531.

For the example operations of fixtureless assembly system 500, robots 507, 509, 511, 513, 515, 517 may be positioned relatively proximate to one another, e.g., at distances suitable for the example operations described below. In some embodiments, one or more robots 507, 509, 511, 513, 515, 517 may be positioned in fixtureless assembly system 500 at locations suitable for the one or more example operations prior to the example operations described below. At such locations, the respective bases of those one or more robots may be static throughout the example operations of fixtureless assembly system 500. However, movement of the robotics arms of robots 507, 509, 511, 513, 515, 517 may be controlled in coordination at various stages of fixtureless assembly system 500, such as by rotating about the respective bases, turn at a hinge, and/or otherwise articulate.

In some other embodiments, different robots 507, 509, 511, 513, 515, 517 may be dynamically (re)positioned at different distances from one another at different stages of fixtureless assembly. Carrier 519 may be configured to move one or more robots 507, 509, 511, 513, 515, 517 to their respective positions, e.g., according to execution by one or more processors of one or more sets of instructions associated with fixtureless assembly. Whether static or dynamic, the respective locations at which each of robots 507, 509, 511, 513, 515, 517 is positioned may be based on one or more sets of coordinates associated with fixtureless assembly system 500 (e.g., one or more sets of absolute coordinates).

Referring first to FIG. 6A, assembly robot 511 can engage first structure 523. First structure 523 may include one or more features that enable joining of first structure 523 with one or more other structures. Illustratively, first structure 523 may include a groove 533 on a first surface and may include a tongue 535 on a second surface. The first surface and the second surface of first structure 523 may be different sides of the first structure (e.g., the first surface may be on a left or top side of first structure 523 and the second surface may be on a right or bottom side of first structure 523, or vice versa).

Assembly robot 511 may be located relatively proximate to parts table 521. At such a location, the robotic arm of assembly robot 511 may be within a proximity at which the robotic arm of assembly robot 511 is able to reach at least a portion of the parts located on parts table 521. In the example embodiment of FIG. 6A, assembly robot 511 may be located at one side of parts table 521, and groove 533 of first structure 523 may be relatively closer to assembly robot 511 than tongue 535 of first structure 523 at such a location of assembly robot 511.

Assembly robot 511 may be connected to an end effector 537. Illustratively, the distal end of the robotic arm of assembly robot 511 may be connected to end effector 537, which may be built onto the distal end of the robotic arm or may be attached to the robotic arm (and may be fixed or removable). End effector 537 of assembly robot 511 may be configured to engage (e.g., "pick up") and retain one or more structures. For example, end effector 537 of assembly robot 511 may be configured to engage with different structures, such as via one or more features of the different structures. Some examples of such an end effector may include jaws or grippers.

Assembly robot 511 may engage with first structure 523, e.g., approximately at a side of the first structure that does not have groove 533 or tongue 535. Specifically, the robotic arm of assembly robot 511 may move to a position at which end effector 537 of assembly robot 511 can engage first structure 523. At this position, end effector 537 of assembly robot 511 engages with first structure 523, e.g., at the different side and/or surface than groove 533 or tongue 535. Once engaged, assembly robot 511 may retain first structure 523, e.g., by means of end effector 537. When first structure 523 is retained by assembly robot 511, assembly robot 511 may move first structure 523 to one or more positions at which one or more example operations of fixtureless assembly may be performed, as further described below.

Next referring to FIG. 6B, assembly robot 511 may turn to face structural adhesive robot 513. The distal end of the robotic arm of assembly robot 511 may be positioned toward structural adhesive robot 513, and similarly, the distal end of the robotic arm of structural adhesive robot 513 may be positioned toward assembly robot 511.

At this example location illustrated in FIG. 6B, assembly robot 511 may move first structure 523 to a position at which the first structure is approximately between assembly robot 511 and structural adhesive robot 513. Further, assembly robot 511 may orient first structure 523 so that groove 533 is facing approximately upward, such as by causing the robotic arm of assembly robot 511 and/or end effector 537 of assembly robot 511 to move such that first structure 523 is oriented approximately upward.

Structural adhesive robot 513 may be connected to a structural adhesive applicator 539 or other similar tool. Illustratively, structural adhesive applicator 539 may be built onto the distal end of the robotic arm or may be attached to the robotic arm (and may be fixed or removable). Structural adhesive applicator 539 may be configured to deposit adhesive on structural surfaces.

When first structure 523 is suitably positioned (e.g., between the two robots 511, 513), structural adhesive robot 513 may cause application of the adhesive to first structure 523. Specifically, structural adhesive robot 513 may deposit the adhesive into groove 533 of first structure 523. To do so, structural adhesive robot 513 may move its robotic arm to a position such that structural adhesive applicator 539 is above groove 533, and is sufficiently close so that a controlled amount of the adhesive can be deposited within a defined area while avoiding deposition of the adhesive on unintended surfaces. At such an above position, an adhesive application tip of structural adhesive applicator 539 may be approximately directly above groove 533, and may be pointed downward into groove 533.

After being deposited, the controlled amount of adhesive may at least partially fill groove 533. In some embodiments, the controlled amount of adhesive may entirely or nearly entirely fill groove 533. The amount of adhesive, however, may be controlled such that the adhesive does not overflow outside groove 533 and onto the first surface of first structure 523 that bounds groove 533. For example, the amount of adhesive deposited in groove 533 may be controlled such that the adhesive does not leak onto any surfaces of first structure 523 when a protrusion, such as a tongue, of another structure is inserted into groove 533 when first structure 523 is joined with the other structure.

Turning to FIG. 6C, keystone robot 507 can engage second structure 525. Similar to first structure 523, second structure 525 may include one or more features that enable joining of second structure 525 with one or more other structures. In the illustrated embodiment, second structure 525 may include a groove 547 on a first surface and may include a tongue 545 on a second surface. The first surface and the second surface of second structure 525 may be on approximately opposite sides to one another.

Second structure 525 may be located on parts table 522, and keystone robot 507 may be located relatively proximate to parts table 522. At such a location, the robotic arm of keystone robot 507 may be within a proximity at which the robotic arm of keystone robot 507 is able to reach at least a portion of the parts located on parts table 522. In the example embodiment of FIG. 6C, keystone robot 507 may be located at one side of parts table 522, and tongue 545 of second structure 525 may be positioned toward the side of parts table 522 that is relatively opposite from the one side at which keystone robot 507 is located. At this position, groove 547 of second structure 525 pointing towards keystone robot 507.

Keystone robot 507 may be connected to an end effector 543. Illustratively, the distal end of the robotic arm of keystone robot 507 may be connected to end effector 543, which may be built onto the distal end of the robotic arm or may be attached to the robotic arm (and may be fixed or removable). End effector 543 of keystone robot 507 may be configured to engage (e.g., "pick up") and retain one or more structures. For example, end effector 543 of keystone robot 507 may be configured to fixturelessly engage with different structures, such as via one or more features of the different structures. Some examples of such an end effector may include jaws or grippers.

Keystone robot 507 may engage with second structure 525 at the first surface, i.e., the surface on which groove 547 is located. Specifically, the robotic arm of keystone robot 507 may be moved to a position at which the keystone robot can engage second structure 525, and keystone robot 507 may then engage and retain second structure 525 at the first surface using end effector 543.

With respect to FIG. 6D, keystone robot 507 may turn to face assembly robot 511, and the assembly robot may turn to face the keystone robot. The distal end of the robotic arm of keystone robot 507 may be positioned toward assembly robot 511, and similarly, the distal end of the robotic arm of assembly robot 511 may be positioned toward keystone robot 507.

At this example location illustrated in FIG. 6D, keystone robot 507 may move second structure 525 to a position at which second structure 525 is approximately between keystone robot 507 and assembly robot 511. Further, keystone robot 507 may orient second structure 525 so that tongue 545 of second structure 525 is facing approximately downward, such as by causing the robotic arm of keystone robot 507 and/or end effector 543 of keystone robot 507 to move such that second structure 525 is oriented approximately downward.

In some embodiments, keystone robot 507 may move second structure 525 according to one or more vectors, which may be based on CAD modeling. Each of the one or more vectors may indicate a magnitude (e.g., distance) and a direction according to which second structure 525 is to be moved by keystone robot 507. Each vector may be intended to bring second structure 525 within the joining proximity, although some vectors may be intermediary vectors intended to bring second structure 525 to a position at which a vector for joining first and second structures 523, 525 can be applied.

Assembly robot 511 may position first structure 523 relatively closer to assembly robot 511 than keystone robot 507. In some embodiments, assembly robot 511 may position first structure 523 to be at least partially above at least a portion of second structure 525. For example, assembly robot 511 may retain first structure 523 at an approximately overhead position.

Now referring to FIG. 6E, assembly robot 511 and keystone robot 507 may move first structure 523 and second structure 525, respectively, to positions close to each other, but not close enough to be joined. Further, first structure 523 may be positioned to be below second structure 525, for example, such that first structure 523 and second structure 525 at least partially overlap in the elevational plane (or vertical space).

Assembly robot 511 may orient first structure 523 so that groove 533 of first structure 523 is facing approximately upward, having the controlled amount of adhesive previously deposited therein. For example, assembly robot 511 may cause its robotic arm and/or end effector 537 to move such that groove 533 of first structure 523 is oriented approximately upward. Thus, groove 533 of first structure 523 may face tongue 545 of second structure 525.

Similar to the movement of second structure 525 by keystone robot 507, assembly robot 511 may move first structure 523 according to one or more vectors, which may be based on CAD modeling. Each of the one or more vectors may indicate a magnitude (e.g., distance) and a direction according to which first structure 523 is to be moved by assembly robot 511. Each vector may be intended to bring first structure 523 within the joining proximity, although some vectors may be intermediary vectors intended to bring first structure 523 to a position at which a vector for joining first and second structures 523, 525 can be applied.

Keystone robot 507 may retain second structure 525 at the previously described position with tongue 545 oriented approximately downwardly; although second structure 525 may now be positioned above first structure 523 due to the movement of first structure 523 caused by assembly robot 511. However, first and second structures 523, 525 may not yet be within the joining proximity at which the first structure can be joined with the second structure.

FIG. 6F illustrates how first structure 523 and second structure 525 may be brought within the joining proximity at which the two structures can be joined. To bring first and second structures 523, 525 within the joining proximity, one or both of the first and/or second structures may be moved by one or both of assembly robot 511 and/or keystone robot 507, respectively. For example, assembly robot 511 may cause the distal end of its robotic arm, at which first structure 523 is engaged, to move in an approximately upwardly direction toward second structure 525. Additionally or alternatively, keystone robot 507 may cause the distal end of its robotic arm, at which second structure 525 is engaged, to move in an approximately downwardly direction toward first structure 523.

In various embodiments, joining structures that are engaged by robots in fixtureless assembly system 500 may be accomplished using a "move-measure-correct" procedure. In effect, the move-measure-correct procedure may include moving at least one structure toward the joining proximity, measuring at least one difference between the current position of one of the structures (e.g., the physical position of the structure) and the position at which the structures can be joined (e.g., the joining proximity), and correcting the position of at least one of the structures such that the structures can be brought within the joining proximity, at which the structures can be joined. The move-measure-correct procedure may be repeated for one or more of the structures to be joined until the structures are brought within the joining proximity, at which point the joining operation can be accomplished such that the structures are joined (e.g., within acceptable tolerances). It is possible that the structures can be brought within the joining proximity in one step, thus repeating the procedure may not be necessary in all cases.

The move-measure-correct procedure may use metrology system 531, which may be configured to determine (e.g., detect, calculate, measure, capture, etc.) positional data associated with assembly cell 505. The positional data may include a set of measurements or other values indicative of one or more positions of structures and/or robots (e.g., including robotic arms and/or components connected with robots, such as tools, flanges, end effectors, and so forth). Metrology system 531 may include one or more devices located in and/or proximate to assembly cell 505 and may include, for example, a tracker-machine control sensor (T-MAC), a laser metrology device (e.g., configured for laser scanning and/or tracking), a photogrammetry device, a camera (e.g., configured to capture still images and/or video), and/or another device configured to similarly determine positional data.

In some embodiments, metrology system 531 may determine positional data based on at least one target in assembly cell 505, which may be located on one or more of the robots (e.g., including robotic arms and/or components connected with robots, such as tools, flanges, end effectors, and so forth), one or more of the structures to be joined, and/or elsewhere in assembly cell 505. The at least one target may be detectable/identifiable by metrology system 531 in assembly cell 505—for example, the at least one target may be reflective and/or may be of a specific shape so as to distinguish the at least one target in assembly cell 505.

Metrology system 531 may provide the positional data to computing system 529. For example, the positional data may indicate a set of coordinates associated with the structure. The set of coordinates may include at least one of a set of absolute coordinates (e.g., a global coordinate frame for assembly cell 505) and/or a set of relative coordinates (e.g., relative to the joining proximity and/or relative to the other one of the structures).

The positional data may be used to determine (e.g., measure or calculate) the difference between the current position of one of the structures and the joining proximity by computing system 529. For example, computing system 529 may determine a difference between the set of coordinates indicated by the positional data and a set or expected coordinates, which may be the coordinates at which the structure is expected to be located in order to be brought within the joining proximity.

If necessary, the position of at least one of the structures can be corrected based on the determined difference. For example, robot imperfections and/or other imprecisions in fixtureless assembly system 500 may cause structures to drift or otherwise become unaligned with the joining proximity and/or the vectors or coordinates according to which structures are to be moved to be brought within the joining proximity. If the determined difference is not within the acceptable tolerances of the joining proximity, computing system 529 can determine a vector and/or set of coordinates according to which one of the structures is to be moved so that the structure can be brought within the joining proximity.

Computing system 529 may then issue a command to one of controllers 607, 609, 611, 613, 615, 617 communicatively connected with one of robots 507, 509, 511, 513, 515, 517 that is retaining the structure, and the issued command may cause the controller to correct the position of the structure such that the structure is brought within the joining proximity. For example, one of robots 507, 509, 511, 513, 515, 517 may move the structure according to the determined vector and/or set of coordinates based on the issued command.

In the context of FIG. 6F, metrology system 531 may determine positional data associated with at least one of first structure 523 and/or second structure 525 in assembly cell 505. For example, metrology system 531 may determine a set of coordinates associated with first structure 523. The set of coordinates may indicate the physical position of first structure 523 in assembly cell 505 and/or relative to the joining proximity or second structure 525.

Metrology system 531 may provide the positional data to computing system 529. Computing system 529 may receive the positional data and, based on the positional data, may determine a set of corrective operations to be applied so that first structure 523 can be brought within the joining proximity and joined with second structure 525. For example, computing system 529 may determine a difference between the set of coordinates associated with first structure 523 and the joining proximity.

Based on the determined difference, computing system 529 may determine the set of corrective operations to be applied to first structure 523 such that first structure 523 can be brought within the joining proximity. In some embodiments, the set of corrective operations may include a set of vectors that each indicate a magnitude and a direction based on which first structure 523 can be moved within the joining proximity. In some other embodiments, the set of corrective operations may include a set of coordinates associated with bringing first structure 523 within the joining proximity, such as a set of coordinates according to which the robotic arm of assembly robot 511 is to be controlled so that first structure 523 is brought within the joining proximity.

Computing system 529 may provide the set of corrective operations to controller 611 communicatively connected with assembly robot 511, such as by issuing a set of commands to controller 611. Controller 611 may apply the set of commands by controlling the robotic arm of assembly robot 511 according to the set of corrective operations indicated by the set of commands.

In some embodiments, metrology system 531 may again determine positional data associated with at least one of first structure 523 and/or second structure 525 after the aforementioned set of corrective operations is applied. Computing system 529 may receive the subsequent positional data and, based on the subsequent positional data, may determine the next set of corrective operations, if needed to bring first structure 523 and second structure 525 within the joining proximity. If the next set of corrective operations is needed, computing system 529 may issue the next set of commands to one of controller 607 or controller 611 (e.g., depending on which of first structure 523 or second structure 525 is to be moved). The controller receiving the next set of commands may control the corresponding one of keystone robot 507 or assembly robot 511 according to the next set of corrective operations. The move-measure-correct procedure may be iteratively repeated until computing system 529 determines first structure 523 and second structure 525 are at the joining proximity and no further corrective operations should be applied. Thus, first structure 523 and second structure 525 may be joined at the joining proximity.

When structures are within the joining proximity, at least a portion of one structure overlaps with at least a portion of another structure in at least one of the azimuthal (or horizon) plane and/or the elevational plane. According to such an overlap, one or more features of one structure may connect with one or more complementary features of another structure, e.g., by interlocking or fitting together, such as when a protrusion of one structure is inserted into a recess of another structure. In the illustrated example operations of fixtureless assembly system 500, tongue 545 of second structure 525 may be positioned within groove 533 of first structure 523 when first structure 523 and second structure 525 are within the joining proximity, thereby creating a tongue-and-groove joint.

In some embodiments, tongue 545 of second structure 525 may not contact first structure 523 at the joining proximity. In other words, the robots can be controlled to bring the structures within joining proximity while preventing the structures from contacting each other. For example, tongue 545 of second structure 525 may be within groove 533 of first structure 523, but lateral bond gaps, such as lateral bond gaps 561a, 561b, collectively referred to herein as lateral bond gaps 561 between the tongue and the sides of the groove, and a vertical bond gap 562 between the tongue and the bottom of the groove, can be caused because the tongue is inserted in the groove without contacting the sides and bottom. Rather, tongue 545 of second structure 525 may merely contact the structural adhesive deposited in groove 533 of first structure 523 (as shown above in FIG. 6B) when first structure 523 and second structure 525 are at the joining proximity. In some further embodiments, however, the surface surrounding groove 533 of first structure 523 may contact the surface surrounding tongue 545 of second structure 525.

The bond gaps resulting from joining without contact can provide a significant advantage in assembling multi-part structures. Specifically, for each individual joining operation, there may be spatial errors that might be caused by, for example, improper positioning of the structures, variations in the dimensions of the structures (e.g., a 3D printed structure might not have the exact dimensions as expected, due to the nature of 3D printing). In typical joining operations, these errors can add together with each joining operation of the multi-part structures, causing the final assembly to have large errors in dimension. However, the bond gaps resulting from contact-free joining can absorb the dimensional errors of each individual joining. The joining illustrated in FIG. 6O provides more details of how bond gaps can absorb dimensional errors.

Now referring to FIG. 6G, keystone robot 507 and assembly robot 511 may remain at their respective positions such that second structure 525 and first structure 523 are at the joining proximity.

With such positioning maintained, UV robot 515 may be located relatively proximate to keystone robot 507 and assembly robot 511. The distal end of the robotic arm of UV robot 515 may be positioned toward first structure 523 and second structure 525, and specifically, toward the point at which first structure 523 and second structure 525 are joined (e.g., toward the tongue-and-groove joint). In such a position, the distal end of the robotic arm of UV robot 515 may be between keystone robot 507 and assembly robot 511.

UV robot 515 may be connected with a tool 549, which specifically may be connected with the distal end of the robotic arm of UV robot 515. Tool 549 may be configured to bond first structure 523 and second structure 525 at the joining proximity. For example, tool 549 may be configured with or connected to one or more applicators, such as applicators 575, 577, to apply UV or other temporary adhesive (e.g., via UV adhesive applicator 575) and to emit UV light (e.g., via UV light applicator 577) or otherwise cure the UV or other temporary adhesive, thereby bonding first structure 523 and second structure 525. The bond created by UV robot 515 may be temporary, while the structural adhesive (applied by structural adhesive robot 513, as shown above in FIG. 6B) may provide a permanent bond when cured.

The distal end of the robotic arm of UV robot 515 may be positioned such that tool 549 connected with the UV robot 515 is proximate to the point at which first structure 523 and second structure 525 are at the joining proximity. For example, the robotic arm of UV robot 515 may be positioned such that tool 549 is positioned at a distance from the tongue-and-groove joint (formed by positioning first structure 523 and second structure 525 at the joining proximity) that is suitable for dispensing the UV adhesive. At this suitable distance, UV robot 515 may apply UV adhesive on and/or near the tongue-and-groove joint formed by joining first structure 523 and second structure 525.

In some embodiments, tool 549 connected with UV robot 515 may apply UV adhesive as one or more UV adhesive strips. Each UV adhesive strip may be applied such that it contacts both first structure 523 and second structure 525. For example, UV robot 515 may position tool 549 so that one UV adhesive strip is placed across respective surfaces of first structure 523 (e.g., proximate to groove 533 of first structure 523) and second structure 525 (e.g., proximate to tongue 545 of second structure 525). At this stage, the UV adhesive may be uncured (e.g., uncured UV adhesive 579).

Now referring to FIG. 6H, keystone robot 507 and assembly robot 511 may remain at their respective positions such that second structure 525 and first structure 523 are positioned at the joining proximity with the UV adhesive (e.g., uncured UV adhesive strips 579) placed across first structure 523 and second structure 525.

In some embodiments, UV robot 515 may again be positioned relatively proximate to keystone robot 507 and assembly robot 511. The distal end of the robotic arm of UV robot 515 may again be positioned toward first structure 523 and second structure 525, and specifically, toward the point at which first structure 523 and second structure 525 are at the joining proximity (e.g., toward the tongue-and-groove joint).

As described above, UV robot 515 may be connected with a tool 549 that includes a curing device, e.g., UV light applicator 577, configured to cure the UV adhesive or other temporary adhesive earlier applied by UV robot 515. UV light applicator 577 may be a UV curing tool configured to emit UV light 581 to cure the UV adhesive. In some other embodiments, tool 549 may be configured to apply a temporary adhesive that can be quick-cured by other means, such as heat and/or air, and the tool can include an applicator sufficient to cure the other temporary adhesive, such as an applicator with an air dryer or heat source. In various embodiments, the temporary adhesive may be a quick-cure adhesive that cures quickly by itself, e.g., a quick set epoxy, in which case the tool may include only the adhesive applicator.

As described in the present embodiment, tool 549 can include both a UV adhesive applicator configured to apply UV adhesive and a UV light applicator configured to cure the UV adhesive—e.g., the UV robot 515 may switch an operational mode of tool 549 from one mode for applying the uncured UV adhesive to another mode for curing the UV adhesive. In some other embodiments, the tools may be different, e.g., there may be separate tools for the UV adhesive applicator and the UV light applicator. For example, UV robot 515 may switch from the UV adhesive applicator (dispenser) tool to the UV light applicator (curing) tool.

UV robot 515 may position tool 549 at a distance from the UV adhesive that is suitable for curing the UV adhesive, which may be the same position or a different position as that at which the UV adhesive was earlier applied. With tool 549 at this distance, UV robot 515 may cause UV light applicator 577 of the tool to cure the UV adhesive. For example, UV robot 515 may cause UV light applicator 577 to emit UV light 581 for a time sufficient to cure the UV adhesive. However, UV robot 515 may not cure the structural adhesive, e.g., because the structural adhesive may not be curable through exposure to UV light.

In some embodiments in which UV adhesive (e.g., UV adhesive strips) is applied at more than one location on first structure 523 and second structure 525, UV robot 515 may move tool 549 to different positions, each of which may be suitable for curing the UV adhesive. UV robot 515 may hold tool 549 at each of the different positions for a time period that is sufficient to cure the UV adhesive while UV light applicator 577 emits UV light 581 for curing. After curing, uncured UV adhesive 579 becomes cured UV adhesive 583.

Once the UV adhesive is cured, UV robot 515 may move its robotic arm away from first structure 523 and second structure 525. First structure 523 and second structure 525 may be at least temporarily bonded by the cured UV adhesive 583. However, the structural adhesive (applied by structural adhesive robot 513, as shown above in FIG. 6B) may still be uncured at this stage.

Next, FIG. 6I illustrates that keystone robot 507 may remain at its position, and may continue to retain second structure 525. At this stage, second structure 525 may be at least temporarily bonded to first structure 523, e.g., through the cured UV adhesive 583 strips across first structure 523 and second structure 525.

Assembly robot 511 may separate from first structure 523. For example, assembly robot 511 may cause its end effector to disengage from first structure 523, such as by opening jaws of end effector 537, unfastening end effector 537 from one or more features of first structure 523, and/or otherwise causing end effector 537 to release first structure 523.

Once separated from first structure 523, assembly robot 511 may move its robotic arm away from the first structure. For example, assembly robot 511 may retract its robotic arm away from keystone robot 507. In so doing, keystone robot 507 may be provided a greater area to move about.

As assembly robot 511 is separated from first structure 523, keystone robot 507 may retain first structure 523, e.g., through its retention of second structure 525 that is at least temporarily bonded with first structure 523. The cured UV adhesive 583 may provide a sufficient bond to support this retention of first structure 523, bonded with second structure 525, even though keystone robot 507 does not directly engage first structure 523 (e.g., when end effector 543 of keystone robot 507 is engaging second structure 525). When bonded (even temporarily), first structure 523 and second structure 525 may be a structure and/or may be referred to as a subassembly 603.

Turning to FIG. 6J, assembly robot 511 can turn towards parts table 521 and engage third structure 527. Third structure 527 may include one or more features that enable joining of third structure 527 with one or more other structures. Illustratively, third structure 527 may include a groove 551 on a first surface and may include a groove 553 on a second surface. The first surface and the second surface of third structure 527 may be approximately opposite surfaces (e.g., the first surface may be on a left side of third structure 527 and the second surface may be on a right side of third structure 527, or vice versa).

With its robotic arm positioned toward parts table 521, assembly robot 511 may be relatively closer to groove 551 of third structure 527 than groove 553 of third structure 527. Assembly robot 511 may engage with third structure 527, e.g., approximately at groove 551 side of third structure 527. Specifically, the robotic arm of assembly robot 511 may move to a position at which end effector 537 of assembly robot 511 can engage third structure 527. At this position, end effector 537 of assembly robot 511 engages with third structure 527. Once engaged, assembly robot 511 may retain third structure 527, e.g., by means of end effector 537.

Now referring to FIG. 6K, assembly robot 511 may move its robotic arm toward structural adhesive robot 513, such as by rotating its robotic arm about its base to a position at which its robotic arm is toward the robotic arm of structural adhesive robot 513. In some embodiments, structural adhesive robot 513 may additionally move its robotic arm toward third structure 527, which is retained by assembly robot 511.

As illustrated in FIG. 6K, assembly robot 511 may orient third structure 527 so that groove 551 is facing approximately upward, such as by causing the robotic arm of the assembly robot and/or end effector 537 of the assembly robot to move such that groove 551 is oriented approximately upward.

Structural adhesive robot 513, connected with structural adhesive applicator 539 (or other similar tool) may move its robotic arm to a position such that the structural adhesive applicator is above groove 551, and is sufficiently close so that a controlled amount of the structural adhesive can be deposited within a defined area in the groove while avoiding deposition of the structural adhesive elsewhere. At such an above position, an adhesive application tip of structural adhesive applicator 539 may be approximately directly above groove 551, and may be pointed downward into the upwardly facing groove.

When suitably positioned, structural adhesive robot 513 may cause structural adhesive applicator 539 to deposit the controlled amount of structural adhesive into groove 551. The controlled amount of structural adhesive may at least partially fill groove 551. In some embodiments, the controlled amount of structural adhesive may entirely or nearly entirely fill groove 551.

The amount of structural adhesive, however, may be controlled such that the structural adhesive does not overflow outside groove 551 and onto the first surface of third structure 527 that bounds groove 551. For example, the amount of structural adhesive deposited in groove 551 may be controlled such that the structural adhesive does not leak onto any surfaces of third structure 527 when a protrusion of another structure is inserted into groove 551 when third structure 527 is joined with the other structure.

Continuing to FIG. 6L, assembly robot 511 may rotate its robotic arm about its base to a position at which its robotic arm is toward the robotic arm of keystone robot 507. Thus, the distal end of the robotic arm of keystone robot 507 may be positioned toward assembly robot 511, and similarly, the distal end of the robotic arm of assembly robot 511 may be positioned toward keystone robot 507.

Keystone robot 507 may retain subassembly 603, with its end effector directly engaging second structure 525 of subassembly 603. Subassembly 603 may be positioned approximately between the two robots 507, 511. Keystone robot 507 may retain subassembly 603 such that tongue 535 of first structure 523 is facing oriented toward keystone robot 507.

After assembly robot 511 rotates its robotic arm away from parts table 521 and toward keystone robot 507, third structure 527 may be positioned approximately between assembly robot 511 and keystone robot 507. Assembly robot 511 may orient third structure 527 so that groove 551 is facing approximately upward, having the controlled amount of adhesive previously deposited therein.

Assembly robot 511 may move third structure 527 according to one or more vectors, which may be based on CAD modeling. Each of the one or more vectors may indicate a magnitude (e.g., distance) and a direction according to which third structure 527 is to be moved by assembly robot 511. Each vector may be intended to bring third structure 527 toward the joining proximity at which third structure 527 can be joined with subassembly 603, although some vectors may be intermediary vectors intended to bring first structure 523 to a position at which a vector for joining first and second structures 523, 525 can be applied.

Now referring to FIG. 6M, keystone robot 507 may move subassembly 603 to a position at which tongue 535 of first structure 523 is oriented approximately downward. For example, keystone robot 507 may rotate subassembly 603 approximately 90 degrees counterclockwise from the position of subassembly 603 when first structure 523 is joined with second structure 525 (e.g., as above shown in FIG. 6I). At such an orientation, tongue 535 of first structure 523 is facing downward toward the upwardly oriented groove 551 of third structure 527.

In some embodiments, keystone robot 507 may move subassembly 603 according to one or more vectors, which may be based on CAD modeling. Each of the one or more vectors may indicate a magnitude (e.g., distance) and a direction according to which subassembly 603 is to be moved by keystone robot 507. Each vector may be intended to bring subassembly 603 within the joining proximity at which subassembly 603 can be joined with third structure 527, although some vectors may be intermediary vectors intended to bring subassembly 603 to a position at which a vector for joining subassembly 603 and third structure 527 can be applied.

Next, FIG. 6N illustrates assembly robot 511 and keystone robot 507 may position third structure 527 and subassembly 603, respectively, such that the third structure and the subassembly are close, but not at the joining proximity, in this case such that the third structure is at least partially below first structure 523, for example, such that third structure 527 and subassembly 603 at least partially overlap in the elevational plane (or vertical space).

Third structure 527 may be oriented with groove 551 facing approximately upward, having the controlled amount of adhesive previously deposited therein. Assembly robot 511 may upwardly move third structure 527 toward subassembly 603. Further, assembly robot 511 may position third structure 527 so that the upwardly facing groove 551 is approximately vertically and horizontally aligned with the downwardly facing tongue 535.

Keystone robot 507 may retain subassembly 603 at the previously described position with tongue 535 oriented approximately downwardly toward the upwardly facing groove 551. However, third structure 527 and subassembly 603 may not yet be within the joining proximity at which the third structure 527 and subassembly 603 can be joined.

FIG. 6O illustrates that subassembly 603 and third structure 527 may be brought within the joining proximity at which the subassembly and the third structure can be joined. To do so, one or both of subassembly 603 and/or third structure 527 may be moved by one or both of keystone robot 507 and/or assembly robot 511, respectively. For example, assembly robot 511 may cause the distal end of its robotic arm, at which third structure 527 is engaged, to move in an approximately upwardly direction toward subassembly 603. Additionally or alternatively, keystone robot 507 may cause the distal end of its robotic arm, at which subassembly 603 is retained, to move in an approximately downwardly direction toward third structure 527.

Similar to the example operations described above in FIG. 6F, metrology system 531 may determine positional data associated with at least one of subassembly 603 and/or third structure 527 in assembly cell 505. For example, metrology system 531 may determine a set of coordinates associated with third structure 527. The set of coordinates may indicate the physical position of third structure 527 in assembly cell 505 and/or relative to the joining proximity or subassembly 603.

Metrology system 531 may provide the positional data to computing system 529. Computing system 529 may receive the positional data and, based on the positional data, may determine a set of corrective operations to be applied so that third structure 527 can be brought within the joining proximity and joined with subassembly 603, and specifically, by inserting tongue 535 of first structure 523 into groove 551 of third structure 527 having the structural adhesive. For example, computing system 529 may determine a difference between the set of coordinates associated with third structure 527 and the joining proximity.

Based on the determined difference, computing system 529 may determine the set of corrective operations to be applied to third structure 527 such that the third structure can be brought within the joining proximity. In some embodiments, the set of corrective operations may include a set of vectors that each indicate a magnitude and a direction based on which third structure 527 can be moved within the joining proximity. In some other embodiments, the set of corrective operations may include a set of coordinates associated with bringing third structure 527 within the joining proximity, such as a set of coordinates according to which the robotic arm of assembly robot 511 is to be controlled so that third structure 527 is brought within the joining proximity.

Computing system 529 may provide the set of corrective operations to controller 611 communicatively connected with assembly robot 511, such as by issuing a set of commands to controller 611. Controller 611 may apply the set of commands by controlling the robotic arm of assembly robot 511 according to the set of corrective operations indicated by the set of commands.

In some embodiments, computing system 529 may receive positional data from metrology system 531 indicating that subassembly 603 and third structure 527 are within the joining proximity. For example, computing system 529 may determine, from received positional data, that third structure 527 is positioned within acceptable tolerances of joining third structure 527 and subassembly 603. The acceptable tolerances may be provided by bond gaps, similar to the bond gaps shown in FIG. 6F. However, in the joining operation shown in FIG. 6O, the lateral bond gaps are not equal. Specifically, a first lateral bond gap 565 is bigger than a second lateral bond gap 566. The difference in size of the first and second lateral bond gaps could be caused, for example, because the tongue was printed incorrectly, such that the tongue was shifted to one side (from the perspective of the figure). However, because the bond gaps allow for some amount of dimensional error, the ultimate position of the remaining portion of subassembly 603 may be accurately positioned relative to third structure 527. In this way, for example, bond gaps resulting from contact-free joining can offset dimensional errors, thus allowing large, multi-structure assemblies to have greater dimensional accuracy. In the automotive field, in particular, dimensional accuracy is a critical element of quality construction. Thus, fixtureless, contact-free joining of automotive structures can provide significant advantages.

Now referring to FIG. 6P, UV robot 515 may be located relatively proximate to keystone robot 507 and assembly robot 511. The distal end of the robotic arm of UV robot 515 may be positioned toward subassembly 603 and third structure 527, and specifically, toward the point at which subassembly 603 and third structure 527 are positioned at the joining proximity (e.g., toward the tongue-and-groove joint). In such a position, the distal end of the robotic arm of UV robot 515 may be between keystone robot 507 and assembly robot 511.

The distal end of the robotic arm of UV robot 515 may be positioned such that tool 549 is proximate to the point at which subassembly 603 and third structure 527 are at the joining proximity. For example, the robotic arm of UV robot 515 may be positioned such that tool 549 is positioned at a distance from the tongue-and-groove joint (formed by joining subassembly 603 and third structure 527 at the joining proximity) that is suitable for dispensing the UV adhesive.

At this suitable distance, UV robot 515 may apply UV adhesive on and/or near the tongue-and-groove joint formed by positioning subassembly 603 and third structure 527 at the joining proximity. For example, UV adhesive applicator 575 of tool 549 may apply UV adhesive as one or more UV adhesive strips, each of which may contact both first structure 523 of subassembly 603 and third structure 527. For example, UV robot 515 may position tool 549 so that one UV adhesive strip is placed across respective surfaces of first structure 523 (e.g., proximate to tongue 535 of first structure 523) and third structure 527 (e.g., proximate to groove 551 of third structure 527). At this stage, the UV adhesive may be uncured (e.g., uncured UV adhesive 585).

Continuing with FIG. 6Q, UV robot 515 may position UV light applicator 577 of tool 549 at a distance from uncured UV adhesive 585 that is suitable for curing the UV adhesive, which may be the same position or a different position as that at which the UV adhesive was earlier applied (as shown above in FIG. 6P). With tool 549 at this distance, UV robot 515 may cause UV light applicator 577 to cure the UV adhesive. For example, UV robot 515 may cause UV light applicator 577 to emit UV light 581 for a time sufficient to cure the UV adhesive, resulting in cured UV adhesive 587. However, UV robot 515 may not cure the structural adhesive applied by structural adhesive robot 513 (as shown above in FIG. 6K), e.g., because the structural adhesive may not be curable through exposure to UV light.

In some embodiments in which UV adhesive (e.g., UV adhesive strips) is applied at more than one location on subassembly 603 and third structure 527, UV robot 515 may move tool 549 to different positions, each of which may be suitable for curing the UV adhesive applied at different locations across subassembly 603 and third structure 527. UV robot 515 may hold tool 549 at each of the different positions for a time period that is sufficient to cure the UV adhesive while UV light applicator 577 emits UV light 581 for curing.

Next, FIG. 6R illustrates that once the UV adhesive is cured, UV robot 515 may move its robotic arm away from subassembly 603 and third structure 527. Subassembly 603 and third structure 527 may be at least temporarily bonded by the cured UV adhesive 587 to form a subassembly 605. However, the structural adhesive (applied by structural adhesive robot 513, as shown above in FIG. 6K) may still be uncured at this stage.

Keystone robot 507 may remain at its position, and may continue to retain subassembly 605. Assembly robot 511 may disengage from third structure 527. For example, assembly robot 511 may cause its end effector to disengage from third structure 527, such as by opening jaws of end effector 537, unfastening the end effector from one or more features of the third structure, and/or otherwise causing the end effector to release the third structure.

Once separated from third structure 527, assembly robot 511 may move its robotic arm away from third structure 527. For example, assembly robot 511 may retract its robotic arm away from keystone robot 507. In so doing, keystone robot 507 may be provided a greater area to move about while retaining a subassembly 605.

As assembly robot 511 is separated from third structure 527, keystone robot 507 may retain third structure 527, e.g., through its retention of second structure 525 that is at least temporarily bonded with first structure 523 and through the at least temporary bond of first structure 523 with third structure 527. The cured UV adhesive 587 may provide a sufficient bond to support this retention of third structure 527, bonded with first structure 523 and indirectly connected with second structure 525 through the bond with first structure 523, even though keystone robot 507 does not directly engage first structure 523 (e.g., when end effector 543 of keystone robot 507 is engaging second structure 525). When bonded (even temporarily), first structure 523, second structure 525, and third structure 527 may be a structure and/or may be referred to as a subassembly, i.e., subassembly 605.

The robots may iterate through example operations of fixtureless assembly system 500 similar to those described above in FIGS. 6A through 6R to fixturelessly assemble a subassembly that is at least portion of a vehicle, such as a frame, chassis, body, panel, etc. During the example operations, keystone robot 507 may continuously retain the subassembly, as assembly robot 511 (and/or assembly robot 509) engages and retains other structures, structural adhesive robot 513 applies structural adhesive to each of the other structures, assembly robot 511 (and/or assembly robot 509) joins each of the other structures with the subassembly retained by keystone robot 507, UV robot 515 applies and cures the UV or other temporary adhesive to at least temporarily bond each of the other structures joined with the subassembly, and then assembly robot 511 (and/or assembly robot 509) releases each of the other structures after the UV or other temporary adhesive is cured.

As illustrated in FIG. 6S, a subassembly 637 is assembled through the example operations of joining first structure 523 and second structure 525 to form subassembly 603, joining third structure 527 and subassembly 603 to form subassembly 605, and so forth. In this example, keystone robot 507 has previously disengaged from second structure 525 during a previous step in the joining of subassembly 637. For example, the keystone robot may have disengaged and allowed the assembly robot to retain a previous subassembly, and the keystone robot may have picked another part off of the parts table to continue the assembly process. The bond created by UV or other temporary adhesive may be sufficient to support subassembly 637 when retained by keystone robot 507 (e.g., by only one end effector and at only one structure). Keystone robot 507 may be effectively capable of solely retaining and supporting subassembly 637 (as well as larger, heavier, and/or more complex subassemblies and completed assemblies). Furthermore, keystone robot 507 may be capable of moving subassembly 637 (as well as larger, heavier, and/or more complex subassemblies and completed assemblies) without assistance from other robots. For example, keystone robot 507 may be able to move, rotate, and/or otherwise articulate its robotic arm and/or end effector 543 while retaining subassembly 637. When the final assembly is completed, keystone robot 507 will retain the entire assembly, as described with respect to FIG. 6T.

In some embodiments, other subassemblies may be assembled from other structures without keystone robot 507. For example, assembly robots 509, 511 may assemble another subassembly 639 from another set of structures similar to the assembly of subassembly 605 from first, second, and third structures 523, 525, 527; however, subassembly 639 may be assembled without keystone robot 507. Instead, assembly robot 511 may engage and continuously retain one structure as assembly robot 509 engages and retains other structures, structural adhesive robot 513 applies structural adhesive to each of the other structures, assembly robot 509 joins each of the other structures with subassembly 639 while continuously retained by assembly robot 511, UV robot 515 applies and cures the UV adhesive to at least temporarily bond each of the other structures joined with subassembly 639, and then assembly robot 509 releases each of the other structures after the UV adhesive is cured. Thus, subassembly 639 may be assembled in assembly cell 505 while keystone robot 507 continuously retains subassembly 637. In some embodiments, then, at least two subassemblies may be contemporaneously assembled in fixtureless assembly system 500.

Again referring to FIG. 6S, assembly robot 511 may position subassembly 639 to be at least partially below subassembly 637, for example, such that subassembly 639 and subassembly 637 at least partially overlap in the elevational plane (or vertical space).

Subassembly 639 may be oriented with grooves 621, 623 of its constituent structures facing approximately upward. Grooves 621, 623 of subassembly 639 may have a controlled amount of structural adhesive previously deposited therein. Assembly robot 511 may upwardly move subassembly 639 toward subassembly 637. Further, assembly robot 511 may position subassembly 639 so that the upwardly facing grooves 621, 623 are approximately or nearly vertically and horizontally aligned with the downwardly facing tongues 625, 627 of subassembly 637.

Keystone robot 507 may retain subassembly 637 at a position with tongues 625, 627 of subassembly 637 oriented approximately downwardly toward the approximately upwardly facing grooves 621, 623 of subassembly 639. However, subassemblies 637, 639 may not yet be within the joining proximity at which subassembly 637 can be joined with subassembly 639.

With reference to FIG. 6T, subassembly 637 and subassembly 639 may be brought within the joining proximity at which subassembly 637 and subassembly 639 can be joined. To do so, one or both of subassembly 637 and/or subassembly 639 may be moved by one or both of keystone robot 507 and/or assembly robot 511, respectively. For example, assembly robot 511 may cause the distal end of its robotic arm, at which subassembly 639 is engaged, to move in an approximately upwardly direction toward subassembly 637. Additionally or alternatively, keystone robot 507 may cause the distal end of its robotic arm, at which subassembly 637 is retained, to move in an approximately downwardly direction toward subassembly 639.

Similar to the example operations described above in FIG. 6F, metrology system 531 may determine positional data associated with at least one of subassembly 637 and/or subassembly 639 in assembly cell 505. Metrology system 531 may provide the positional data to computing system 529. Computing system 529 may receive the positional data and, based on the positional data, may determine a set of corrective operations to be applied so that subassembly 639 can be brought within the joining proximity and joined with subassembly 637, and specifically, by inserting each of tongues 625, 627 of subassembly 637 into a respective one of grooves 621, 623 of subassembly 639 having structural adhesive applied therein.

Based on the positional data, computing system 529 may determine a set of corrective operations to be applied to subassembly 639 such that subassembly 639 can be brought within the joining proximity. In some embodiments, the set of corrective operations may include a set of vectors that each indicate a magnitude and a direction based on which subassembly 639 can be moved within the joining proximity. In some other embodiments, the set of corrective operations may include a set of coordinates associated with bringing subassembly 639 within the joining proximity, such as a set of coordinates according to which the robotic arm of assembly robot 511 is to be controlled so that subassembly 639 is brought within the joining proximity.

Computing system 529 may provide the set of corrective operations to controller 611 communicatively connected with assembly robot 511, such as by issuing a set of commands to controller 611. Controller 611 may apply the set of commands by controlling the robotic arm of assembly robot 511 according to the set of corrective operations indicated by the set of commands.

In some embodiments, computing system 529 may receive positional data from metrology system 531 indicating that subassembly 637 and subassembly 639 are within the joining proximity. For example, computing system 529 may determine, from received positional data, that subassembly 639 is positioned within acceptable tolerances of joining subassembly 637 and subassembly 639. The acceptable tolerances may be provided by bond gaps of groove 621, 623 of subassembly 639.

When computing system 529 determines subassembly 637 and subassembly 639 are at the joining proximity and no further corrective operations should be applied based on the positional data received from metrology system 531, subassembly 637 and subassembly 639 may be joined at the joining proximity. For example, assembly robot 511 may move subassembly 639 in an approximately upwardly direction and/or keystone robot 507 may move subassembly 637 in an approximately downwardly direction, and thus, at least a portion of subassembly 637 overlaps with at least a portion of subassembly 639 in at least one of the azimuthal (or horizon) plane and/or the elevational plane. According to such an overlap at the joining proximity, each of tongues 625, 627 of subassembly 637 may be positioned within a respective one of grooves 621, 623 of subassembly 639, and tongue-and-groove joints are formed.

In some embodiments, tongues 625, 627 of subassembly 637 may not contact subassembly 639 at the joining proximity. For example, tongues 625, 627 of subassembly 637 may be respectively within grooves 621, 623 of subassembly 639, but bond gaps at the sides and bottoms of grooves 621, 623 may allow tongues 625, 627 to be respectively inserted in grooves 621, 623 without contacting any surfaces of subassembly 639, such as the sides and bottoms of grooves 621, 623. Rather, tongues 625, 627 of subassembly 637 may contact the structural adhesive deposited in grooves 621, 623 of subassembly 639 when subassemblies 637, 639 are at the joining proximity. In some further embodiments, however, the surfaces surrounding grooves 621, 623 of subassembly 639 may contact the surfaces surrounding tongues 625, 627 of subassembly 637.

Subsequently, the distal end of the robotic arm of UV robot 515 may be positioned toward subassemblies 637, 639, and specifically, toward one of the points at which subassemblies 637, 639 are joined (e.g., toward one of the tongue-and-groove joints). The distal end of the robotic arm of UV robot 515 may be positioned such that tool 549 connected with the UV robot 515 is proximate to the point at which subassemblies 637, 639 are positioned at the joining proximity.

When at a suitable distance, UV robot 515 may apply UV adhesive on and/or near one of the tongue-and-groove joints formed by joining subassemblies 637, 639. For example, tool 549 connected with UV robot 515 may apply UV adhesive as one or more UV adhesive strips, each of which may contact both subassemblies 637, 639.

UV robot 515 may then move tool 549 to the other tongue-and-groove joint formed by joining subassemblies 637, 639. UV robot 515 may then apply UV adhesive on and/or near one of the other tongue-and-groove joint formed by joining subassemblies 637, 639. For example, tool 549 connected with UV robot 515 may apply UV adhesive as one or more UV adhesive strips, each of which may contact both subassemblies 637, 639

Next, UV robot 515 may position tool 549 to cure the UV adhesive at each point the UV adhesive is applied. When tool 549 is at each point, UV robot 515 may cause tool 549 to cure the UV adhesive. For example, UV robot 515 may cause tool 549 to emit UV light 581 at each point for a time sufficient to cure the UV adhesive. However, UV robot 515 may not cure the structural adhesive applied in grooves 621, 623, e.g., because the structural adhesive may not be curable through exposure to UV light.

Once the UV adhesive is cured, UV robot 515 may move its robotic arm away from subassemblies 637, 639. Subassemblies 637, 639 may be at least temporarily bonded by the cured UV adhesive.

After the UV adhesive is cured, assembly robot 511 may separate from subassembly 639 and may move its robotic arm away from subassembly 639. Joined and at least temporarily bonded, subassemblies 637, 639 may form an assembly 641. As assembly robot 511 is separated from assembly 641, keystone robot 507 may retain assembly 641.

FIG. 6U next illustrates keystone robot 507 rotating its robotic arm away from assembly robot 511. In so doing, keystone robot 507 may bring assembly 641 toward an automated cart 631. Keystone robot 507 may move its robotic arm and/or end effector 543 to position assembly 641 on automated cart 631. For example, keystone robot 507 may rotate its robotic arm about its based to bring assembly 641 over automated cart 631, and keystone robot 507 may then lower assembly 641 into automated cart 631 by moving its robotic arm in approximately downwardly direction until assembly 641 is within automated cart 631 and contacts a surface of automated cart 631.

Keystone robot 507 may separate from assembly 641 after keystone robot 507 positions assembly 641 in automated cart 631. Keystone robot 507 may then retract its robotic arm away from assembly 641.

As shown in FIG. 6V, automated cart 631 may then move assembly 641 to an oven 633, and assembly 641 may be placed into oven 633. Oven 633 may be configured to heat to a temperature suitable for curing the structural adhesive, and oven 633 may be configured to remain at that temperature for a duration sufficient to cure the structural adhesive.

In some embodiments, exposing the UV adhesive (e.g., UV adhesive strips) previously applied to temporarily bond structures together to form assembly 641 to the temperature of oven 633 for the duration sufficient to cure the structural adhesive may cause the UV adhesive to disintegrate or otherwise burn off. After the duration sufficient to cure the structural adhesive, assembly 641 may be removed from oven 633. Assembly 641 may then be included in a vehicle, for example, as a frame, chassis, body, panel, or other vehicular component.

Figure 7:
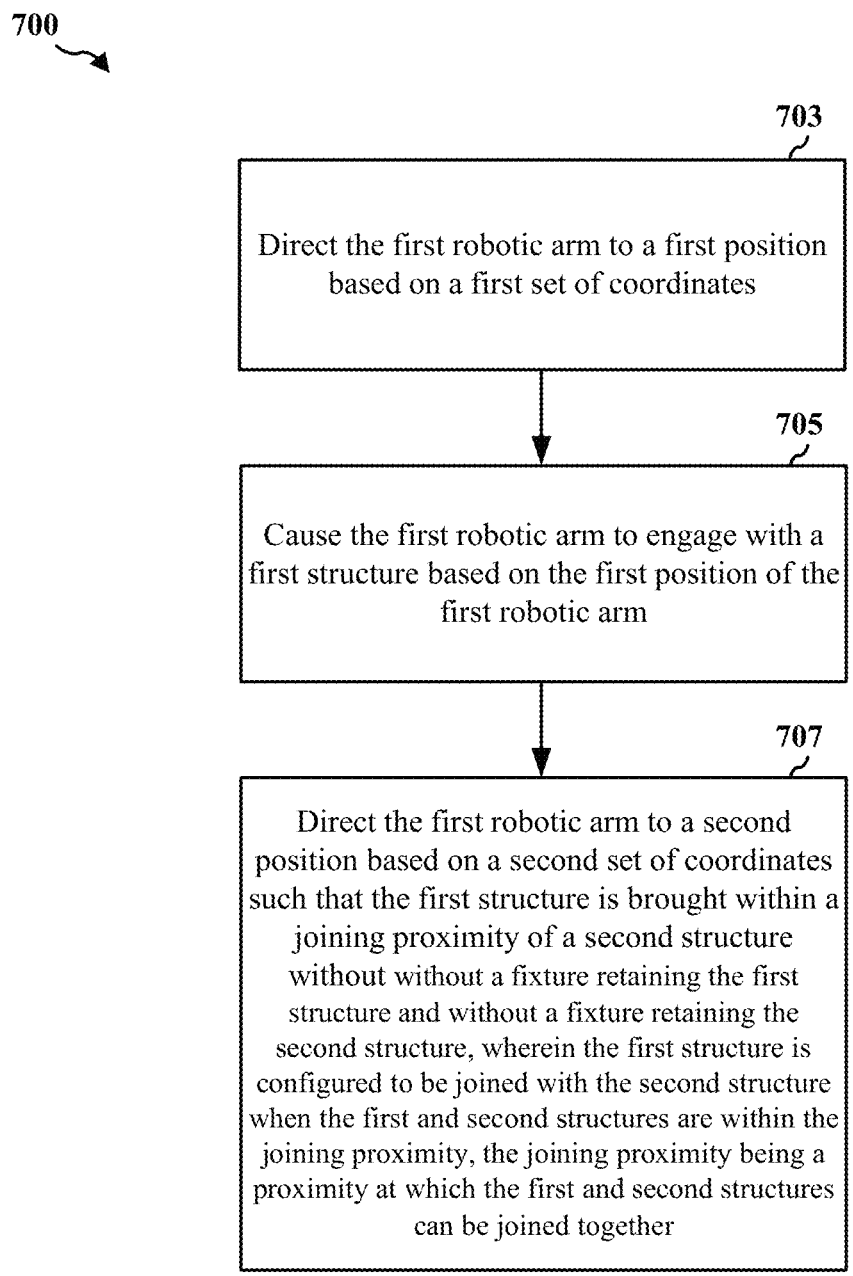
FIG. 7 is a flowchart illustrating an example method of controlling at least one robot for various example operations associated with joining structures in a fixtureless assembly system.

FIG. 7 is a flow diagram of a method 700 of a fixtureless assembly system including at least two robots. One or more of the illustrated operations may be transposed, omitted, and/or contemporaneously performed.

The method 700 may be performed in a fixtureless assembly system, such as fixtureless assembly system 500 of FIG. 5, including of FIGS. 6A through 6V. In some embodiments, a computing system may perform the method 700, such as by one or more of the controllers 607, 609, 611, 613, 615, 617 and/or computing system 529, which may be, for example, a processing system such as processing system 1000 described below. A computing system performing the method 700 may include a memory and at least one processor connected to the memory, and the at least one processor may be configured to perform the operations of the method 700. The computer performing the method 700 may be communicatively connected with one or more of a switch and/or one or more robots (e.g., one or more of the robots 507, 509, 511, 513, 515, 517). The computing system may be communicatively connected with one or more of the aforementioned components via one or more networks.

By way of example, the computing system performing the method 700 may comprise at least one controller communicatively connected with a keystone robot. The computing system may direct a first robotic arm to a first position based on a first set of coordinates (block 703). The computing system may cause the first robotic arm to engage with a first structure based on the first position of the first robotic arm (block 705). Further, the computing system may direct the first robotic arm to a second position based on a second set of coordinates such that the first structure is brought within a joining proximity of a second structure without a fixture retaining the first structure and without a fixture retaining the second structure, wherein the first structure is configured to be joined with the second structure when the first and second structures are within the joining proximity, the joining proximity being a proximity at which the first and second structures can be joined together (block 707).

Figure 8:
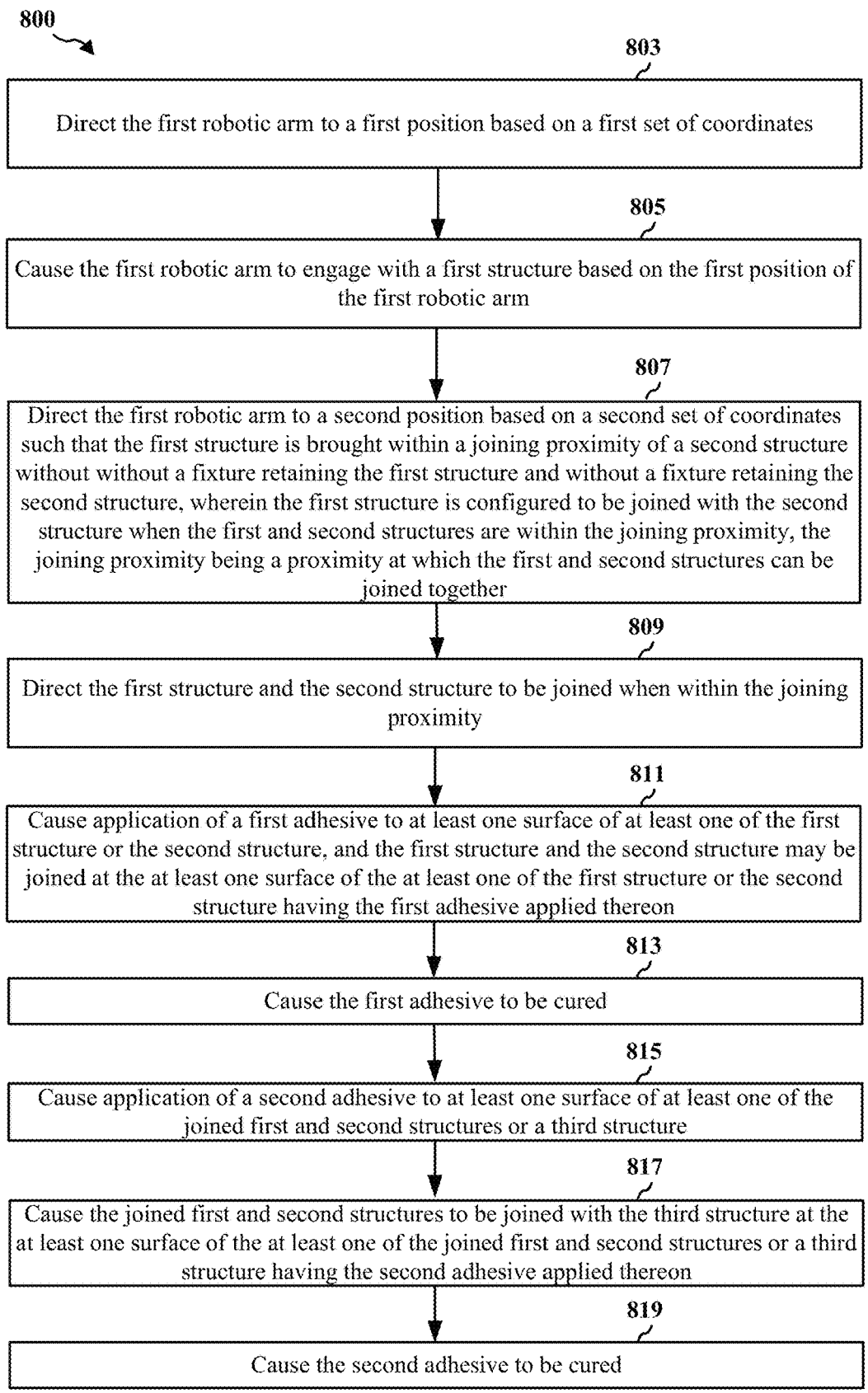
FIG. 8 is a flowchart illustrating an example method of directing at least one robot to join at least two structures for assembly of at least a portion of a vehicle.

FIG. 8 is a flow diagram of a method 800 of a fixtureless assembly system including at least two robots. One or more of the illustrated operations may be transposed, omitted, and/or contemporaneously performed.

The method 800 may be performed in a fixtureless assembly system, such as fixtureless assembly system 500 of FIG. 5, including of FIGS. 6A through 6V. In some embodiments, a computing system may perform the method 800, such as one or more of the controllers 607, 609, 611, 613, 615, 617 and/or computing system 529, which may be, for example, a processing system such as processing system 1000 described below. A computing system performing the method 800 may include a memory and at least one processor connected to the memory, and the at least one processor may be configured to perform the operations of the method 800. The computer performing the method 800 may be communicatively connected with one or more of a switch and/or one or more robots (e.g., one or more of the robots 507, 509, 511, 513, 515, 517). The computing system may be communicatively connected with one or more of the aforementioned components via one or more networks.

The computing system may direct a first robotic arm to a first position based on a first set of coordinates (block 803). The computing system may cause the first robotic arm to engage with a first structure based on the first position of the first robotic arm (block 805). For example, the first structure may have a volume of 500 milliliters or more and/or the first structure may weight 100 grams or more. The first structure may include a portion of a vehicle chassis. In one embodiment, the first robotic arm may engage with the first structure with an end effector that is removable from the first robotic arm. In another embodiment, the first robotic arm may engage with the first structure with an end effector that is integral with the first robotic arm.

Next, the computing system may direct the first robotic arm to a second position based on a second set of coordinates such that the first structure is brought within a joining proximity of a second structure without a fixture retaining the first structure and without a fixture retaining the second structure, wherein the first structure is configured to be joined with the second structure when the first and second structures are within the joining proximity, the joining proximity being a proximity at which the first and second structures can be joined together (block 807). In some embodiments, at least one of the first set of coordinates or the second set of coordinates is based on a move-measure-correct procedure. For example, the move-measure-correct procedure may be based on laser metrology.

The computing system may then direct the first structure and the second structure to be joined when within the joining proximity (block 809). The second structure may be engaged by a second robotic arm, which may be configured to engage the second structure when the first structure is brought within the joining proximity. In some embodiments, the second structure may include a recess, and a structural adhesive may be deposited in the recess of the second structure. The first structure may include a protrusion, which may be inserted into the recess of the second structure at the second position. In some embodiments, the first structure and the second structure are joined without contact, for example, using the structural adhesive.

The computing system may cause application of a first adhesive to at least one surface of at least one of the first structure or the second structure, and the first structure and the second structure may be joined at the at least one surface of the at least one of the first structure or the second structure having the first adhesive applied thereon (block 811). The first structure and the second structure may be joined with the first adhesive. In some embodiments, the first adhesive may be curable by exposure to UV light. Accordingly, the computing system may cause the first adhesive to be cured (block 813).

In some further embodiments, the computing system may cause application of a second adhesive to at least one surface of at least one of the joined first and second structures or a third structure (block 815). The computing system may cause the joined first and second structures to be joined with the third structure at the at least one surface of the at least one of the joined first and second structures or a third structure having the second adhesive applied thereon (block 817). Further, the computing system may cause the second adhesive to be cured (block 819).

The method 800 may be iteratively repeated so that a set of structures may be joined. Subsequently, structural adhesive applied to a subset of the set of structures may be cured (e.g., in an oven) to bond an assembly together.

Figure 9:
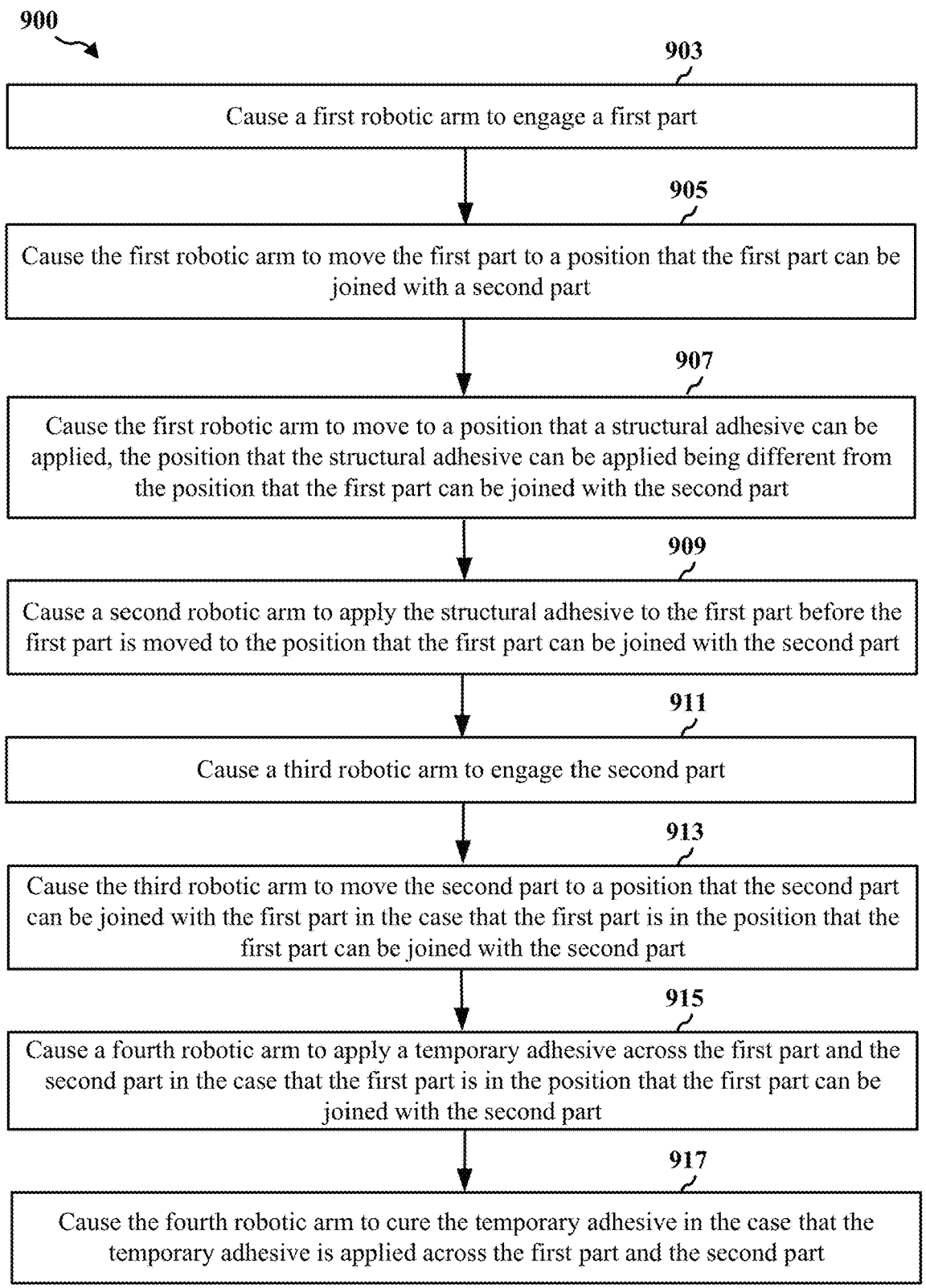
FIG. 9 is a flowchart illustrating an example method of causing at least one robotic arm to position at least one part for joining with at least one different part.

FIG. 9 is a flow diagram of a method 900 of a fixtureless assembly system including at least two robots. One or more of the illustrated operations may be transposed, omitted, and/or contemporaneously performed.

The method 900 may be performed in a fixtureless assembly system, such as fixtureless assembly system 500 of FIG. 5, including of FIGS. 6A through 6V. In some embodiments, a computing system may perform the method 900, such as one or more of the controllers 607, 609, 611, 613, 615, 617 and/or computing system 529, which may be, for example, a processing system such as processing system 1000 described below. A computing system performing the method 900 may include a memory and at least one processor connected to the memory, and the at least one processor may be configured to perform the operations of the method 900. The computer performing the method 900 may be communicatively connected with one or more of a switch and/or one or more robots (e.g., one or more of the robots 507, 509, 511, 513, 515, 517). The computing system may be communicatively connected with one or more of the aforementioned components via one or more networks.

The computing system may cause a first robotic arm to engage a first part (block 903). Next, the computing system may cause the first robotic arm to move the first part to a position that the first part can be joined with a second part (block 905). Further, the computing system may cause the first robotic arm to move to a position that a structural adhesive can be applied, the position that the structural adhesive can be applied being different from the position that the first part can be joined with the second part (block 907).

The computing system may cause a second robotic arm to apply the structural adhesive to the first part before the first part is moved to the position that the first part can be joined with the second part (block 909). The computing system may cause a third robotic arm to engage the second part (block 911). Additionally, the computing system may cause the third robotic arm to move the second part to a position that the second part can be joined with the first part in the case that the first part is in the position that the first part can be joined with the second part (block 913).

The computing system may cause a fourth robotic arm to apply a temporary adhesive across the first part and the second part in the case that the first part is in the position that the first part can be joined with the second part (block 915). The computing system may cause the fourth robotic arm to cure the temporary adhesive in the case that the temporary adhesive is applied across the first part and the second part (block 917).

With respect to FIG. 10, a block diagram illustrates an embodiment of a processing system 1000. The processing system 1000 may comprise at least one controller associated with at least one robot. For example, referring to FIG. 5, the processing system 1000 may be an embodiment of at least one of the controllers 607, 609, 611, 613, 615, 617 associated with at least one of the robots 507, 509, 511, 513, 515, 517. In another example, referring to FIGS. 6A through 6V, the processing system 1000 may be an embodiment of all of the controllers 607, 609, 611, 613, 615, 617.

The system 1000 may include various types of machine-readable media and interfaces. As illustrated, the system 1000 includes at least one interconnect 1020 (e.g., at least one bus), a permanent storage device 1022, random-access memory (RAM) 1024, at least one controller interface(s) 1026, read-only memory (ROM) 1028, at least one processor(s) 1030, and a network component 1032.

The interconnect 1020 may communicatively connect components and/or devices that are collocated with the system 1000, such as internal components and/or internal devices within a housing of the system 1000. For example, the interconnect 1020 may communicatively connect the processor(s) 1030 with the permanent storage device 1022, RAM 1024, and/or ROM 1028. The processor(s) 1030 may be configured to access and load computer-executable instructions from at least one of the permanent storage device 1022, RAM 1024, and/or ROM 1028.

The permanent storage 1022 may be non-volatile memory that stores instructions and data, independent of the power state (e.g., on or off) of the system 1000. For example, the permanent storage 1022 may be a hard disk, flash drive, or another read/write memory device.

ROM 1028 may store static instructions enabling basic functionality of the system 1000, as well as the components therein. For example, ROM 1028 may store instructions for the processor(s) 1030 to execute a set of processes associated with robot of at least a portion of a vehicle, for example, as described with respect to one or more of the robots, above. Examples of ROM 1028 may include erasable programmable ROM (EPROM) or electrically EPROM (EEPROM), compact disc ROM (CD-ROM) or other optical disk storage, magnetic disk storage or other magnetic storage devices, and/or another computer-accessible and computer-readable medium that may store program code as instructions and/or data structures.

RAM 1024 may include volatile read/write memory. RAM 1024 may store computer-executable instructions associated with runtime operation(s) by the processor(s) 1030. In addition, RAM 1024 may store real-time data captured during assembly of at least a portion of a vehicle, for example, as described with respect to one or more of FIGS. 5 through 9, above.

The processor(s) 1030 may be implemented with one or more general-purpose and/or special-purpose processors. Examples of general-purpose and/or special-purpose processors may include microprocessors, microcontrollers, DSP processors, and/or any other suitable circuitry configured to execute instructions loaded from at least one of the permanent storage device 1022, RAM 1024, and/or ROM 1028. Alternatively or additionally, the processor(s) 1030 may be implemented as dedicated hardware, such as at least one field programmable gate array (FPGA), at least one programmable logic device (PLD), at least one controller, at least one state machine, a set of logic gates, at least one discrete hardware component, or any other suitable circuitry and/or combination thereof.

The interconnect 1020 may further communicatively connect the system 1000 with one or more controller interface(s) 1026. The controller interface(s) 1026 may communicatively connect the system 1000 with various circuitry associated with one or more robots, for example, during assembly of at least a portion of a vehicle. Instructions executed by the processor(s) 1030 may cause instructions to be communicated with a robot through the controller interface(s) 1026, which may cause movement and/or other actions of the robot in association with assembly of at least a portion of a vehicle. For example, instructions executed by the processor(s) 1030 may cause signals to be sent through the controller interface(s) 1026 to circuitry and/or other machinery of a robot in order to direct movement and/or other actions of the robot in association with assembly of at least a portion of a vehicle.

In some embodiments, the system 1000 may include a network component 1032. The network component 1032 may be configured to communicate over a network, for example, in order to transmit and/or receive instructions associated with assembly of at least a portion of a vehicle. Instructions communicated over a network through the network component 1032 may include instructions associated with assembly of at least a portion of a vehicle, and may be communicated before, during, and/or after assembly of at least a portion of a vehicle. Examples of a network through which the network component 1032 may communicate may include a local area network (LAN), a wide area network (WAN), the Internet, an intranet, or another wired or wireless network.

Various aspects described herein may be implemented at least partially as software processes of a computer-programming product. Such processes may be specified as a set of instructions recorded on a machine-readable storage medium. When a set of instructions is executed by the processor(s) 1030, the set of instructions may cause the processor(s) to perform operations indicated and recorded in the set of instructions.

The present disclosure is provided to enable any person skilled in the art to practice the various aspects described herein. Various modifications to these example embodiments presented throughout the present disclosure will be readily apparent to those skilled in the art, and the concepts disclosed herein may be applied to other techniques for printing nodes and interconnects. Thus, the claims are not intended to be limited to the example embodiments presented throughout the disclosure, but are to be accorded the full scope consistent with the language claims. All structural and functional equivalents to the elements of the example embodiments described throughout the present disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus comprising:
    a first robotic arm;
    a second robotic arm;
    a first structure;
    a second structure; and
    a processor communicatively connected with a memory and configured to:
        cause the first robotic arm to engage with the first structure,
        cause the second robotic arm to engage with the second structure,
        direct the first robotic arm and the second robotic arm to move the first structure, without a fixture retaining the first structure, and the second structure, without a fixture retaining the second structure, such that a protrusion of the first structure or an opening of the second structure is brought within a joining proximity wherein the first structure and the second structure do not contact, and
        cause a first adhesive to join the first structure and the second structure at the protrusion or the opening, wherein the first structure is joined to the second structure with the first adhesive.

2. The apparatus of claim 1, further comprising:
    a third robotic arm configured to cure the first adhesive with a curing device.

3. The apparatus of claim 1, wherein the first adhesive is cured by exposure to ultraviolet light.

4. The apparatus of claim 1, wherein the processor is further configured to:
    cause application of the first adhesive to at least the first structure or the second structure; and
    cause the first adhesive to be cured.

5. The apparatus of claim 4, wherein the processor is further configured to:
    cause application of a second adhesive to at least one surface of at least the joined first and second structures or a third structure;
    cause the joined first and second structures to be joined with the third structure at the at least one surface of the at least the joined first and second structures or a third structure having the second adhesive applied thereon; and
    cure the second adhesive.

6. The apparatus of claim 5, wherein each of the first and second adhesives comprises a quick-cure adhesive, and wherein the quick-cure adhesive is cured through exposure to ultraviolet (UV) light.

7. The apparatus of claim 1, wherein directing at least the first robotic arm or the second robotic arm is based on a move-measure-correct procedure.

8. The apparatus of claim 7, wherein the move-measure-correct procedure is based on laser metrology.

9. The apparatus of claim 1, wherein the opening comprises a recess and the protrusion is inserted into the recess.

10. The apparatus of claim 9, wherein the first adhesive is deposited in the recess of the second structure, and the protrusion of the first structure is bonded to the second structure by the first adhesive.

11. The apparatus of claim 1, wherein the first robotic arm engages with the first structure with an end effector that is removable from the first robotic arm.

12. The apparatus of claim 1, wherein the first robotic arm engages with the first structure with an end effector that is integral with the first robotic arm.

13. The apparatus of claim 1, wherein the first structure has a volume of 500 milliliters or more.

14. The apparatus of claim 1, wherein the first structure weighs 100 grams or more.

15. The apparatus of claim 1, wherein the first structure includes a portion of a vehicle chassis.

16. The apparatus of claim 1, wherein the processor is further configured to:
    cause the first robotic arm to disengage the first structure,
    cause the first robotic arm to engage a third structure, the third structure being a different structure than the first structure, and
    cause the first robotic arm to move the third structure to a position that the third structure can be joined with a subassembly including the first structure and the second structure.

17. The apparatus of claim 1, further comprising:
    a third robotic arm, wherein the processor is further configured to:
        cause the third robotic arm to apply a temporary adhesive across the first structure and the second structure.

18. The apparatus of claim 17, wherein the processor is further configured to:
    cause the third robotic arm to cure the temporary adhesive.

19. The apparatus of claim 18, further comprising:
    a tool configured to emit ultraviolet (UV) light, the tool being connected with the third robotic arm,
    wherein the temporary adhesive comprises UV-curable glue, and the third robotic arm is configured to cure the temporary adhesive by controlling the tool to emit the UV light directed to the temporary adhesive.

20. The apparatus of claim 1, further comprising:
a fourth robotic arm, wherein the processor is further configured to:
cause the fourth robotic arm to apply the first adhesive to the first structure or the second structure.

21. The apparatus of claim 1, wherein the first structure is co-printed with a first feature, wherein the first robotic arm comprises an end effector configured to engage the first feature.

22. The apparatus of claim 21, wherein the second structure is co-printed with a second feature, wherein the second robotic arm comprises an end effector configured to engage the second feature.

23. The apparatus of claim 1, wherein the processor is further configured to:
direct the first robotic arm to disengage from the first structure while the second robotic arm remains engaged with the second structure.

24. The apparatus of claim 23, wherein the processor is further configured to:
direct the first robotic arm or a third robotic arm to engage a third structure; and
direct the first robotic arm or the third robotic arm such that the third structure is brought within a joining proximity of the first structure or the second structure.

25. The apparatus of claim 24, wherein the processor is further configured to:
cause the third structure to be joined to the first structure or the second structure.

26. The apparatus of claim 25, wherein the processor is further configured to:
direct the first robotic arm or the third robotic arm to disengage from the third structure.

27. The apparatus of claim 25, wherein the processor is further configured to:
direct the second robotic arm to disengage from the second structure while the first robotic arm or the third robotic arm remains engaged with the third structure.

28. The apparatus of claim 27, wherein the processor is further configured to:
direct the second robotic arm to engage the first structure.

29. The apparatus of claim 28, wherein the processor is further configured to:
direct the first robotic arm or the third robotic arm to disengage from the third structure.

30. The apparatus of claim 27, wherein the processor is further configured to:
direct the second robotic arm to engage a fourth structure; and
direct the second robotic arm such that the fourth structure is brought within a joining proximity of the first structure, the second structure, or the third structure.

31. The apparatus of claim 1, wherein causing at least the first robotic arm to engage the first structure or the second robotic arm to engage the second structure is based at least on a computer-aided design model.

32. The apparatus of claim 1, wherein directing at least the first robotic arm to move the first structure or the second robotic arm to move the second structure is based at least on a computer-aided design model.

33. The apparatus of claim 1, wherein the protrusion comprises a tongue.

34. The apparatus of claim 1, wherein the opening comprises a groove.

35. The apparatus of claim 34, wherein the groove comprises a lateral bond gap.

36. The apparatus of claim 34, wherein the groove comprises a vertical bond gap.

37. A computer-readable medium storing computer-executable code for controlling one or more robotic arms in a fixtureless assembly system, the code when executed by at least one processor causes the at least one processor to:
cause a first robotic arm to engage with a first structure,
cause a second robotic arm to engage with a second structure,
direct the first robotic arm and the second robotic arm to move the first structure, without a fixture retaining the first structure, and the second structure, without a fixture retaining the second structure, such that a protrusion of the first structure or an opening of the second structure is brought within a joining proximity wherein the first structure and the second structure do not contact, and
cause a first adhesive to join the first structure and the second structure at the protrusion or the opening, wherein the first structure is joined to the second structure with the first adhesive.

38. The computer-readable medium of claim 37, further comprising code to:
cause the second robotic arm to cure the first adhesive with a curing device.

39. The computer-readable medium of claim 37, wherein the first adhesive is cured by exposure to ultraviolet light.

40. The computer-readable medium of claim 37, further comprising code to:
cause application of the first adhesive to at least the first structure or the second structure; and
cause the first adhesive to be cured.

41. The computer-readable medium of claim 40, further comprising code to:
cause application of a second adhesive to at least one surface of at least the joined first and second structures or a third structure;
cause the joined first and second structures to be joined with the third structure at the at least one surface of the at least the joined first and second structures or a third structure having the second adhesive applied thereon; and
cure the second adhesive.

42. The computer-readable medium of claim 41, wherein each of the first and second adhesives comprises a quick-cure adhesive, and wherein the quick-cure adhesive is cured through exposure to ultraviolet (UV) light.

43. The computer-readable medium of claim 37, wherein directing at least the first robotic arm or the second robotic arm is based on a move-measure-correct procedure.

44. The computer-readable medium of claim 43, wherein the move-measure-correct procedure is based on laser metrology.

45. The computer-readable medium of claim 37, wherein the opening comprises a recess and the protrusion is inserted into the recess.

46. The computer-readable medium of claim 45, wherein the first adhesive is deposited in the recess of the second structure, and the protrusion of the first structure is bonded to the second structure by the first adhesive.

47. The computer-readable medium of claim 37, wherein the first robotic arm engages with the first structure with an end effector that is removable from the first robotic arm.

48. The computer-readable medium of claim 37, wherein the first robotic arm engages with the first structure with an end effector that is integral with the first robotic arm.

49. The computer-readable medium of claim 37, wherein the first structure has a volume of 500 milliliters or more.

50. The computer-readable medium of claim 37, wherein the first structure weighs 100 grams or more.

51. The computer-readable medium of claim 37, wherein the first structure includes a portion of vehicle chassis.

52. The computer-readable medium of claim 37, further comprising code to:
cause the second robotic arm to engage with the second structure when the first structure is brought within the joining proximity.

53. The computer-readable medium of claim 37, wherein causing at least the first robotic arm to engage the first structure or the second robotic arm to engage the second structure is based at least on a computer-aided design model.

54. The computer-readable medium of claim 37, wherein directing at least the first robotic arm to move the first structure or the second robotic arm to move the second structure is based at least on a computer-aided design model.

55. The computer-readable medium of claim 37, wherein the protrusion comprises a tongue.

56. The computer-readable medium of claim 37, wherein the opening comprises a groove.

57. The computer-readable medium of claim 56, wherein the groove comprises a lateral bond gap.

58. The computer-readable medium of claim 56, wherein the groove comprises a vertical bond gap.

59. A method comprising:
causing a first robotic arm to engage a first structure;
causing a second robotic arm to engage a second structure;
directing the first robotic arm and the second robotic arm to move the first structure, without a fixture retaining the first structure, and the second structure, without a fixture retaining the second structure, such that a protrusion of the first structure or an opening of the second structure is brought within a joining proximity wherein the first structure and the second structure do not contact; and
causing a first adhesive to join the first structure and the second structure at the protrusion or the opening, wherein the first structure is joined to the second structure with the first adhesive.

60. The method of claim 59, further comprising:
directing the first robotic arm to disengage from the first structure while the second robotic arm remains engaged with the second structure.

61. The method of claim 60, further comprising:
directing the first robotic arm or a third robotic arm to engage a third structure; and
directing the first robotic arm or the third robotic arm such that the third structure is brought within a joining proximity of the first structure or the second structure.

62. The method of claim 61, further comprising:
causing the third structure to be joined to the first structure or the second structure.

63. The method of claim 62, further comprising:
directing the first robotic arm or the third robotic arm to disengage from the third structure.

64. The method of claim 62, further comprising:
directing the second robotic arm to disengage from the second structure while the first robotic arm or the third robotic arm remains engaged with the third structure.

65. The method of claim 64, further comprising:
directing the second robotic arm to engage the first structure.

66. The method of claim 65, further comprising:
directing the first robotic arm or the third robotic arm to disengage from the third structure.

67. The method of claim 64, further comprising:
directing the second robotic arm to engage a fourth structure; and
directing the second robotic arm such that the fourth structure is brought within a joining proximity of the first structure, the second structure, or the third structure.

68. The method of claim 59, wherein the first structure is co-printed with a first feature, the method further comprising:
engaging the first feature with an end effector of the first robotic arm.

69. The method of claim 68, wherein the second structure is co-printed with a second feature, the method further comprising:
engaging the second feature with an end effector of the second robotic arm.

70. The method of claim 59, wherein causing at least the first robotic arm to engage the first structure or the second robotic arm to engage the second structure is based at least on a computer-aided design model.

71. The method of claim 59, wherein directing at least the first robotic arm to move the first structure or the second robotic arm to move the second structure is based at least on a computer-aided design model.

72. The method of claim 59, wherein the opening comprises a recess, the method further comprising:
inserting the protrusion into the recess.

73. The method of claim 59, wherein the protrusion comprises a tongue.

74. The method of claim 59, wherein the opening comprises a groove.

75. The method of claim 74, wherein the groove comprises
a lateral bond gap.

76. The method of claim 74, wherein the groove comprises
a vertical bond gap.

77. The method of claim 59, further comprising:
causing a third robotic arm to cure the first adhesive with a curing device.

78. The method of claim 59, further comprising:
curing the first adhesive by exposing the first adhesive to ultraviolet light.

79. The method of claim 59, further comprising:
causing application of the first adhesive to at least the first structure or the second structure; and
causing the first adhesive to be cured.

80. The method of claim 79, further comprising:
causing application of a second adhesive to at least one surface of at least the joined first and second structures or a third structure;
causing the joined first and second structures to be joined with the third structure at the at least one surface of the at least the joined first and second structures or a third structure having the second adhesive applied thereon; and
curing the second adhesive.

81. The method of claim 80, wherein each of the first and second adhesives comprises a quick-cure adhesive, and wherein the quick-cure adhesive is cured through exposure to ultraviolet (UV) light.

82. The method of claim 59, wherein directing at least the first robotic arm or the second robotic arm is based on a move-measure-correct procedure.

83. The method of claim 82, wherein the move-measure-correct procedure is based on laser metrology.

84. The method of claim 59, wherein the opening comprises a recess, the method further comprising:
inserting the protrusion into the recess.

85. The method of claim 84, wherein the first adhesive is deposited in the recess of the second structure, and causing the first adhesive to join the first structure and the second structure comprises bonding the protrusion of the first structure to the second structure by the first adhesive.

86. The method of claim 59, wherein the first robotic arm engages with the first structure with an end effector that is removable from the first robotic arm.

87. The method of claim 59, wherein the first robotic arm engages with the first structure with an end effector that is integral with the first robotic arm.

88. The method of claim 59, wherein the first structure has a volume of 500 milliliters or more.

89. The method of claim 59, wherein the first structure weighs 100 grams or more.

90. The method of claim 59, wherein the first structure includes a portion of a vehicle chassis.

91. The method of claim 59, further comprising:
causing the first robotic arm to disengage the first structure;
causing the first robotic arm to engage a third structure, the third structure being a different structure than the first structure; and
causing the first robotic arm to move the third structure to a position that the third structure can be joined with a subassembly including the first structure and the second structure.

92. The method of claim 59, further comprising:
causing a third robotic arm to apply a temporary adhesive across the first structure and the second structure.

93. The method of claim 92, further comprising:
causing the third robotic arm to cure the temporary adhesive.

94. The method of claim 93, wherein the temporary adhesive comprises UV-curable glue, and the method further comprising:
connecting a tool with the third robotic arm;
causing the third robotic arm to cure the temporary adhesive by controlling the tool to emit UV light directed to the temporary adhesive.

95. The method of claim 59, further comprising:
causing a fourth robotic arm to apply the first adhesive to the first structure or the second structure.

96. The method of claim 59, further comprising:
co-printing the first structure with a first feature, wherein the first robotic arm comprises an end effector configured to engage the first feature.

97. The method of claim 96, further comprising:
co-printing the second structure with a second feature, wherein the second robotic arm comprises an end effector configured to engage the second feature.

\* \* \* \* \*